United States Patent
Molisch et al.

(10) Patent No.: US 11,489,559 B2
(45) Date of Patent: Nov. 1, 2022

(54) SCHEDULING MULTI-USER MIMO TRANSMISSIONS IN FIXED WIRELESS ACCESS SYSTEMS

(71) Applicant: Cohere Technologies, Inc., Santa Clara, CA (US)

(72) Inventors: Andreas Molisch, Santa Clara, CA (US); Robert Fanfelle, Santa Clara, CA (US); Saurabh Misra, Santa Clara, CA (US); Paul Lind, Santa Clara, CA (US); James Delfeld, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/979,020

(22) PCT Filed: Mar. 8, 2019

(86) PCT No.: PCT/US2019/021455
§ 371 (c)(1),
(2) Date: Sep. 8, 2020

(87) PCT Pub. No.: WO2019/173775
PCT Pub. Date: Sep. 12, 2019

(65) Prior Publication Data
US 2021/0058114 A1    Feb. 25, 2021

Related U.S. Application Data

(60) Provisional application No. 62/746,505, filed on Oct. 16, 2018, provisional application No. 62/641,140, (Continued)

(51) Int. Cl.
*H04B 7/026* (2017.01)
*H04B 7/0452* (2017.01)
(Continued)

(52) U.S. Cl.
CPC ........... *H04B 7/026* (2013.01); *H04B 7/0452* (2013.01); *H04B 7/0617* (2013.01); *H04L 5/006* (2013.01);
(Continued)

(58) Field of Classification Search
CPC .... H04B 7/026; H04B 7/0452; H04B 7/0617; H04B 7/14; H04B 7/15592; H04L 5/0037;
(Continued)

(56) References Cited

U.S. PATENT DOCUMENTS 4,754,493 A    6/1988    Coates
5,083,135 A    1/1992    Nagy et al.
(Continued)

FOREIGN PATENT DOCUMENTS

EP    2 996 293    8/2017
WO    2010/017482    2/2010
(Continued)

OTHER PUBLICATIONS

International Search Report, PCT/US2019/21455, dated Jul. 8, 2019, 4 pages.
(Continued)

*Primary Examiner* — Ian N Moore
*Assistant Examiner* — Latresa A McCallum
(74) *Attorney, Agent, or Firm* — Perkins Coie LLP

(57) ABSTRACT

Described are devices, systems and methods for scheduling multi-user (MU) multiple input multiple output (MIMO) transmissions in a fixed wireless access (FWA) system. One method for scheduling a large number of user devices in a wireless communication system includes a preselection process to pare down the number of user devices to be simultaneously scheduled, and then scheduling that subset of users. In an example, and assuming each user device com-
(Continued)

municates over a corresponding wireless channel, the preselection process includes determining a number of sets based on a first characteristic of the wireless channels, where each set includes at least one user device, and then determining a subset of user devices by selecting at most one user device from each of the sets. The scheduling of the selected subset of users is based on a scheduling algorithm and a second characteristic of the wireless channels.

19 Claims, 53 Drawing Sheets

Related U.S. Application Data filed on Mar. 9, 2018, provisional application No. 62/640,295, filed on Mar. 8, 2018.

(51) Int. Cl.
  *H04B 7/06* (2006.01)
  *H04L 5/00* (2006.01)
  *H04W 72/12* (2009.01)

(52) U.S. Cl.
  CPC .......... *H04L 5/0037* (2013.01); *H04L 5/0062* (2013.01); *H04W 72/121* (2013.01)

(58) Field of Classification Search
  CPC ..... H04L 5/006; H04L 5/0062; H04L 1/0077; H04W 72/121; H04W 4/08
  See application file for complete search history.

(56) References Cited

U.S. PATENT DOCUMENTS

| | | | |
|---|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,327,812 B2 | 2/2008 | Auer |
| 7,392,018 B1 | 6/2008 | Ebert et al. |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,667,307 B1 | 5/2017 | Hadani et al. |
| 9,668,148 B2 | 5/2017 | Hadani et al. |
| 9,712,354 B2 | 7/2017 | Hadani et al. |
| 9,722,741 B1 | 8/2017 | Rakib et al. |
| 9,729,281 B2 | 8/2017 | Hadani et al. |
| 10,651,912 B2 | 5/2020 | Wang et al. |
| 10,667,148 B1 | 5/2020 | Hadani et al. |
| 10,681,568 B1 | 6/2020 | Hadani et al. |
| 10,693,581 B2 | 6/2020 | Rakib et al. |
| 10,693,692 B2 | 6/2020 | Hadani et al. |
| 10,716,095 B2 | 7/2020 | Rakib et al. |
| 10,749,651 B2 | 8/2020 | Hebron et al. |
| 10,826,728 B2 | 11/2020 | Tsatsanis et al. |
| 10,855,425 B2 | 12/2020 | Kons et al. |
| 10,873,418 B2 | 12/2020 | Kons et al. |
| 10,886,991 B2 | 1/2021 | Akoum et al. |
| 11,050,530 B2 | 6/2021 | Wang et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0095907 A1 | 5/2004 | Agee et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0225936 A1 | 9/2008 | Hong et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0253381 A1 | 10/2009 | Zhang et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |

(56) References Cited

U.S. PATENT DOCUMENTS

| | | |
|---|---|---|
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0301746 A1* | 11/2013 | Mobasher ............... H04B 7/024 375/267 |
| 2013/0315133 A1 | 11/2013 | Wang et al. |
| 2014/0143639 A1 | 5/2014 | Loghin et al. |
| 2014/0161091 A1 | 6/2014 | Adhikary et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0254495 A1 | 9/2014 | Farmanbar et al. |
| 2014/0348252 A1 | 11/2014 | Siohan et al. |
| 2014/0364128 A1 | 12/2014 | Lee et al. |
| 2015/0023439 A1* | 1/2015 | Dimou ................. H04L 1/0006 375/260 |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehran et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0288913 A1 | 10/2017 | Rakib et al. |
| 2017/0289961 A1 | 10/2017 | Rakib et al. |
| 2018/0109284 A1 | 4/2018 | Hadani et al. |
| 2018/0167165 A1 | 6/2018 | Kons et al. |
| 2018/0205481 A1 | 7/2018 | Rakib et al. |
| 2018/0227159 A1 | 8/2018 | Rakib et al. |
| 2018/0242170 A1 | 8/2018 | Hadani et al. |
| 2018/0262306 A1 | 9/2018 | Hadani et al. |
| 2018/0288809 A1 | 10/2018 | Delfeld et al. |
| 2018/0302802 A1 | 10/2018 | Fanfelle |
| 2019/0036577 A1 | 1/2019 | Delfeld et al. |
| 2019/0036741 A1 | 1/2019 | Hadani et al. |
| 2019/0044682 A1 | 2/2019 | Hebron et al. |
| 2019/0075551 A1 | 3/2019 | Hadani et al. |
| 2019/0081836 A1 | 3/2019 | Hadani et al. |
| 2019/0159177 A1 | 5/2019 | Rakib et al. |
| 2019/0173617 A1 | 6/2019 | Kons et al. |
| 2019/0173630 A1 | 6/2019 | Kons et al. |
| 2019/0215109 A1 | 7/2019 | Hadani et al. |
| 2019/0238189 A1 | 8/2019 | Delfeld et al. |
| 2019/0327054 A1 | 10/2019 | Kons et al. |
| 2019/0342126 A1 | 11/2019 | Hadani et al. |
| 2019/0342136 A1 | 11/2019 | Hadani et al. |
| 2019/0379422 A1 | 12/2019 | Hadani et al. |
| 2020/0045562 A1 | 2/2020 | Hadani et al. |
| 2020/0119868 A1 | 4/2020 | Rakib et al. |
| 2020/0137774 A1 | 4/2020 | Molisch et al. |
| 2020/0145273 A1 | 5/2020 | Rakib et al. |
| 2020/0153107 A1 | 5/2020 | Rakib |
| 2020/0186397 A1 | 6/2020 | Tsatsanis et al. |
| 2020/0204309 A1 | 6/2020 | Namboodiri |
| 2020/0204410 A1 | 6/2020 | Hadani |
| 2020/0228170 A1 | 7/2020 | Delfeld et al. |
| 2020/0259604 A1 | 8/2020 | Hadani et al. |
| 2020/0259692 A1 | 8/2020 | Hadani et al. |
| 2020/0259697 A1 | 8/2020 | Delfeld |
| 2020/0280138 A1 | 9/2020 | Fanfelle et al. |
| 2020/0287672 A1 | 9/2020 | Namboodiri et al. |
| 2020/0288333 A1 | 9/2020 | Rakib et al. |
| 2020/0305010 A1 | 9/2020 | Hadani et al. |
| 2020/0313695 A1 | 10/2020 | Namboodiri et al. |
| 2020/0313949 A1 | 10/2020 | Hadani |
| 2020/0322185 A1 | 10/2020 | Kons et al. |
| 2020/0322202 A1 | 10/2020 | Hadani et al. |
| 2020/0351836 A1 | 11/2020 | Rakib et al. |
| 2020/0367252 A1 | 11/2020 | Hebron et al. |
| 2020/0389268 A1 | 12/2020 | Sathyanarayan et al. |
| 2020/0403829 A1 | 12/2020 | Namboodiri et al. |
| 2021/0028877 A1 | 1/2021 | Rakib et al. |
| 2021/0036823 A1 | 2/2021 | Hebron et al. |
| 2021/0058114 A1 | 2/2021 | Molisch et al. |
| 2021/0077625 A1 | 3/2021 | Kons et al. |
| 2021/0105155 A1 | 4/2021 | Kons et al. |
| 2021/0126750 A1 | 4/2021 | Kons et al. |
| 2021/0135905 A1 | 5/2021 | Kons et al. |
| 2021/0194732 A1 | 6/2021 | Kons et al. |

FOREIGN PATENT DOCUMENTS

| | | |
|---|---|---|
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011455 | 1/2017 |
| WO | 2017011478 | 1/2017 |
| WO | 2017044501 | 3/2017 |
| WO | 2017087706 | 5/2017 |
| WO | 2017100666 | 6/2017 |
| WO | 2017147439 | 8/2017 |
| WO | 2017165697 | 9/2017 |
| WO | 2017173160 | 10/2017 |
| WO | 2017173389 | 10/2017 |
| WO | 2017201467 | 11/2017 |

(56) References Cited

FOREIGN PATENT DOCUMENTS

| | | |
|---|---|---|
| WO | 2018031938 | 2/2018 |
| WO | 2018031952 | 2/2018 |
| WO | 2018032016 | 2/2018 |
| WO | 2018064587 | 4/2018 |
| WO | 2018064605 | 4/2018 |
| WO | 2018106731 | 6/2018 |
| WO | 2018129554 | 7/2018 |
| WO | 2018140837 | 8/2018 |
| WO | 2018191309 | 10/2018 |
| WO | 2018195548 | 10/2018 |
| WO | 2018200567 | 11/2018 |
| WO | 2018200577 | 11/2018 |
| WO | 2019014332 | 1/2019 |
| WO | 2019032142 | 2/2019 |
| WO | 2019032605 | 2/2019 |
| WO | 2019036492 | 2/2019 |
| WO | 2019051093 | 3/2019 |
| WO | 2019051427 | 3/2019 |
| WO | 2019055861 | 3/2019 |
| WO | 2019068053 | 4/2019 |
| WO | 2019060596 | 5/2019 |
| WO | 2019089986 | 5/2019 |
| WO | 2019113046 | 6/2019 |
| WO | 2019157230 | 8/2019 |
| WO | 2019173775 | 9/2019 |
| WO | 2019241436 | 12/2019 |
| WO | 2019241589 | 12/2019 |
| WO | 2020142520 | 7/2020 |
| WO | 2020206304 | 10/2020 |
| WO | 2020227619 | 11/2020 |
| WO | 2020247768 | 12/2020 |
| WO | 2021026212 | 2/2021 |
| WO | 2021062354 | 4/2021 |

OTHER PUBLICATIONS

Tu, et al., "Multiuser diversity for a dirty paper approach", Article [online]. Apr. 12, 2016; [retrieved online: Mar. 5, 2019] <URL: https://www.researchgate.net/publication/3416950_Multiuser_diversity_for_a_dirty_paper_approach>; DOI: 10.1109/LCOMM.2003.815652; 3 pages.

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online], Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

"AT&T Annual Report 2014," Opening Our Network [Online], Retrieved from the Internet: Sep. 22, 2016. <URL http://www.att.com/Investor/ATT_Annual/2014/att_introduces_new_concepts_for_telecom_network.html>, 5 pages.

Catt, "UL ACK/NACK transmission methods for LTE-A," 3GPP TSG RAN WG1 Meeting #60bis, R1-102453, Beijing, China, Apr. 12-16, 2010, 8 pages.

Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.

Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).

Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.

Hadani, et al. "Orthogonal Time Frequency Space Modulation," 2017 IEEE Wireless Communication and Networking Conference, Mar. 19, 2017 XP033095965 6 pages.

Extended European Search Report, EP Application No. 19764959.3, dated Oct. 25, 2021, 12 pages.

\* cited by examiner

| Persons | Job | | | |
| --- | --- | --- | --- | --- |
| | J1 | J2 | J3 | J4 |
| I | 86 | 78 | 62 | 81 |
| II | 55 | 79 | 65 | 60 |
| III | 72 | 65 | 63 | 80 |
| IV | 86 | 70 | 65 | 71 |
| V | 72 | 70 | 71 | 60 |

FIG. 5

SCHEDULING MULTI-USER MIMO TRANSMISSIONS IN FIXED WIRELESS ACCESS SYSTEMS

CLAIM OF PRIORITY

This patent document is a 371 of International Patent Application No. PCT/US2019/021455, filed Mar. 8, 2019, entitled "SCHEDULING MULTI-USER MIMO TRANSMISSIONS IN FIXED WIRELESS ACCESS SYSTEMS" which claims the benefit of priority of U.S. Provisional Patent Application 62/640,295, filed on Mar. 8, 2018, entitled "SCHEDULING MULTI-USER MIMO TRANSMISSIONS IN FIXED WIRELESS ACCESS SYSTEMS," U.S. Provisional Patent Application 62/641,140, filed on Mar. 9, 2018, entitled "SCHEDULER FOR FIXED WIRELESS ACCESS SYSTEM," and U.S. Provisional Patent Application 62/746,505, filed on Oct. 16, 2018, entitled "FRACTIONAL BEAM SCHEDULING IN WIRELESS SYSTEMS," all of which are incorporated by reference in their entirety herein.

TECHNICAL FIELD

This patent document is directed generally to wireless communication, and more specifically to scheduling in wireless communication systems.

BACKGROUND

World-wide demand for wireless communication bandwidth is continually increasing. New technologies that increase the amount of data that can be transmitted per Hertz of frequency resources per unit time are continually being introduced. Furthermore, to achieve scale of economy, network operators are looking at new technologies that can accommodate a larger number of wireless users in a given geographic region than ever possible before.

SUMMARY

Disclosed are devices, systems and methods for scheduling multi-user (MU) multiple input multiple output (MIMO) transmissions in a fixed wireless access (FWA) system that includes a large number of user devices. In some embodiments, efficient scheduling may be achieved by implementing a preselection procedure to pare down the number of users to be considered for being simultaneously scheduled based on a first characteristic of a wireless channel, and then actually scheduling a subset of those users based on a second characteristic of a wireless channel.

In one aspect, a method for scheduling a plurality of user devices in a wireless communication system is disclosed. Using the method, each of the plurality of user devices is configured to communicate over a corresponding one of a plurality of wireless channels. This method includes determining a plurality of sets based on a first characteristic of the plurality of wireless channels, where each of the plurality of sets comprises at least one of the plurality of user devices, determining a subset of user devices by selecting at most one user device from each of the plurality of sets, and scheduling simultaneous transmissions by each of the subset of user devices based on a scheduling algorithm and a second characteristic of the plurality of wireless channels.

In another example aspect, another method for determining a schedule for a plurality of users over a plurality of beams in a set of time-frequency resources, comprising: determining an objective function to optimize a metric, wherein the objective function is based on a maximum latency and transmit power for each of the plurality of users and a plurality of channel metrics between the plurality of users and the plurality of beams; and optimizing the objective function using an optimization algorithm to generate the schedule, wherein the schedule comprises an assignment of each of the plurality of users to each of the plurality of beams in one or more of the set of time-frequency resources.

In another example aspect, a method for scheduling transmissions in a wireless network is disclosed. The method includes determining a plurality of groups by grouping user devices, where each of the plurality of groups corresponds to one of multiple transmission beams, partitioning user devices in each of the plurality of groups into one or more sub-groups according to a transmission metric for each user device, which is a measure of a wireless channel between a network node and the corresponding user device, and scheduling transmissions between the network node and the user devices based on time-multiplexing and multiplexing the multiple transmission beams, where a difference between the transmission metrics of user devices served at a same time or using a same transmission beam is above a threshold.

In another exemplary aspect, a method for scheduling transmissions in a wireless network is disclosed. The method includes determining a plurality of sub-groups by grouping user devices based on a transmission metric for each user device, which is a measure of a wireless channel between a network node and the corresponding user device, determining a subset of user devices, where the subset comprises at most one user device from each of the plurality of sub-groups, and where a difference between the transmission metrics of each pair of user devices in the subset is greater than a threshold, and scheduling simultaneous transmissions between the network node and the subset of user devices using multiple transmission beams.

The above and other aspects and features of the disclosed technology are described in greater detail in the drawings, the description and the claims.

BRIEF DESCRIPTION OF THE DRAWINGS

FIG. 5 shows an example data representation in a tabular form.

DETAILED DESCRIPTION

Figure 1:
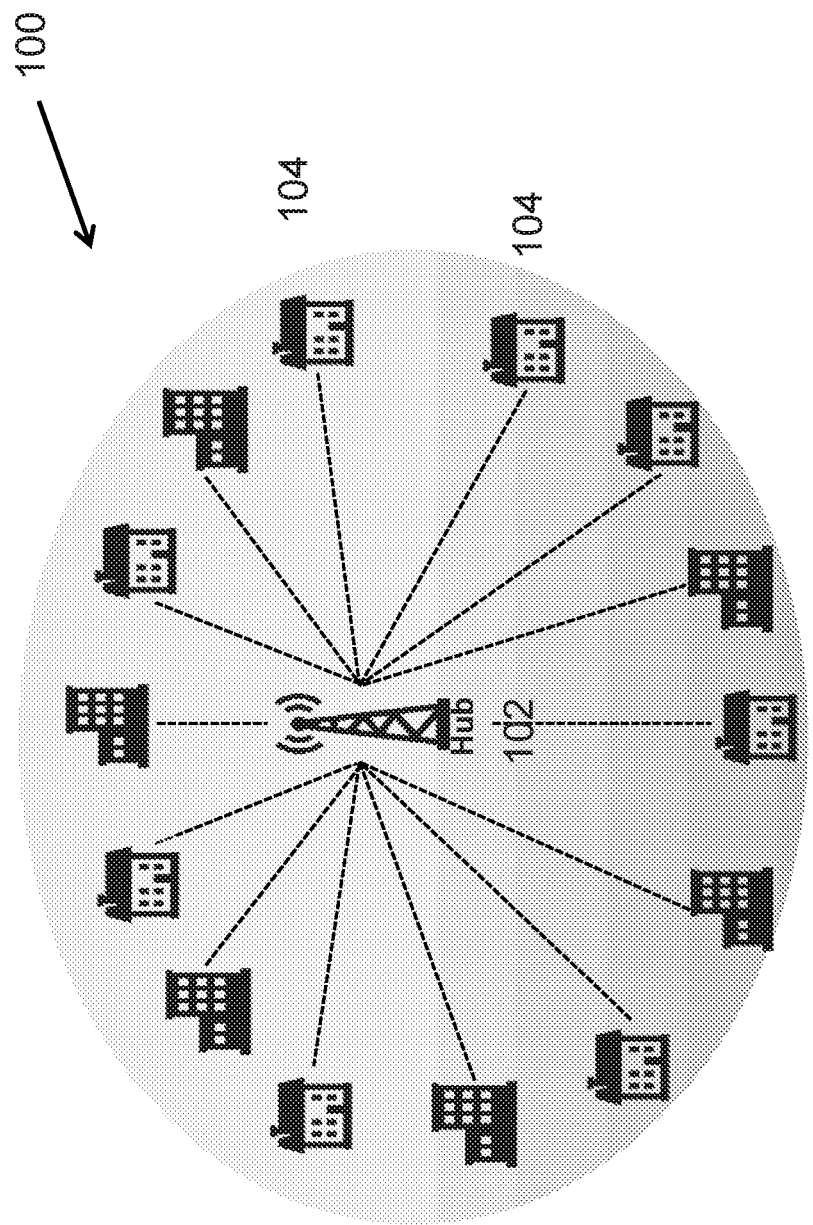
FIG. 1 shows an example of a fixed wireless access network.

Existing systems that feature scheduling in multi-user (MU) multiple input multiple output (MIMO) systems include mobile systems, where the channel can change very significantly over a short period of time, as well as systems with wireline channels or other channels that show minimal time variations and negligible interference between users. MU-MIMO scheduling in fixed wireless access (FWA) systems, which are characterized by (i) small, but not negligible time variations and (ii) significant interference between users, is an active area of technological research and implementation.

FWA channels may be characterized by small but non-negligible time variations. In other words, the FWA channel has a time-invariant part, with time-varying components stemming from moving scatterers superimposed on it. The ratio of the power in the time-invariant to that in the time-variant part is known as the temporal Rice factor. In exemplary scenarios, this factor may be >10 dB.

Since the power of the time-invariant portion may be 10 dB greater than the power of the time-variant portion, a first general guideline for scheduling in FWA channels may be that the scheduling, e.g., selecting which user is assigned to what tempo-spectral resources, is based only on the time-invariant part of the channel. In an example, the use of this guideline simplifies the scheduling, and may obviate the need to gain full CSI (channel state information) for all users before scheduling can be achieved. However, in contrast to truly time-invariant channels, the choice of rate (modulation and coding scheme) may need to be based on the actual channel at the time of transmission, not just the time-invariant part.

In an example, scheduling in FWA channels may use orthogonal time frequency space (OTFS) modulation. OTFS may be advantageous since it may smooth out residual variations, and thus reduces the sensitivity of MCS to extrapolation errors in the CSI. In other examples, the techniques presented in this document are suitable for other modulation/multiple access formats as well, in particular orthogonal frequency division multiplexing (OFDM) or OFDM-Access (OFDMA).

A typical wireless network may include hundreds, or even thousands, of wireless devices communicating at any given time. To avoid transmissions from these wireless devices to corrupt each other's transmissions, many networks use transmission schemes in which most devices transmit (or receive) signals according to a schedule that is typically announced on the network ahead of the time interval during which the schedule is to be effective.

The task of calculating and announcing the schedule is often performed by a network-side device such as a base station or an access point. Scheduling can affect the performance of a wireless network. This patent document describes several techniques for scheduling transmissions in a wireless network such as a fixed wireless access network.

The present document is organized in various sections for ease of understanding. In Sections indexed as "A" sections, techniques and embodiments for scheduling MIMO transmissions in a wireless system, specifically fixed wireless system are disclosed. Among these sections, A1 describes an example of a scheduling approach, A2 discloses metrics that can be used for scheduling, A3 discloses examples of power control considerations for downlink scheduling, A4 surveys some existing scheduling algorithms, and A5 discloses a technique in which some UEs may be pre-selected for scheduling.

Sections indexed as "B" sections disclose additional embodiments of schedulers for fixed wireless access system scheduling. Various scheduling approaches that use, for example, greedy. Optimization based, graph based or probabilistic scheduling are described in Sections B1 to B16.

In Sections index as "C" sections, another scheduling technique, called fractional beam scheduling technique, and corresponding various embodiments are disclosed. An example technique includes determining a plurality of groups by grouping user devices, where each of the plurality of groups corresponds to one of multiple transmission beams, partitioning user devices in each of the plurality of groups into one or more sub-groups according to a transmission metric for each user device, which is a measure of a wireless channel between a network node and the corresponding user device, and scheduling transmissions between the network node and the user devices based on time-multiplexing and multiplexing the multiple transmission beams, where a difference between the transmission metrics of user devices served at a same time or using a same transmission beam is above a threshold. The scheduler embodiments described in the A and B sections may be used together with the fractional beam scheduling technique described in the C sections of the present document.

FIG. 1 shows an example of a fixed wireless access system 100. A hub 102, that includes a transmission facility such as a cell tower, is configured to send and receive transmissions to/from multiple locations 104. For example, the locations could be user premises or business buildings. As described throughout this document, the disclosed embodiments can achieve very high cell capacity in fixed wireless access, when compared to traditional fixed access technology. Some techniques disclosed herein can be embodied in implementations at the hub 102 or at transceiver apparatus located at the locations 104.

Figure 2:
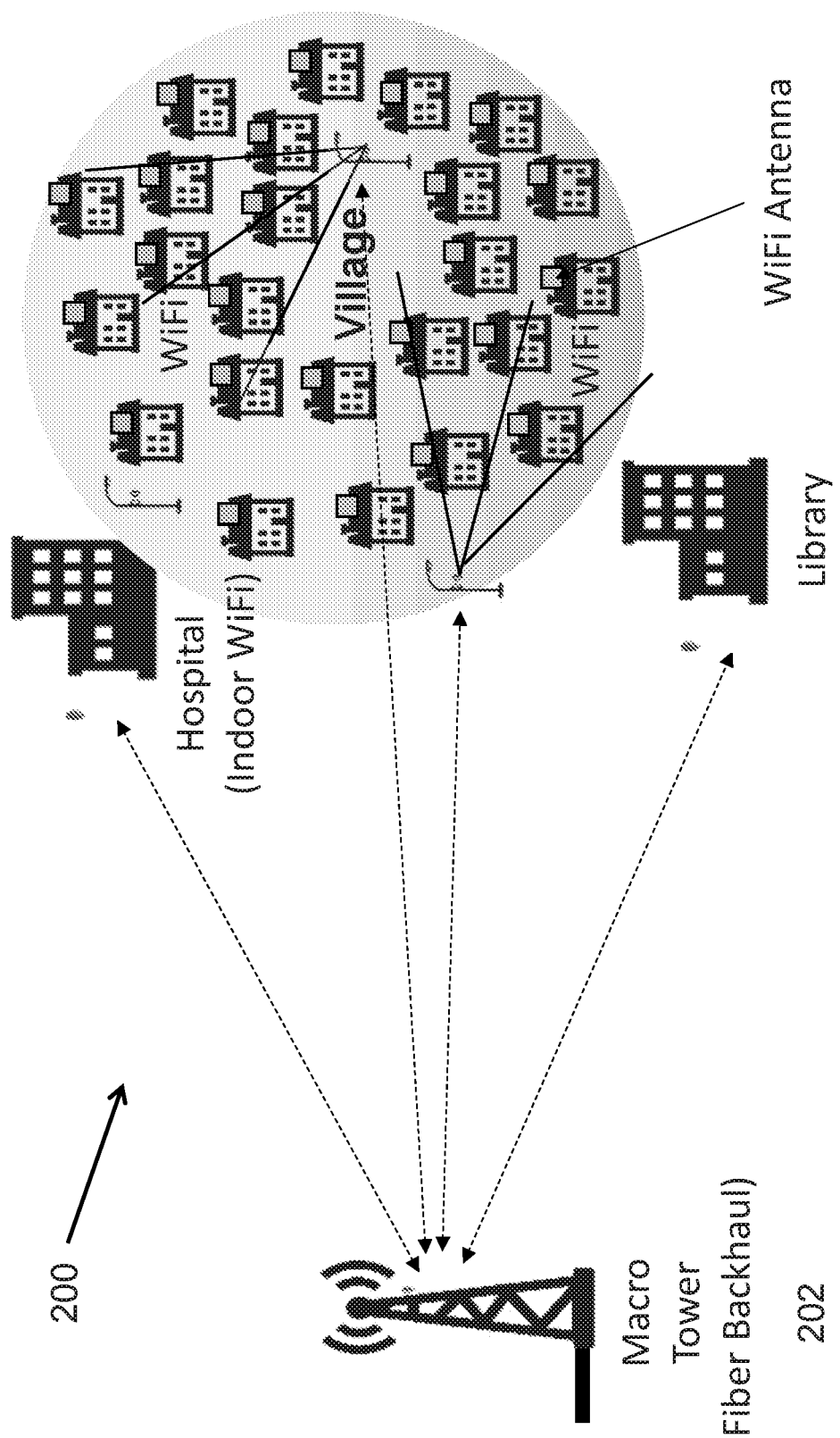
FIG. 2 shows another example of a fixed wireless access network.

FIG. 2 shows yet another configuration of a fixed access wireless communication system 200 in which hops are used to reach users. For example, one cell tower may transmit/receive from another cell tower, which would then relay the transmissions between the principal cell tower and the users, thus extending range of the fixed wireless access system. A backhaul may connect the transmission tower 202 with an aggregation router. For example, in one configuration, a fiber connection may be used to feed data between a base station at a hub and a fiber hub aggregation router. In one advantageous aspect, deployment of this technology can be achieved without having to change any network bandwidth characteristics for harder to reach areas by using the hub/home access point (AP) configuration as a launch point. For example, embodiments may be able to reduce the overhead of pilot signals and re-purpose that bandwidth to data transmission. Some techniques disclosed herein can be embodied in implementations at the macro tower 202 or at transceiver apparatus located at the other locations.

The techniques disclosed in the present document provide solutions for scheduling MU-MIMO transmissions in an FWA system. Section headings have been used only for the ease of understanding and do not in any way limit the scope of the disclosed technology.

The techniques disclosed in the present document provide solutions for scheduling jobs to users in a fixed wireless access (FWA) system efficiently and with low-complexity.

In the A sections, some embodiments of the disclosed technology are provided, which overviews an uplink scheduler in an FWA system, and provides the mathematical formulation and exemplary scheduling embodiments.

Some embodiments of the disclosed technology are provided, which overviews a dynamic bandwidth scheduler that accounts for quality of service considerations and interference between users.

Some embodiments of the disclosed technology are provided, which overviews various scheduler embodiments including greedy schedulers, look-up table schedulers, and static schedulers.

Figure 11A:
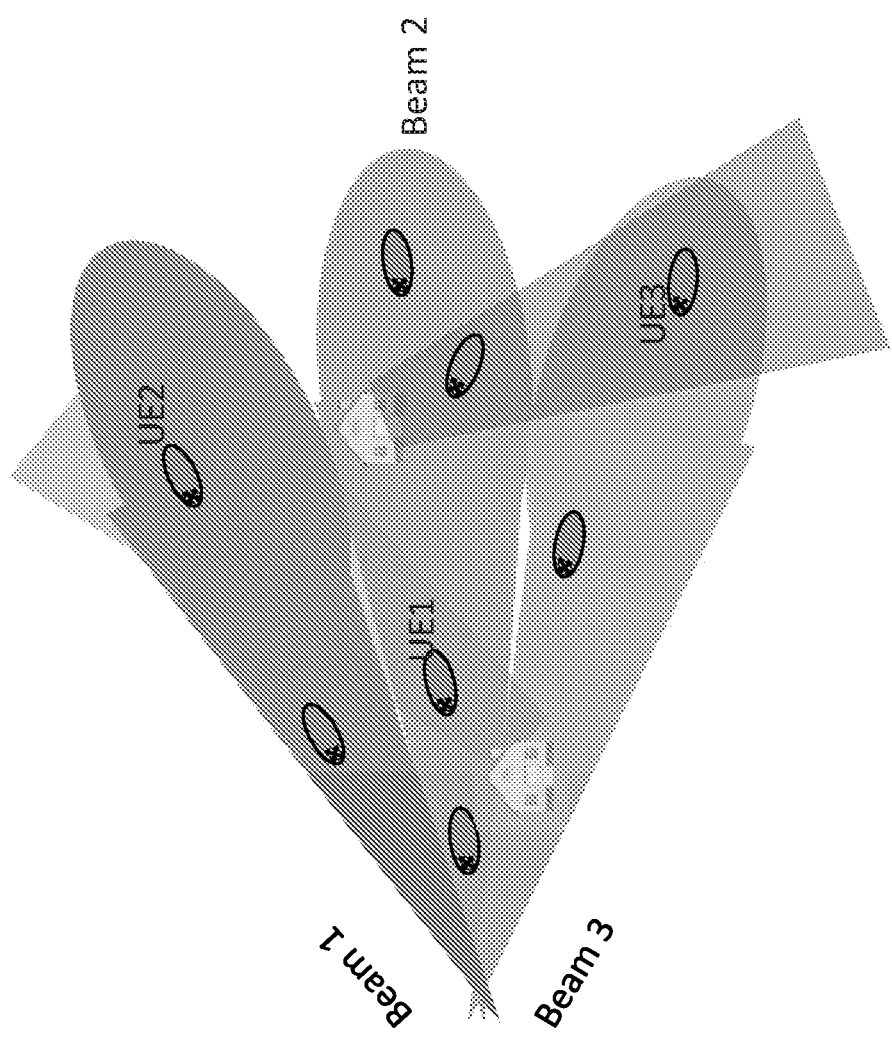
FIG. 11A shows an example of a multi-beam scenario.
Figure 11B:
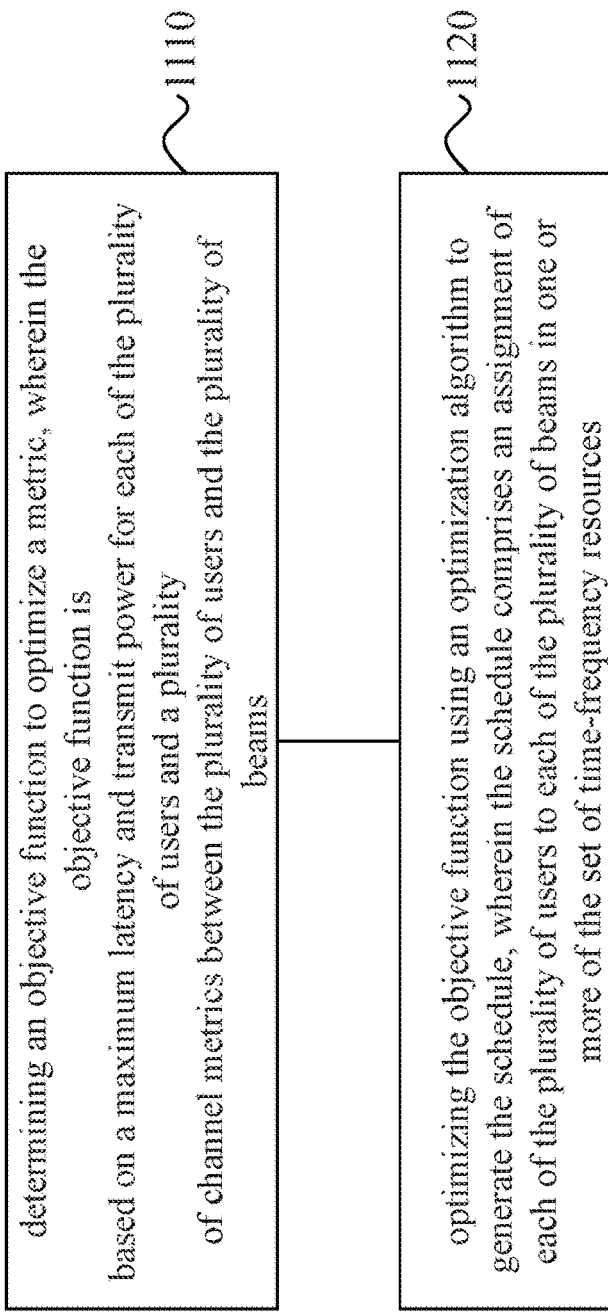
FIG. 11B shows a flowchart for an example method of wireless communication.

FIG. 11B is a flowchart for an example method 1100 for determining a schedule for a plurality of users over a plurality of beams in a set of time-frequency resources. The method 1100 includes determining (1102) an objective function to optimize a metric, wherein the objective function is based on a maximum latency and transmit power for each of the plurality of users and a plurality of channel metrics between the plurality of users and the plurality of beams, and optimizing (1104) the objective function using an optimization algorithm to generate the schedule, wherein the schedule comprises an assignment of each of the plurality of users to each of the plurality of beams in one or more of the set of time-frequency resources.

In this method, the metric comprises a maximum throughput for the plurality of users. In some embodiments, the metric further comprises a plurality of throughputs for each of the plurality of users. In some embodiments, the optimization algorithm is based on a greedy policy. In some embodiments, the optimization algorithm is based on a brute-force policy. In some embodiments, the one or more of the set of time-frequency resources are contiguous.

A1. An Exemplary Scheduling Approach

Another consideration when scheduling in a MU-MIMO system is that even if the wireless channel is considered time-invariant, the importance of data for the different users is usually not. If the only goal were rate maximization, and all users had a continuously full buffers (two assumptions that are often made in state of the art algorithms published in scientific papers), then scheduling in the FWA channel would be a static process that would have to be done only once. However, since in practice all packets have different deadlines, and arrivals at the transmit nodes are random, every data frame may require a re-evaluation of the utility that can be obtained with a particular schedule.

In contrast to wireline channels, the interference in MU-MIMO channels ensures that the scheduling of each users impacts the rate at which all other users can transmit. Thus, the scheduling process is still quite complicated, and in principle may require the solution of a computationally hard problem within each timeframe.

One technique that may be used for complexity reduction is the "paring down" of user combinations that are tested for their utility. For example, some scheduler settings are unlikely in their face to provide useful solutions, and thus should not even be tested. For mobile systems, such preselection algorithms may be based on the second-order statistics of the users. In a beam-spaced system, this may be interpreted as "two users with strongly overlapping power angular spectra should not be scheduled at the same time" even if there are instantiations in which they may be scheduled together because of particular instantaneous channel realizations.

In some embodiments, scheduling in FWA systems include the pre-selection algorithm, not based on the second-order statistics, but rather on the time-invariant part of the channel. This may be understood from the fact that the time-invariant parts of the channel are local realizations of the space-variant (not time-variant) fading pattern induced by the multipath components interacting with time-invariant scatterers. Thus, the channel vectors of two users might be orthogonal to each other even if the second-order statistics taken over the spatial ensemble (related to the angular power spectrum) are strongly overlapping.

A2. Exemplary Metrics for Scheduling

In some embodiments, the precoding for the downlink may be examined when the overall throughput is to be maximized. As an example, the following discussion assumes that the goal is the maximization of the sum of the weighted capacities for the different users $$U = \sum_{i \in \mathcal{L}} w_i C_i \quad (1)$$

where U is the utility function, $C_1$ is the capacity of the i-th user, $w_1$ is the weight of that user, and $\mathcal{L}$ is the set of selected users. In an example, the weight $w_1$ may be based on the backlog and the deadlines of the packets that need to be transmitted. If all the weights are set to unity, the maximization problem degenerates to the "max sum rate" problem that has been previously explored in the literature.

The capacity $C_1$ may be determined by the power assigned to each user (for the downlink, "power of a user means" power expended at the base station (BS) for the transmission of a signal intended for this user), the precoder, and the noise and inter-cell interference level. In the subsequent examples, is assumed that there is no fast coordination between different cells, so that no CoMP (Coordinated MultiPoint) techniques such as joint transmission of coordinated beamforming may be used, though the techniques described in this document may be generalized and applied to such a scenario. In this scenario, the interference may therefore be considered as spatially white (because beamforming towards different users will "average out" as far as the signal strength in the adjacent cell is concerned), and only the overall control of the power level plays a role in the determination of the adjacent-cell interference.

The aforementioned definitions may be used for the fast selection of the users that are to be scheduled. It is advantageous in that it is a single scalar metric, which allows a unique optimization, and is relatively simple to handle. Formulations that may include inequality constraints (e.g., providing a minimum data rate for all the scheduled users) might make sense in the context of service level agreements, but may require significantly higher mathematical effort, as such problems typically are solved as convex optimization problems with interior point methods (polynomial in complexity, but still very high computational effort).

A3. Examples of Power Control

In some embodiments, power control in the downlink must be considered. As shown in previous systems, increasing the transmit power for a particular user increases the signal power, but at the same time increases the interference to other users. Specifically, consider:

(1) Consider the impact of the transmit power on the adjacent-cell interference. Assuming that there is no coordination between the transmissions at the different BSs (such as joint transmission or coordinated beamforming), any adjacent-cell interference may be judged by the total power that is leaking into the adjacent cell. The particularities of the beamforming at the transmitting BS may impact the spatial distribution of the interference in the victim cell, but since it is not possible to mitigate the impact on particular victim locations (due to the lack of coordination), only the total transmitted power is taken into account.

(2) The transmit power for a user at the cell edge may be chosen to support the required modulation and coding scheme (MCS), which is a parameter that the scheduler may determine. The transmit power P need not be larger than such as to achieve a desired rate $R=\log(1+P/(N_0+I))$, where I is the interference power from the adjacent cell, which may depend on the transmit power of the adjacent cell, and $N_0$ is the noise spectral density (or equivalently, the noise power in a 1 Hz bandwidth). This procedure may be implemented when the cell-edge interference is larger than the noise level, wherein reducing the transmit power equally in both cells does not decrease the overall throughput.

(3) In some embodiments, the power control procedure may be closely related to the type of beamforming considered in the system. For zero-forcing beamforming, each user could in principle have its own power control, since there is by definition no inter-user interference. For dirty-paper coding (DPC), which may be used as a proxy for Tomlinson-Harashima precoding (THP), there is interference to a subset of users, so that a change of the transmit power influences the SINR, and thus the capacity of the other links.

(4) For zero-forcing beamforming, it may be shown that the optimum power distribution converges to the equal power distribution (instead of a water filling solution) for high SNR. This may be used in the selection of the user distribution, since in this situation it is not necessary to optimize over the power distribution for each candidate set. However, this option is based on the assumption of a sum capacity optimization, while the power distribution for a sum utility maximization may be different.

Thus, a low-complexity solution may not be user power control for the scheduling itself, but the optimization of the transmit power for the chosen schedule based on a metric that can either involve the sum utility in the desired cell, or take into account the interference to adjacent cells.

A4. Examples of Existing Scheduling Algorithms

Several algorithms have been proposed for MU-MIMO downlink scheduling. Since these algorithms are based on a particular instantaneous channel realization, they can be used for FWA systems if they are based on the time-invariant part of the channel, as discussed above. In an example, the schedulers may be based on dirty paper coding, which may be optimal, but might lead to more complicated scheduling, or on zero-forcing algorithms. It may be noted that DPC is well approximated by THP.

Capacity results. The capacity equation for dirty-paper coding (DPC) is given by $$R_{\pi(i)} = \log \left| \frac{I + H_{\pi(i)}\left(\sum_{j \geq i} S_{\pi(j)}\right)H_{\pi(i)}^H}{I + H_{\pi(i)}\left(\sum_{j > i} S_{\pi(j)}\right)H_{\pi(i)}^H} \right| \quad (2)$$

where i=1, ... K, and $\pi(i)$ is a particular permutation (sequence) in which the DPC is performed, S is the transmit covariance matrix, and H is the channel matrix. The capacity region is the convex hull of all rates, taken over all permutations $\pi$, and all transmit covariance matrices (which include beamforming and power control) that satisfy Trace $(S_1+S_2+ \ldots ) \leq P_{tot}$, where $P_{tot}$ is the total transmit power.

DPC has an intuitive interpretation as the counterpart to serial interference cancellation (SIC). In SIC, the first decoded user suffers interference from all users. Since the signal from this user may be decoded first, it can then be subtracted from the signals at all antenna elements, and the second decoded user does not suffer interference from this particular user (the one that was decoded first) anymore. The third user does not suffer interference from the first and the second user, and so on. DPC does something similar in the downlink, but the determination of which user should be added may be more complicated. Furthermore, the optimization of the covariance matrices may be difficult, because the rate region is neither a concave nor a convex function of the covariance matrix.

The determination of the rate region for the downlink is based on the fact that each broadcast (downlink) channel has a dual multiple access channel (MAC) (uplink) such that the capacity region of broadcast and MAC channel is the same if there is a sum power constraint on the MAC (e.g. sum of the powers at the UEs has to be the same as the total transmit power of the BS). In this example, the capacity is given by $$C_{union} = \cup_{\Sigma P_i < P}\{\Sigma R_1 \leq \log|I+\Sigma_1 H_1^H P_1 H|\}. \quad (3)$$

Furthermore, the equations for the transformations between the broadcast and MAC precoding matrices have been derived in the literature.

It may be noted that for the MAC channel, the order of the decoding does play a role, because the capacity is achieved by superposition coding. Depending on the decoding order, and the power allocation, different points of the rate region can be achieved. Optimization of the utility is equivalent to finding a point in the rate region boundary that is tangent to a line that is determined by the weights $w_1$. That point should be a corner point corresponding to successive decoding in order of increasing weight, e.g., the user with the highest weight should be decoded last and, therefore, sees no interference. Some system implementations also include a numerically efficient method for the sum rate optimization.

Thus, the optimal scheduling can be achieved by considering, for each combination of scheduled users, the equivalent MAC channel, determining the optimum utility according to the procedure described above, and finally picking the largest one.

Greedy scheduling with ZF-DPC. A simplified, greedy algorithm based on zero-forcing (ZF) may include a QR decomposition of the channel matrix between all antenna elements and all users, such that H=GQ, where G is a K×M lower triangular matrix, and Q is an M×M matrix of orthonormal rows. According to this decomposition, each user sees interference from the subsequently decoded channels if no further countermeasures are taken, where $$y_k = g_{k,k} u_k > \Sigma_{j<k} g_{k,j} u_j \quad (4)$$

and the interference may be eliminated by DPC, and thus M interference-free channels with power gains $g_{k,k}$ are available. However, the resulting capacity still depends on the decoding order. Thus, some embodiments may be based on a greedy algorithm:
(1) Let $\mathcal{L}$ be the null space and label all rows unprocessed
(2) Project all unprocessed rows onto the complement of $\mathcal{L}$
(3) Select a row with the highest 2-norm projection and label it processed
(4) Set $\mathcal{L}$ to be the span of all processed rows
(5) Repeat steps 2-4 until there are no non-zero projections
This greedy algorithm can encompass variations that take different utility metrics into account.

Exact solution of the weighted utility maximization. In an example, optimizing the weighted sum rate may be easier than optimizing the sum rate, since the former determines the sequence in which the users are decoded. However, efficient iterative algorithms developed for optimizing the sum rate may not be applicable, and thus, alternate iterative algorithms that solve the weighted sum rate optimization problem may be used.

Scheduling based on zero forcing. In some embodiments, THP is the method of choice for the downlink, whereas in other embodiments, downlink scheduling based on the zero-forcing capacity may be employed since zero-forcing capacity may be computed considerably more easily. Furthermore, zero-forcing combined with scheduling achieves the same capacity as DPC when the number of available users goes to infinity. Intuitively, this may be explained by the fact that when a large number of users is present, a set of users for simultaneous transmission may always be selected for which the noise enhancement in zero-forcing is not significant. However, this model is applicable only for the full-buffer model. If the scheduling is dominated by other factors, such as queue backlogs and packet deadlines, then this asymptotic optimality might not hold.

For the MAC channel, the issue of user selection is identical to that of transmit antenna selection in a hybrid antenna selection scheme. The users correspond to each particular antenna, and at most as many users as there are receive antenna elements may be selected.

In some systems, one approach for selecting users is picking users with quasi-orthogonal properties to the already-selected users. This may be similar to the greedy DPC coding described above, though some practicalities vary. In other systems, each step of an SUS (semi-orthogonal user group) algorithm considers the set of users that is quasi-orthogonal (inner product below a threshold) to the users that have already been selected (to ensure that a newly selected user would not create excessive interference to existing users). For every user within that set, it then calculates, the projection of the channel vector of a possible new user onto the subspace spanned by all previously selected users. Then, the user (among all candidate users, e.g., the ones that have not been selected yet) that has the largest norm of the projection is selected. The set of users that are quasi-orthogonal to all scheduled users is recalculated, the projection for all candidate users is performed, and so on.

One difference between the SUS algorithm and the DPC algorithm is that the SUS algorithm explicitly considers the interference of a newly selected user on the already-scheduled users. In DPC coding, this interference does not occur because it is eliminated with the precoding.

In yet other systems, an algorithm adds a user that maximizes the sum capacity when added. However, a drawback of this approach is the computational effort, since it may require the repeated eigenvalue decomposition when the user is added. In yet other systems, the matrix inversion lemma is used to reduce the complexity of the computations.

A5. Examples of Preselection of User Devices

In exemplary existing systems, there may be hundreds of user devices (equivalently, users) in one cell, and the computational effort of testing all possible combinations each of them in each step of the orthogonalization procedure may be quite significant (although the operation is linear in the number of user devices). Thus, in some embodiments, a preselection of users to reduce the overall effort may be beneficial. The preselection may be done in the fixed wireless access (FWA) system based on the time-invariant part of the channel, while it may be done in a mobile system based on the second-order statistics of the channel.

In some embodiments, the preselection algorithm finds "cones" in a vector space that are quasi-orthogonal to each other. Then, only one user is selected out of each cone; in an example, the user that has the best channel (largest channel norm) and highest weight may be selected. Low interference to/from other scheduled users results because of the quasi-orthogonality between the cones.

An existing algorithm that use a preselection algorithm is directed towards an FDD system that aims to minimize the feedback overhead, and does not focus on the computational effort required. Furthermore, the existing algorithm assumes that scheduling in one timeframe needs the feedback from all possibly scheduled users, which may imply a large overhead. By considering "cones" based on the second order statistics, the number of UEs that have to be considered for feedback is thus drastically reduced.

In some embodiments, the proposed approach first defines a set of cones in vector space (the centers of these cones have to be strictly orthogonal to each other, so they cannot be simply the strongest users). Then a maximum admissible amount of crosstalk between users (a metric that is similar to the minimum SIR, but is not quite the same because it does not take into account the relative strength of the channels that can cross-talk) is defined. This quantity determines the opening angle of the cone; two vectors that are at the boundaries of two cones and have equal strength have a defined minimum SINR.

The determination of the cone opening angle may include a difficult tradeoff: if it were too small, there is an appreciable chance that one of the orthogonal set of cones does not contain any user that has data to transmit; if it were too wide, the possible solution set becomes large or (if the selection of users within the cone prevents this), the savings in computational effort vanish.

In some embodiments, a possible computationally efficient method may be to adjust the opening angle to the average load of the system, to ensure that a sufficient number of prospective candidates is located within the cone. In other embodiments, which may be well suited for parallel processing, first independently schedule users in each cone, and then iteratively try "swapping" users within cones such that users that experience the largest interference might be swapped for other users in the cone if those have higher utility under interference situations. In yet other embodiments, a master list of which users may be combined with each other (based on the time-invariant components) may be determined.

Figure 3:
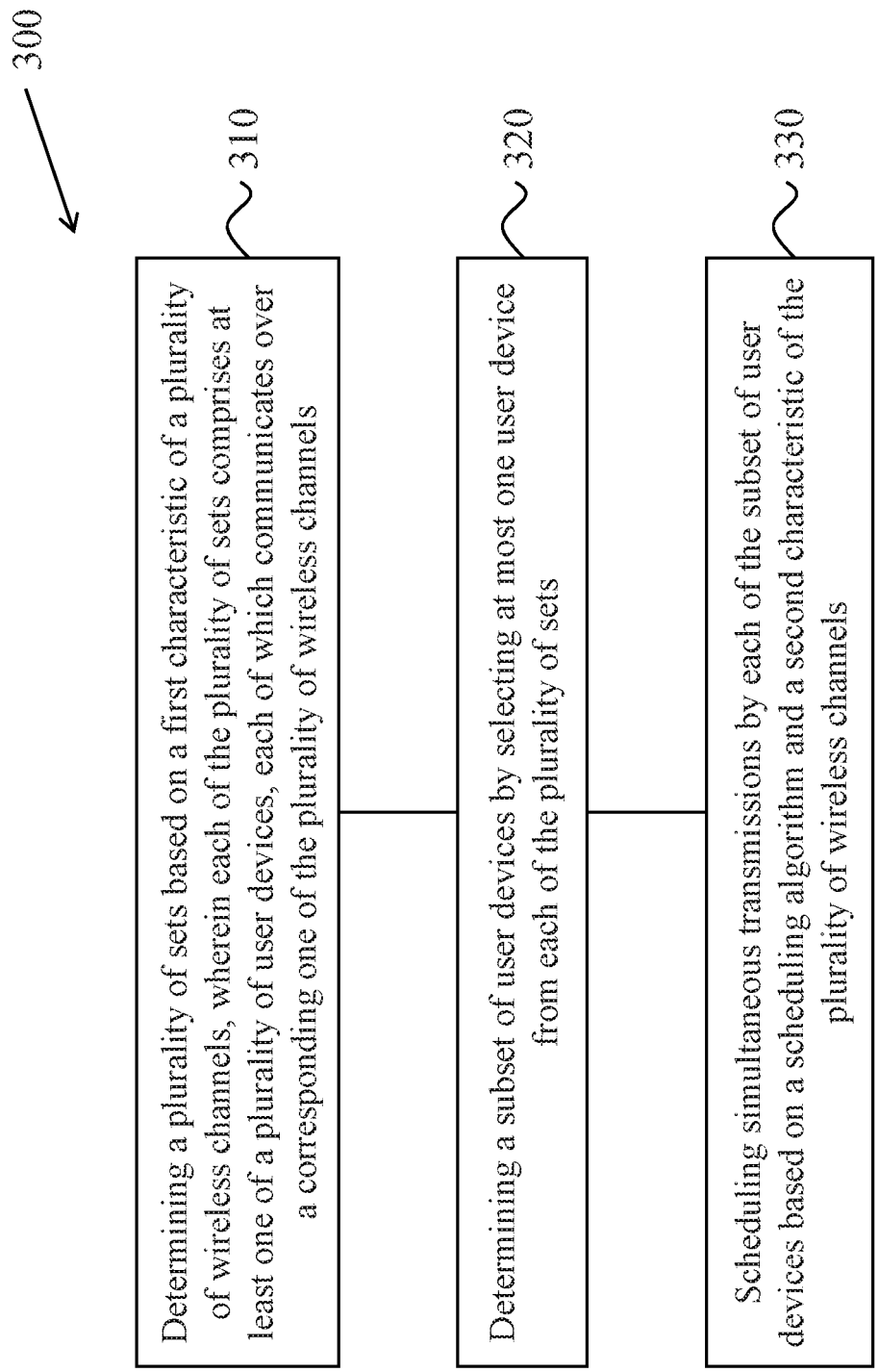
FIG. 3 shows a flowchart of an example for scheduling MU-MIMO transmissions in an FWA system.

FIG. 3 shows a flowchart of an exemplary method for scheduling MU-MIMO transmissions in a wireless communication system. The method 300 includes, at step 310, determining a plurality of sets based on a first characteristic of a plurality of wireless channels, where each of the plurality of sets comprises at least one of a plurality of user devices, and where each of the user devices communicates over a corresponding one of the of wireless channels.

In some embodiments, the wireless communication system is a fixed wireless access (FWA) system, and the first characteristic is a time-invariant portion of the wireless channels. In other embodiments, the wireless communication system is a mobile system, and the first characteristic includes second-order statistics of the wireless channels.

The method 300 includes, at step 320, determining a subset of user devices by selecting at most one user device from each of the plurality of sets.

The method 300 includes, at step 330, scheduling simultaneous transmissions by each of the subset of user devices based on a scheduling algorithm and a second characteristic of the plurality of wireless channels.

In some embodiments, and when the wireless communication system is an FWA system, the second characteristic is the time-varying part of the wireless channels. Furthermore, the user devices that have been scheduled may be assigned a modulation and coding scheme (MCS) based on the second characteristic. In other embodiments, the second characteristic may include both the time-invariant and the time-varying part of the wireless channels. In yet other embodiments, the second characteristic may be identical to the first characteristic.

In some embodiments, each of the wireless channels may be characterized by a channel capacity, and the scheduling algorithm uses an optimization algorithm to maximize a utility function that may be defined as a sum of products of the channel capacities and a set of weights. In an example, the optimization algorithm is a greedy scheduling algorithm with zero-forcing DPC. In another example, the optimization algorithm is an iterative water-filling algorithm. In some embodiments, each of the weights is based on a backlog and deadlines of packets that need to be transmitted by the corresponding user device that is being scheduled.

B1. Scheduling in a Wireless Network

Scheduling Overview

FIG. 5 shows an example table that pictorially depicts the mathematical aspect of scheduling. First column shows resources or people available to perform certain jobs, and the cost of doing these jobs (J1 to J4) is shown in each corresponding entry in the table, e.g., based on rates or charges of each of the person for that job.

A scheduler would schedule the jobs to these people in the "best" manner possible.

In general, scheduling is a NP-hard problem. For most practical considerations, the number of possible schedules to choose from is large. For example, 10 jobs and 20 users willing to do the jobs—6.7e11 possibilities.

Scheduling is generally considered to be an NP-Hard problem. Actually, it could be show that scheduling is NP-Complete.

In wireless networks, jobs may represent transmission resources such as channels, timeslots, antenna beams, etc. In this analogy, people may be the mobile stations (MS) that are wanting to use the transmission resources at a cost that represents network profit such as a throughput by scheduling the particular user device—resource pair.

B2. Example Approach

An example approach may be as follows. The problem may be split into an inner problem and an outer problem. The inner problem may be related to calculating cost of each candidate schedule. The outer problem may be a combinatorial problem. The outer problem may be used to find best weights as quickly as possible to enable arriving at a result that is smaller than the order of scheduling epochs. The following equation shows a mathematical representation of the inner and outer problems.

$$\underbrace{\max_{\mathcal{K}\subseteq\tilde{\mathcal{K}}:|\mathcal{K}|\le c_p} \underbrace{\max_{W,P,\pi} \sum_{k\in\mathcal{K}} \omega_k \log_2(1+SINR_k)}_{\text{Inner problem: } R(\mathcal{K})}}_{\text{Outer problem}} \quad (5)$$

For example, as show in Eq. (5) the inner problem may maximize SINR observed due to scheduling (that is, minimize cost of the schedule) over all K possible combinations of weights for the user devices in a set for which the current schedule is being determined (variable k). While the outer problem may decide which user devices are to be included in the set (served by the scheduler at a given time) from all the user devices in the network.

B3. Exemplary Embodiments

In general, due to the NP completeness of the problem, an efficient algorithm does not exist for the above discussed wireless scheduling problem. Almost all implementations attempt to perform an optimality—complexity tradeoff.

Some embodiments of scheduling algorithms include: (1) Classical Optimization-based, (2) Greedy, (3) Graph-based, and (4) Probabilistic.

B3.1 Classical Optimization-Based Scheduler

Eq. (6) can be used to explain a classical optimization-based scheduler. Using this scheduler, a weighted sum of utility functions U of links with K user devices is maximized, subject to the usage being bounded by an upper limit.

$$\text{maximize} \sum_{k=1}^{K} \xi_{\pi(k)} U_{\pi(k)} \quad (6)$$

$$\text{subject to} \sum_{k=1}^{K} \xi_k p_k \le P$$

-continued $$0 \leq \xi_k p_k \leq P_k \ \forall k \in \overline{\mathcal{K}}$$

$$\sum_{k=1}^{K} \xi_k \leq c_p$$

$$\xi_k \in \{0, 1\} \ \forall k \in \overline{\mathcal{K}}$$

A typical implementation leads to an optimal or close-to-optimal solution with bounded errors. However, such implementations may be difficult to implement practically. The computation of a non-convex interference causes the scheduler lose out on system performance by forcing convexity. Furthermore, such implementations are slow and/or complex.

B3.2. Greedy Scheduler

A scheduler that uses this strategy will typically schedule the next best user which improves the system utility, shrink the set of choices. This process is repeated for every next scheduling decision. In such embodiments, the metric of choosing the next best user significantly impacts the performance. Implementations often do not consider not choosing a user. The step of swap and delete during scheduling increases complexity.

B3.3. Graph-Based Scheduler

Figure 6:
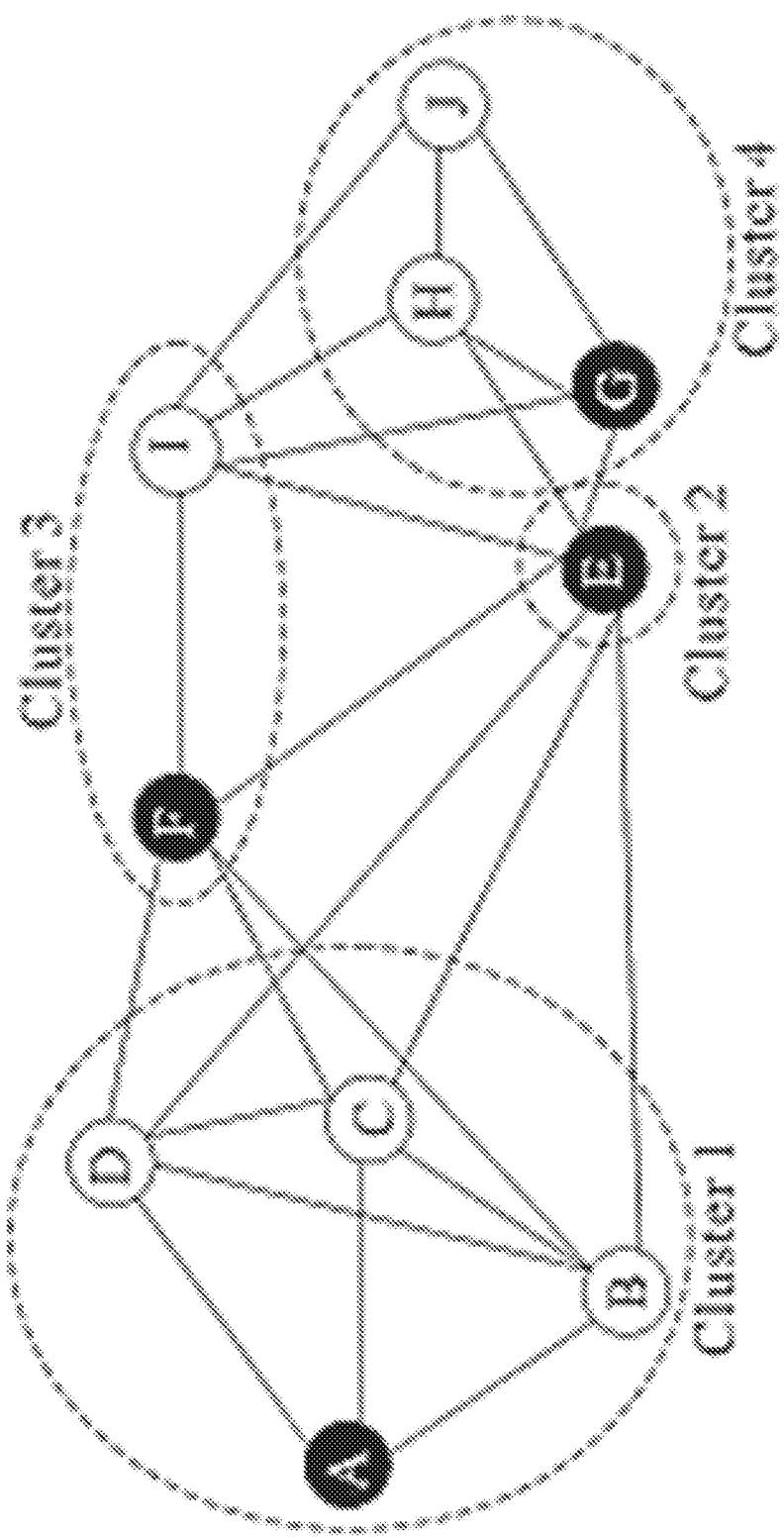
FIG. 6 shows an example of a cluster.

As show in FIG. 6, in these embodiments, cluster nodes based on a pre-defined neighborhood relation (interference threshold, QoS) are constructed. The scheduler then attempts to find the best independent set in each cluster. In general, graph clustering is difficult and this type of max independent set problem is NP hard to solve.

B3.4 Probabilistic Scheduler

A scheduler according to this technique forms a Markov Chain with each possible schedule as a state, sets the transition probability of jumping from one state to the other. This algorithm generally converges to the optimal state with probability 1. The scheduler may be implemented as a distributed implementation. Convergence of such implementations may be slow, depending on the size of the network.

Figure 7:
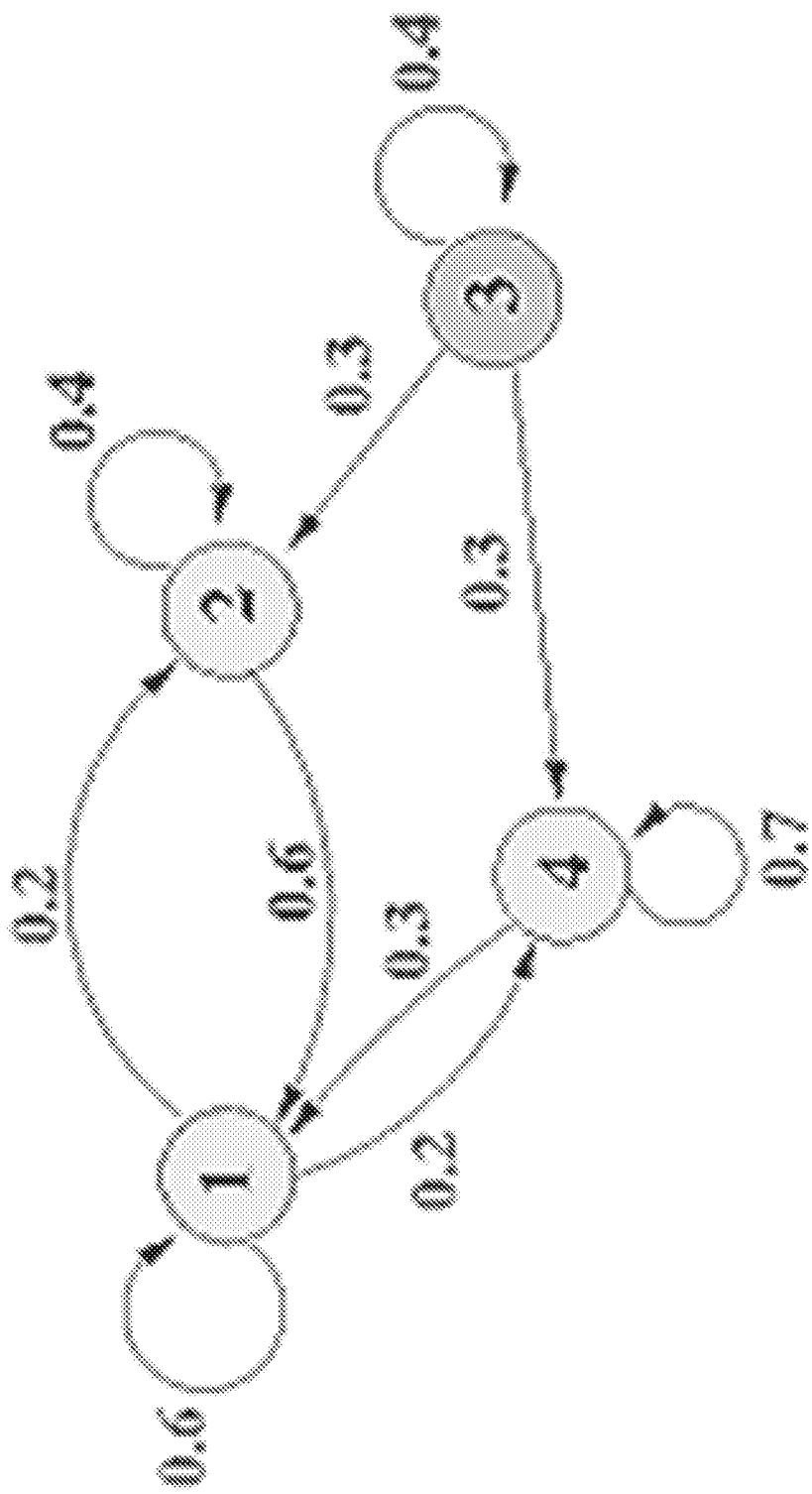
FIG. 7 shows an example of operation of a Markov chain.

FIG. 7 shows an example of Markov chain. Various states (1, 2, 3, 4) are connected to each other via probabilities of transitions.

B3.5 One Example Approach

Given a set of beams and some orthogonal resources and a set of users, this approach may implement a scheduler which considers user priorities, delays and throughput and whose complexity is low.

B3.6 Another Example Approach—Maximum Weighted Matching Scheduler

Figure 8:
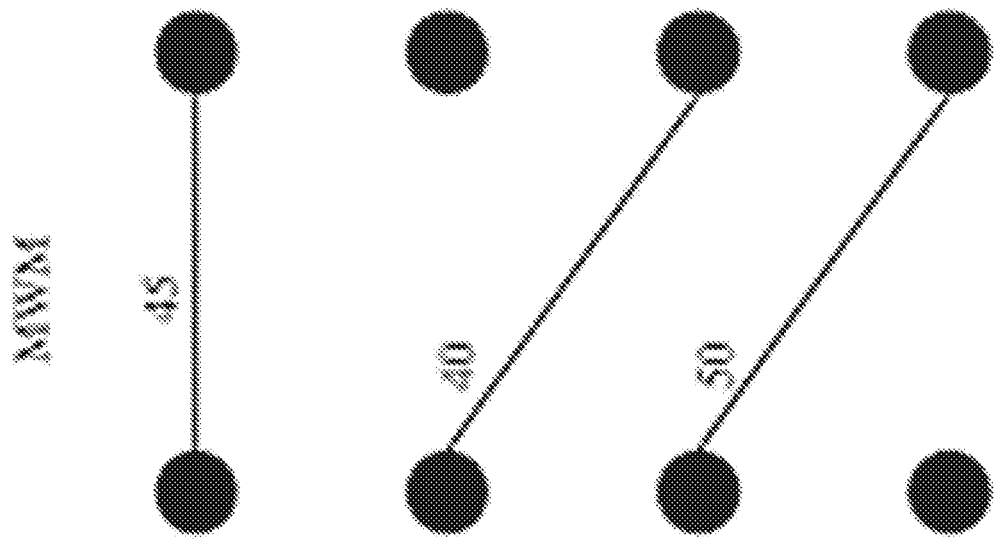
FIG. 8 shows an example implementation of a maximum weighted matching scheduler.
Figure 8:
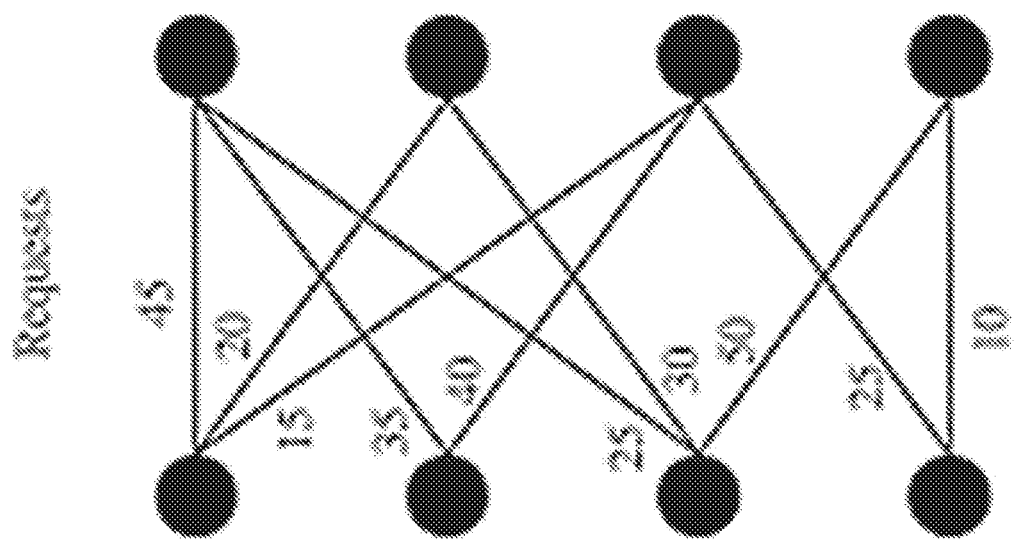

FIG. 8 shows an example of a maximum weighted matching scheduler. Nodes on the left represent beams in all the orthogonal resources. Nodes on the right represent users. The edge Weights represent contribution to the system utility by scheduling the user on the beam.

B3.7 Additional Embodiment Examples

In some embodiments, weights may be chosen to consider user priority, delays and throughput in a manner that makes the solution equivalent to the gradient-based scheduler, which is known to be optimal. In some embodiments, weights may be conservative to deal with interdependence arising out of interference—possible sub-optimality. Furthermore, fast algorithms (e.g. Hungarian algorithm) exist to solve a max weighted matching. Some embodiments perform a performance comparison between the MWM scheduler and a Brute-Force scheduler. An implementation of a Greedy Scheduler that may be used for benchmarking larger scenarios. The comparison may use physical system parameters.

B4. Understanding Uplink Scheduler

This section describes a system Model. The section also provides a description of the problems associated with scheduling. The section also describes a mathematical problem description and the need for heuristics. Some examples of scheduling algorithms considered are described. One example is Max-Wt scheduling. Furthermore, an example implementation of a Max Wt scheduler and Greedy and Look up Table algorithms are disclosed.

B4.2 Example System Model

B4.2.1 Example of a CHANNEL MODEL includes the following: An UL Scheduler, with 10 MHz Bandwidth. The configuration has Multi-beam antennas with 4 non-overlapping antenna beams. A 1 km cell radius is assumed and Single stream with single polarization is assumed. For this example, 10 UEs are assumed to be in the system and a Fixed UE-beam assignment is performed. Traffic Models include Poisson (non-bursty), Uniform (bursty).

B4.2.2. Example of a SCHEDULING MODEL

This example uses the following assumptions:
64 PRBs per beam, 128 symbols per PRB
SLA criterion: max latency (Next Step: Incorporate, min throughput for a UE)
Different PRBs in the same beam are treated independently
Dynamic and instantaneous MCS considered

B4.3 Example Scheduling Approach

Given a set of UEs in the cell, the geometry (i.e physical locations of UEs, far scatterers), the traffic patterns and the individual SLAs for these UEs how can resources be efficiently partitioned among these UEs so that—
Individual SLAs are met (or have a (possibly small) bounded fraction of outage),
System operation is close to capacity (or a (possibly small) bounded fraction away from capacity).

B4.4 Mathematical Formulation $$\max \sum_{p=1}^{64} \sum_{b=1}^{4} W \log_2 \left( 1 + \frac{\sum_{u \in b} \xi_{p,u}^{(b)} p_u g_{u \to b}}{\sum_{b' \neq b} \sum_{u \in b'} \xi_{p,u'}^{(b')} p_{u'} g_{u' \to b} + \text{Noise}} \right) \quad (7)$$

-continued

Sub to $$\sum_{u \in b} \xi_{p,u}^{(b)} \le 1, 1 \le p \le 64, 1 \le b \le 4 \qquad (8)$$

$$\xi_{p,u}^{(b)} \in \{0, 1\}, 1 \le p \le 64, 1 \le b \le 4, u \in b \qquad (9)$$

$$(t - d_u) \sum_{p=1}^{64} \xi_{p,u}^{(b)} \le 0 \; \forall \, u \qquad (10)$$

In the above equations, the following parameters are used.

$\xi^{(b)}_{p,u}$ is a binary indicator variable which is set to 1 if and only if UE u, on beam b, is scheduled on PRB index p. Otherwise, it is set to 0.

$d_u$ is the maximum latency (equivalently, deadline) for UE u.

$p_u$ is the transmit power of UE u.

$g_{u \to b}$ is the channel gain from UE u to beam b. Includes path loss and antenna gains at the UE and the Base station.

This first constraint ensures that each PRB is assigned to at most 1 UE per beam.

The third constraint ensures that no PRB is assigned to UEs whose deadline is in the past i.e. $d_u < t$

B4.5 Heuristic Approximations

Looking for appropriate heuristics which can approximate the solution to the (NP-Hard) optimal scheduling problem.

Two possible levels of tweaking any proposed algorithm:

Optimization metric—different metrics→different scheduling policies→different performance.

Implementation—Greedy, Brute Force.

B4.6 Embodiments of Scheduling Algorithms

One example embodiment may try to obtain Max throughput: may be QoS unaware.

Another embodiment may use a Round Robin technique and thus may not be opportunistic in scheduling.

Another embodiment may use Earliest Deadline First. This embodiment is not throughput aware Another embodiment may use a proportional Fair strategy. This embodiments may have no guarantees of meeting real-time deadlines.

Preferably a scheduler should incorporate system capacity, user SLAs in one scheduling metric.

B4.7 Exemplary Embodiment Max-Weight Scheduling

This embodiment may use the following criteria to prioritize/de-prioritize scheduling a particular U:

What is the throughput of the UE in the current frame?

How close to the deadline is the UE?

How much data does the UE want to send?

For this embodiment, the following Schedule may be used: A schedule s is defined as a collection of 4 UEs (one in each beam) who share the same time-frequency resource. For ex: s=(1, 2, 3, 4) is a valid schedule if UE 1 is in Beam 1, UE 2 is on Beam 2, etc. and they share the same time-frequency resource.

Weights: Weight of scheduling a UE u, on beam b, in schedule s, at time t, is given by:

$$W_{ub}(p, s, t) = \frac{q_u(p, t) R_{u,s}}{(t - d_u)^\alpha},$$

$q_u(p, t)$:=queue length of UE u at time t, when PRB p is being allocated. $R_{u,s}$:=Throughput (Shannon capacity) of UE u when schedule s is allotted PRB p. $\alpha$ is a positive weighting parameter which can be tuned.

The weight of a schedule s=($u_1$, $u_2$, $u_3$, $u_4$) at time t on PRB p, $$W_s(p,t) = W_{u_1 1}(p,s,t) + W_{u_2 2}(p,s,t) + W_{u_3 3}(p,s,t) + W_{u_4 4}(p,s,t) \qquad (11)$$

B4.8 Implementation Example of the Max-Weight Scheduler

Greedy Scheduler:

For every PRB, randomly choose an order in which beams schedule UEs on this PRB.

Each beam chooses among all its UEs, the UE which provides the maximum sum weight, considering the interference it provides to the UEs already scheduled. (Note: The throughput of existing UEs in this schedule, in general, goes down when a new UE is added to the schedule!).

The beam also considers not scheduling any UE on the current PRB if that improves the overall sum weight—PRB silencing.

Each PRB is similarly scheduled. Other examples of approaches consider the following: The beam which gets the first opportunity to schedule its UE on a currently unscheduled PRB will likely schedule a UE which offers Max-Weight.

It was seen that the performance of the scheduler depended on this UE.

Some embodiments may be able to improve performance by using a First Max SLNR Greedy Scheduler or a Brute-Force (Look-up table) Scheduler

Example Embodiment, Max-Weight Scheduler (Continued)

Brute Force (Look-Up Table)

This embodiment may use the following steps:

First, create a list of all possible schedules across 4 beams. This global table is maintained by a central scheduler.

Next, for each schedule, calculate and store the weight of the schedule.

Next, for each PRB, the central scheduler finds the schedule with the maximum weight and informs the respective beams of which UE to schedule or to silence the current PRB.

Next, the beams update the queues, based on the scheduled UEs and inform the central scheduler, who then updates the global table.

Next, continue to next PRB.

Example Embodiment—Brute-Force (Look Up Table) Scheduler

For this example, the Ssze of table for 4 beams, 10 UEs per beam: $(10+1)^4 = 14{,}641$. Calculated and stored once. Every beam knows the interference coming from all the UEs (even those not in its local set of UEs). After every PRB is scheduled, each beam reports to a central scheduler the current queue lengths and most recent deadlines for the local UE which was scheduled. The central scheduler updates its global table of weights.

Comparison with Greedy

OPTIMALITY: Greedy→Each beam only knows the past and present. Not the future. Look-up Table→Has global information.

SCHEDULING LATENCY: Greedy→May perform redundant calculations, wasting scheduling time. Each beam looks through all the UEs for every PRB to decide whom to schedule.

Example Results of Simulations

TABLE 1

|  | Beams Independently choose UEs and update weights after every frame | Beams Independently choose UEs and update weights after every PRB | Beams jointly choose UEs (randomly) and update weights after every PRB | Beams jointly choose UEs (max wt) and update weights after every PRB |
| --- | --- | --- | --- | --- |
| Average Sum Throughput (mbps) | 35.42 | 35.42 | 43.46 | 68.89 |
| Missed Packets | 939 | 516 | 621 | 0 |
| Percentage of Packets missed | 18.79% | 10.33% | 12.4% | 0 |

In some embodiments, 2 levels of tweaking the scheduling algorithms—scheduling metric and implementation—may be used.

1. Embodiments will consider if the current metric (weights) a good representation of the real scenario.
2. Embodiments will compare the performances of different schedulers Other embodiments that include 10 UEs per beam, comprising more concurrent SLAs—GBR, and comprising more sectors were also simulated.

B4.9 Example Approach for Dynamic Bandwidth Allocation

Dynamic bandwidth allocation may be used to deliver traffic for specific services: Voice, video, per-user SLA, etc. FWA distributes traffic to multiple users on a shared medium.

Dynamic bandwidth allocation (DBA) is a technique by which bandwidth in a shared medium can be allocated on demand and fairly between different users. The sharing of a link adapts in some way to the instantaneous traffic demands of the nodes connected to the link. DBA takes advantage of several attributes of shared networks: All users are typically not using the network at one time. While active, users are not transmitting data/voice/video at all times. Most traffic occurs in bursts—there are gaps between packets that can be filled with other user traffic. DBA allows QoS, to preferentially.

Figure 9:
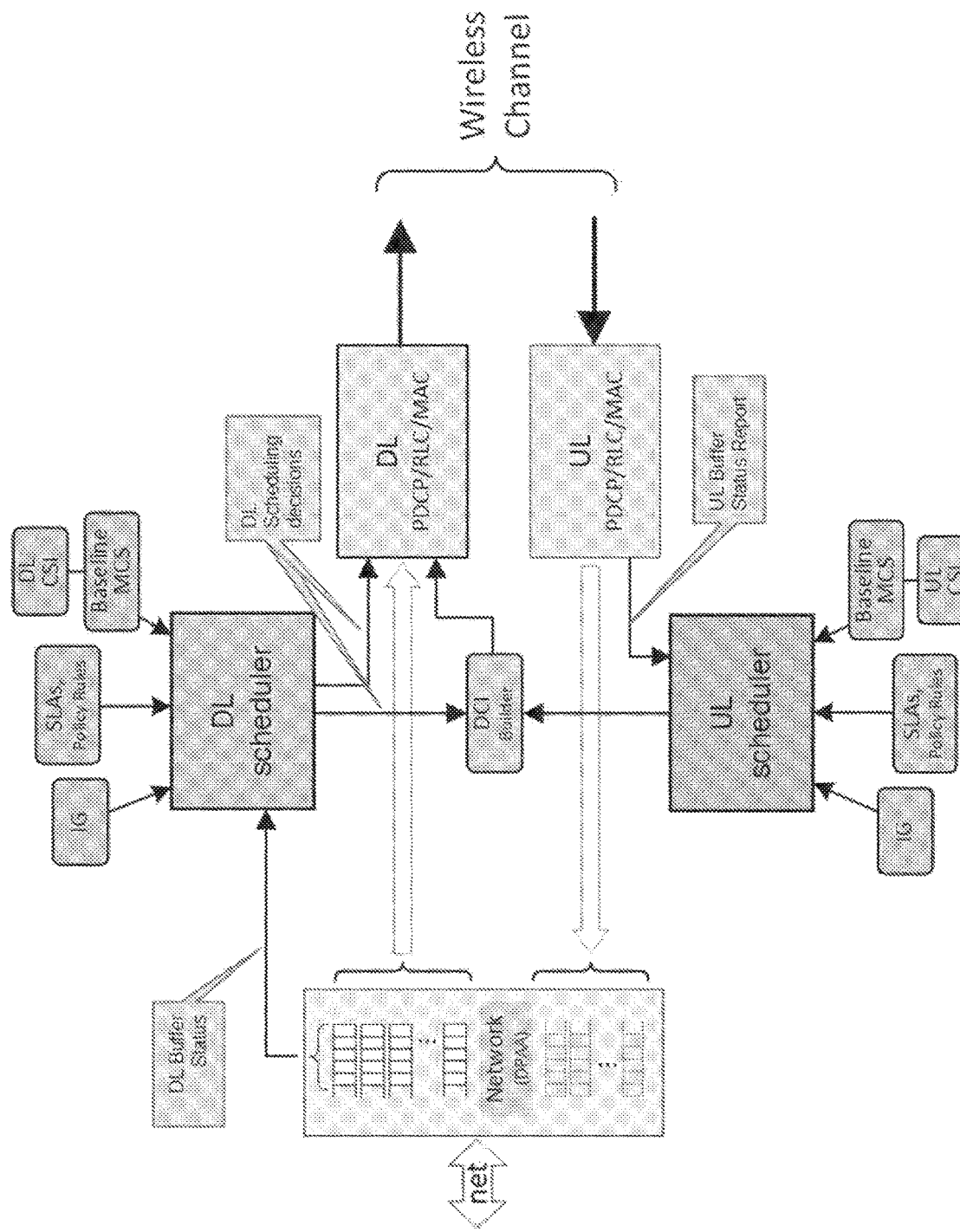
FIG. 9 is a block diagram showing an example of an uplink/downlink scheduler.

FIG. 9 shows an example implementation of a downlink and an uplink scheduler.

Figure 10:
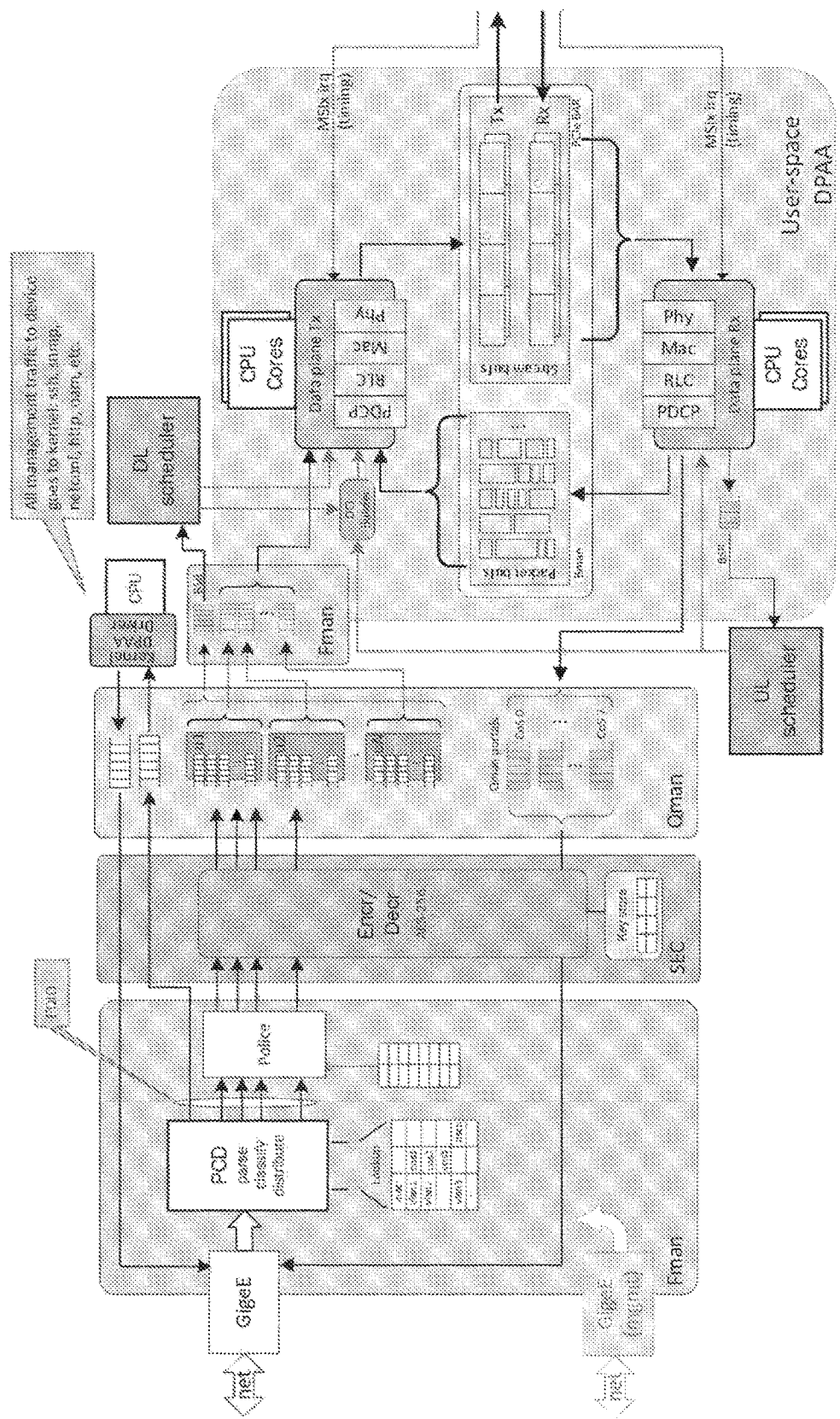
FIG. 10 is a block diagram of a scheduler.

FIG. 10 shows an example of a distributed power allocation algorithm (DPAA) implemented with a scheduler of wireless transmissions in a wireless network.

Exemplary QoS policy includes the following: Operator backend network provisions QoS services. Examples include adding or dropping a voice call or video stream, reating/changing SLA for a user. QoS models for access equipment may be the following:

DOCSIS/WiMAX
PacketCable MultiMedia (PCMM)—provisioning.
Basic DOCSIS service flows: UGS, rtPS, nrtPS, BE
LTE
Policy and Charging Rules Function (PCRF)—provisioning.
Semi-persistent scheduling.
Metro ethernet
Device specific provisioning
Y.1564 model, CIR/CBS/EIR/EBS, dscp & classifiers.

B4.10 Multi-Beam Embodiments

FIG. 11A shows an example of a network configuration in which multi-beam wireless connectivity is provided.

Varying levels of interference to and from different UE's:
Some UE's near the center of a beam will be minimally impacted.
Some UE's will interfere so strongly that we silence one while allocating the other.
Other UE combinations will produce SINR that will require QAM/MCS reduction.
Implies MCS per grant in DCI.
Implies creation of Interference Graph.
There will be scenarios with strong interference, and our scheduler-based interference mitigation/avoidance will be critical to our success.

B5. Example Scheduler Embodiments

In sections B5. Et seq, some example embodiments of various types of schedulers are described in detail.

B5.1 Channel Model
UL and DL Scheduler
10 MHz Bandwidth
Multi-beam antennas—Luneburg antenna pattern (See cell_setup.m)
4 non-overlapping antenna beams
1 km cell radius
Single stream per UE
Single polarization—For 2 polarizations, each PRB can be used twice, one for each polarization.
Fixed UE-beam assignment; home beam assignment according to geometry
Traffic Model: Poisson (non-bursty), Uniform (bursty), full buffer (for max rate or proportional fair)
Channels assumed to be completely time-invariant. Long-term statistics and possible link margins to account for residual fading (shadowing) would have to be incorporated through repeated pilots; resulting capacity loss from operating at a margin, and overhead are not incorporated in results.

B5.2 Scheduling Model

64 PRBs per beam, 128 symbols per PRB

Single Class of Service per UE, modelled as a single queue per UE.

SLA for the class of service considered: max latency

Different PRBs in the same beam are treated independently (Modifications for contiguous PRB grants have been included as part of new algorithms presented in this document).

Dynamic (defined as adaptive to "active UEs", but not to schedule) and instantaneous MCS considered.

For the downlink scheduler, QAM progressive ordering of UEs in a frame is not considered.

For the downlink scheduler, each UE may only get at most 4 grants of contiguous PRBs per frame. (In other embodiments, we need to consider that one grant out of these 4 are to transmit control channel information to the UE. This reduces the available resources.

Example Nomenclature

The following is a list of terms is used in this section

Schedule: A schedule may be a set of up to 4 UEs (assuming the system has 4 beams sharing a frequency band) of the form $(u_1, u_2, u_3, u_4)$ that transmit (UL) or receive (DL) in the same PRB, where $u_1$ is associated with beam 1, $u_2$ is associated with beam 2, etc.

Throughput: Throughput may be, for example, the restricted Shannon capacity defined below. For example, the throughput of a UE u (associated with beam b) in schedule s, is defined as $$R_u(s) = W \min(\log_2(1 + SINR(u,s)), 10) \quad (12)$$

Here W is the bandwidth and SINR (u, s) is the Signal-to-Interference-plus-Noise-Ratio of UE u in schedule s at beam b, which, for the UL, can be computed from the Power Transfer Function Matrix as $$SINR(u, s) = \frac{P_{b,u}}{P_{noise} + \sum_{w \in s, w \neq u} P_{b,w}} \quad (13)$$

Note that the Power Transfer Function Matrix is a matrix with as many rows as the number of beams and as many columns as the total number of UEs in the system. In this definition, $P_{b,u}$ is the element at the $b^{th}$ row and the $u^{th}$ column of the matrix, representing the received power at beam b due to UE u's transmission alone.

Weight of a UE: The weight of a UE is defined in the context of a given schedule and time instant. For a UE u, its weight at time t, in a schedule s is given by $$W(u, s, t) = q_u(t)^\alpha \frac{1}{(t - d_u)^\beta} R_u(s).$$

Here $q_u(t)$ is the current queue-backlog of UE u, t is the current time instant and $d_u$ is the maximum allowable latency of the next packet in the queue. $\alpha$, $\beta$ are positive parameters which can be varied to change relative importance between the latency-component and the queue-backlog component. $R_u(s)$ is the throughput of UE u in schedule s, as defined in #2 above. Note that for $\alpha=1$ and $\beta=0$, the weight becomes the traditional backpressure metric.

Personal component of the weight of a UE: Note that the weight of a UE (as defined in #3) can be decomposed into 2 terms, $$w_1(u, t) = q_u(t)^\alpha \frac{1}{(t - d_u)^\beta} \text{ and } w_2(u, s) = R_u(s).$$

We call $w_1(u, t)$ the personal component of UE u's weight, as it can be computed independent of a schedule, using only parameters local to UE u. It changes for every UE in every frame (since the deadlines change when the frame time index changes). Furthermore, the queue length changes within a frame for those users whose PRBs are being scheduled.

Social component of the weight of a UE: As defined in #4, we call $w_2(u,s)=R_u(s)$ the social component of the weight of a UE, as it depends on the schedule being considered, which in turn defines the SINR. Note that in a FWA system, the social component of the weight conditioned on the schedule, is time-invariant. Hence, the weight of a UE comprises 2 parts, the personal and the social part.

$$W(u,s,t)=w_1(u,t) \times w_2(u,s) \quad (14)$$

Weight of a schedule: For a schedule $s=(u_1, u_2, u_3, u_4)$, the weight of a schedule is defined as the sum of the weight of each UE in the schedule.

$$W(s,t)=W(u_1,s,t)+W(u_2,s,t)+W(u_3,s,t)+W(u_4,s,t) \quad (15)$$

B6. Example Embodiment/Greedy Scheduler

In this scheduler, implementations assign time-frequency grids to UEs according to a greedy policy. The main advantage of such a scheduler is that it is easily implementable. However, being a greedy algorithm, the scheduler may not be optimal.

The scheduler may use the following input: A set of beams and their associated UEs, a power transfer matrix, maximum allowable latency for each packet of each UE, the current time instant t, a set of empty time-frequency resources (assumed to be a 4×16 table of PRBs, in this case).

An example algorithm may be as follows:

Start from PRB index 1 (The indexing is assumed to be arbitrary).

Each beam updates its UEs' personal components of the weight. That is for each UE u form $w_1(u, t)$. Note that this is the personal-component of the weight of a UE and hence, is independent of the schedule per se.

Form a random permutation of the beam indices. This defines the order in which the beams assigns this PRB to their associated best (defined below) UEs.

The randomness in beam-choice-ordering may ensure that the beam with the highest-weighted UE does not always get to assign that highest-weighted UE first. This would prevent a number of potentially good scheduling opportunities on the neighboring beams, on the same PRB, due to the interference profile.

Each beam now greedily places its best (define below) UE on the current PRB according to the rules mentioned below and in the order dictated by the beam-index permutations formed in #3.

While calculating the weight of a UE on the current PRB, each beam takes into consideration the UEs already placed on this PRB by the beams preceding it in the beam order (as formed in #3). Specifically, in order to calculate the social component of the weight of the UE the beam shall take into account the interference caused by the UEs already placed on this PRB by the preceding beams.

Once a beam schedules a UE onto a PRB the UEs already scheduled shall appropriately adjust their weights owing to a change in the social component (namely, throughput) of the weight, caused by the new interference (and hence, decreased SINR) from the newly added UE.

The best-UE of a beam is defined as that UE which when scheduled on the current PRB maximizes the weight of the schedule where the weights of all UEs have been appropriately adjusted after each new beam added a UE to this PRB (according to 4a-b). This implies that both the effect of already-scheduled beams on the new PRB/UE, and the effect of the new UE on the already-scheduled PRBs in the other beams is taken into account.

After calculating the weights of all its associated UEs, should the beam find that none of the UEs contribute to an increase in the weight of the schedule, the beam shall remain silent on the current PRB. Note that this is possible in general, if all the UEs in the current beam leak a lot of power to the neighbouring beams.

Once all the beams have finished making their decisions on the current PRB, go to the next PRB and continue from #2. Continue till all PRBs have been considered.

B6. Example Embodiment/Greedy Scheduler—with Thresholding

In this scheduler, we aim to assign time-frequency grids to UEs according to a greedy policy with thresholding. For a given threshold value, each beam shall schedule UEs onto a PRB if and only if the SNRs of all the UEs already scheduled on this PRB do not go down below the threshold. The algorithm is very similar to the previous section on 1. Greedy Scheduler, with the only difference being that each beam starts by creating a subset of its associated UEs. This subset is the set of all UEs which if scheduled on the current PRB DO NOT decrease the SNR of the UEs sharing this PRB in other beams by more than a threshold. The beam then finds the best UE from among the UEs in this set, where the notion of a best UE.

The inputs may include: (1) A set of beams and their associated UEs. (2) A power transfer matrix. (3) Maximum allowable latency for each packet of each UE (4) The current time instant t. (5) A set of empty time-frequency resources (assumed to be a 4×16 table of PRBs, in this case). (6) Threshold value The algorithm may be as follows:

Start from PRB index 1 (The indexing is assumed to be arbitrary).

Each beam updates its UEs' personal components of the weight. That is for each UE u we form $$w_1(u, t) = q_u(t)^\alpha \frac{1}{(t - d_u)^\beta}.$$

Here $q_u(t)$ is the current queue-backlog of UE u, t is the current time instant and $d_u$ is the maximum allowable latency of the next packet in the queue. $\alpha$, $\beta$ are positive parameters which can be varied to change relative importance between the latency-component and the queue-backlog component. Note that this is the personal-component of the weight of a UE and hence, is independent of the schedule per se.

Form a random permutation of the beam indices. This defines the order in which the beams assign this PRB to their associated best (defined below) UEs.

NOTE: The randomness in beam-choice-ordering is done to ensure that the beam with the highest-weighted UE does not always get to assign that highest-weighted UE first. This would prevent a number of potentially good scheduling opportunities on the neighboring beams, on the same PRB, due to the interference profile.

Each beam now greedily places its best (define below) UE on the current PRB according to the rules mentioned below and in the order dictated by the beam-index permutations formed in #3.

Each beam creates a subset of its UEs. This set contains all those UEs which when added to the schedule DO NOT decrease the SNR of the already scheduled UEs on the current PRB by more than the value of the threshold. Note that for the beam going first on the current PRB, this set is going to be set of all its UEs.

While calculating the weight of a UE on the current PRB, each beam shall take into consideration the UEs already placed on this PRB by the beams preceding it in the beam order (as formed in #3). Specifically, in order to calculate the social component of the weight of the UE the beam shall take into account the interference caused by the UEs already placed on this PRB by the preceding beams.

Once a beam schedules a UE onto a PRB the UEs already scheduled shall appropriately adjust their weights owing to a change in the social component (namely, throughput) of the weight, caused by the new interference (and hence, decreased SINR) from the newly added UE.

The best-UE of a beam is defined as that UE in the subset created in 4a which when scheduled on the current PRB maximizes the weight of the schedule (i.e the sum of the weights of the UEs already placed on this PRB and the weight of this UE, where the weights of all UEs have been appropriately adjusted after each new beam added a UE to this PRB (according to 4a-b).

After calculating the weights of all its associated UEs, should the beam find that none of the UEs contribute to an increase in the weight of the schedule, the beam shall remain silent on the current PRB. Note that this is possible in general, if all the UEs in the current beam leak a lot of power to the neighbouring beams.

Once all the beams have finished making their decisions on the current PRB, go to the next PRB and continue from #2. Continue till all PRBs have been considered.

B7. Example Embodiment/Look-Up Table Scheduler (First Max-Weight)

This scheduler embodiment may implement a brute-force scheduler by maintaining the interference relationships (hence, the throughputs) of various schedules in a look-up table data structure. The advantage of this implementation over the greedy paradigm is:

Improved scheduling latency: Since the greedy scheduler uses each beam to sample each of its associated UE to find out the best among them to be scheduled, it is expected that the algorithm may be computationally intensive. The look-up table, on the other hand requires a one-time calculation to fill the table and subsequently, only look-up operations.

Optimality: Evidently, the look-up table is a brute force implementation of the scheduling problem and overcomes the sub-optimality of the greedy schedulers. The look-up table paradigm allows the scheduler to get a global picture of the interference relationships, whereas the greedy scheduler only has access to the decisions taken by beams until now and has no visibility into the decisions that will be taken by subsequent beams.

The inputs may be as follows: (1) set of beams and their associated UEs (2) power transfer matrix. (3) maximum allowable latency for each packet of each UE, (4) the current time instant t. (5) A set of empty time-frequency resources (assumed to be a 4×16 table of PRBs, in this case).

B.7.1 Algorithm

1. Form the look-up table (Offline/Whenever a new UE joins the system): The table is a collection of all possible valid schedules. i.e., the collection of all possible entries of the form $(u_1, u_2, u_3, u_4)$ where $u_i$ is either 0 or is the UE index of a UE associated with beam i, i=1, 2, 3, 4. If a coordinate is 0, it implies that the corresponding beam is silent. Each row of this table is a valid schedule and the corresponding columns are the throughputs of the UEs in the schedule. For example, for a schedule $s_0$=(1, 2, 0, 4) (Implying UE 1 on beam 1, UE 2 on beam 2, beam 3 silent and UE 4 on beam 4), the 4 columns would respectively be $R_1(s_0)$, $R_2(s_0)$, 0, $R_4(s_0)$ (cf example nomenclature). Note that these columns are in fact the social component of the weights of each of the UEs involved in the schedule. That is, these entries are precisely $w_2(1, s_0)$, $w_2(2, s_0)$, $w_2(3, s_0)$, $w_2(4, s_0)$. Note that for a fixed wireless system, these values are time-stationary and need to be calculated and stored only once per UE (when it entered the system and associated itself with a beam). This table is maintained at a central scheduler.

2. Size of the table: For a system with $N_i$ UEs associated with beam i, i=1, 2, 3, 4, the size of the table would be $(N_1+1)(N_2+1)(N_3+1)(N_4+1)$ rows×4 columns. For typical numbers of UE per beams (<100) and 4 beams, the size of the table is manageable. However, for larger number of beams, as would occur, e.g., when considering a system with 360 degree coverage around the BS, further measures need to be taken to reduce the size of the table.

3. Start from PRB index 1 (The indexing is assumed to be arbitrary).

4. Each beam updates its UEs' personal components of the weight. That is for each UE u we form $$w_1(u, t) = q_u(t)^\alpha \frac{1}{(t-d_u)^\beta}.$$

$q_u(t)$ is the current queue-backlog of UE u, t is the current time instant and $d_u$ is the maximum allowable latency of the next packet in the queue. $\alpha$, $\beta$ are positive parameters which can be varied to change relative importance between the latency-component and the queue-backlog component. Note that this is the personal-component of the weight of a UE (cf. example nomenclature) and hence, is independent of the schedule per se.

5. Update the table: Each beam sends to the central scheduler the personal component of the UE weights it calculated in #4. The central scheduler updates the global look-up table by associating with each schedule the weight of the schedule. For example, for a schedule $s_0$=(1, 2, 0, 4), it calculates $W(s, t)=w_1(1, t)w_2(1, s_0)+w_1(2, t)w_2(2, s_0)+w_1(3, t)w_2(3, s_0)+w_1(4, t)w_2(4, s_0)$. Note the distributed nature of the update:

A. (From #1) The central scheduler already had the social component of the weights of the UEs. Hence, it already has the values $w_2(1, s_0)$, $w_2(2, s_0)$, $w_2(3, s_0)$, $w_2(4, s_0)$.

B. After #4, each beam provides the personal component of the weights of all its UEs. Hence, the central scheduler now has, $w_1(1, t)$, $w_1(2, t)$, $w_1(3, t)$, $w_1(4, t)$.

C. The central scheduler calculates $W(s, t)$ for all the schedules s in the list.

NOTE: The number of computations needed very millisecond to update the table is unreasonable.

6. At the current time instant t, find the UE with the maximum personal weight $w_1(u, t)$. Say, this is UE $u_{max}(t)$ 7. From among the schedules which contain $u_{max}(t)$, the central scheduler finds the schedule, say $s_{max}(t)$ with the maximum weight $W(s_{max}, t)$ and conveys to the beams, the UEs they should schedule (or silence themselves, as the case may be) on the current PRB, based on the schedule $s_{max}(t)$.

8. Go to the next PRB and continue from #4. Stop if all PRBs have been considered—refresh traffic buffers with incoming traffic and continue from #3.

B8. Example Embodiment/Look-Up Table Scheduler (Random)

This scheduler implements a look-up table by maintaining the interference relationships (hence, the throughputs) of various schedules in a look-up table data structure, and implement a completely random scheduler.

INPUT
(1) A set of beams and their associated UEs.
(2) A power transfer matrix.
(3) Maximum allowable latency for each packet of each UE
(4) The current time instant t.
(5) A set of empty time-frequency resources (assumed to be a 4×16 table of PRBs, in this case).

Algorithm:
Do #s 1-5 listing of algorithm steps above.

At the current time instant t, the central scheduler chooses a schedule uniformly at random and conveys to the beams, the UEs they should schedule (or silence themselves, as the case may be) on the current PRB, based on the chosen schedule.

Go to the next PRB and continue from #4 in the listing of algorithm steps in B.7.1. Stop if all PRBs have been considered—refresh traffic buffers with incoming traffic and continue from #3 in the listing of algorithm steps in B.7.1.

B9. Example Embodiment/Static Scheduler—Max Throughput Version

This scheduler finds and reuses a finite set of PRB allocations (pre-computed frames) in order to maximize the overall system throughput and maintain fairness in terms of the per-UE throughput as well.

INPUT: (1) A set of beams and their associated UEs. (2) A power transfer matrix. (3) A set of empty time-frequency resources (assumed to be a 4×16 table of PRBs, in this case).

Algorithm:
Create a look-up table as in Max Weight Scheduler. For every schedule, call the throughput of the schedule as the sum of the throughput of the UEs in the schedule. Continuing the nomenclature, #1, throughput of a schedule $s=(u_1, u_2, u_3, u_4)$ is, $R(s)=R_{u_1}(s)+R_{u_2}(s)+R_{u_3}(s)+R_{u_4}(s)$. Other metrics, such as sum $(\log(R\_i))$ can be chosen as well, depending on requirements from a network operator.

Sort the schedules in decreasing order of the throughputs of the schedules (as defined in #1).

Set k=1. Consider all UEs in the system as uncovered.

Choose the first schedule from the sorted list. Cover all the (as yet uncovered) UEs in this schedule. Increment k by 1.

Consider the next schedule in the sorted list and cover all the (as yet uncovered) UEs in this schedule. Increment k by 1.

Proceed until all UEs in the system have been covered. At this point, say k=n. That is, the top n schedules were required in order to cover all the UEs in the system. We shall call this list of n schedules as the set of static schedules.

CASE 1—n<64: Assign to n PRBs in a frame, the n chosen static schedules (from #6). Assign to the remaining 64-n PRBs, the first 64-n schedules from the static schedules (from #6). Repeat until all 64 PRBs are filled.

CASE 2—n>64: Fill as many frames of 64 PRBs as can be filled up sequentially allotting one static schedule to each PRB. Fill the extra PRBs of the last frame according to #7.

B10. Example Embodiment/Static Scheduler—Poor UE Priority Version

This scheduler finds and reuses a small, finite set of PRB allocations (pre-computed frames) in order to maximize the overall system throughput and maintain a fairness in terms of the per-UE throughput as well. It is different from the previous MAX THROUGHPUT version in the manner we fill the extra PRBs in a frame.

INPUT (1) A set of beams and their associated UEs. (2) A power transfer matrix. (3) A set of empty time-frequency resources (assumed to be a 4×16 table of PRBs, in this case).

Algorithm:

Create a look-up table as in Max Weight Scheduler. For every schedule, call the throughput of the schedule as the sum of the throughput of the UEs in the schedule. Continuing the nomenclature, #1, throughput of a schedule $s=(u_1, u_2, u_3, u_4)$, $$R(s)=R_{u_1}(s)+R_{u_2}(s)+R_{u_3}(s)+R_{u_4}(s) \quad (16)$$

Sort the schedules according to the decreasing order of the throughputs of the schedules (as defined in #1).

Set k=1. Consider all UEs in the system as uncovered.

Choose the first schedule from the sorted list. Cover all the (as yet uncovered) UEs in this schedule. Increment k by 1.

Consider the next schedule in the sorted list and cover all the (as yet uncovered) UEs in this schedule. Increment k by 1.

Proceed until all UEs in the system have been covered. At this point, say k=n. That is, the top n schedules were required in order to cover all the UEs in the system. We shall call this list of n schedules as the set of static schedules.

For each UE u, calculate the per UE sum throughput it gets in all the static schedules. That is, for each UE u, find the schedules s which contain u and consider the sum (over all static schedules s) of $R_u(s)$.

Based on $R_u(s)$ calculated in #7, choose the 3 UEs with the 3 worst per UE sum throughputs. Call these the Poor UEs.

CASE 1—n<64: Assign to n PRBs in a frame, the n chosen static schedules (from #6). To assign schedules to the remaining 64-n PRBs, do the following:

From the sorted list of schedules (formed in #2) start from the beginning and allot the schedule to the PRB if and only if the schedule contains at least one of the Poor UEs (as defined in #8).

CASE 2—n>64: Fill as many frames of 64 PRBs as can be filled up sequentially allotting one static schedule to each PRB. Fill the extra PRBs of the last frame according to #10.

NOTE: In this algorithm there are 2 places where we can control the performance:

One could potentially vary the number of worst UEs chosen (as in #7)

One can set a rule "Consider a schedule for the extra PRBs if and only if it contains exactly 2 (or 3, or 4) of the worst UEs." (as opposed to the current rule of "at least 1", as in #10).

B.11 Example Embodiment/Static Scheduler—Contiguous PRB Version

This scheduler finds and reuses a finite set of PRB allocations (pre-computed frames) in order to maximize the overall system throughput and maintain a fairness in terms of the per-UE throughput as well. It is different from the previous MAX THROUGHPUT and POOR UE PRIORITY versions in that PRB allocations/grants are made in a contiguous chunk for every UE.

INPUT 1. A set of beams and their associated UEs. 2. A power transfer matrix. 3. A set of tolerance ratios (defined below) 4. A set of empty time-frequency resources (assumed to be a 4×16 table of PRBs, in this case).

Definition:

We call a schedule of be a schedule of tolerance k if there are exactly k UEs active in the schedule. For example, (1, 2, 0, 3) is a schedule of tolerance 3 whereas (4, 5, 8, 1) is a schedule of tolerance 4. It is representative of the number of UEs we are willing to tolerate in the schedule.

Note that assigning a lot of tolerance-4 schedules, although maintains continual service to all UEs, but may result in poor overall sum throughput because of more interference and hence, poor SINR per UE. On, the other hand, assigning a lot of tolerance-1 or-2 schedules, although resulting in more system throughput (because of less interference) is likely to be unfair in terms of service interruption for a poor UE who may not get assigned for long periods at a time. We shall start the algorithm with a set of parameters which are predefined ratios between the number of tolerance-1, tolerance-2, tolerance-3 and tolerance-4 schedules we can allow. For example, a sample ratio may be (4, 2, 1, 1) implying that in a frame of 64 PRBs, 32 PRBs are of tolerance 1, 16 PRBs are of tolerance 2, 8 PRBs of tolerance 3 and 8 PRBs of tolerance 4.

Algorithm:

Create a look-up table as in Max Weight Scheduler. For every schedule, call the throughput of the schedule as the sum of the throughput of the UEs in the schedule. Continuing the nomenclature, throughput of a schedule $s=(u_1, u_2, u_3, u_4)$, $$R(s)=R_{u_1}(s)+R_{u_2}(s)+R_{u_3}(s)+R_{u_4}(s).$$

For each UE—
- find the best schedule of tolerance 1 which contains the UE and store $k_1$ copies of this schedule.
- find the best schedule of tolerance 2 which contains the UE and store $k_2$ copies of this schedule.
- find the best schedule of tolerance 3 which contains the UE and store $k_3$ copies of this schedule.
- find the best schedule of tolerance 4 which contains the UE and store $k_4$ copies of this schedule.

Note here that for example, by the best tolerance-3 schedule of UE2 we mean the schedule with the highest weight W(s, t) (This has been calculated by the central scheduler at the end of #1) which involves UE2 and has a total of 3 UEs. (i.e one beam is silent)

3. Once all UEs and (respectively) all tolerance schedules for them are collected, these form the set of static schedules.

4. Start filling frames by assigning one static schedule (as formed in #3) to each PRB in the frame. i.e first fill all $k_1$ schedules of UE1-tolerance-1, next fill all $k_1$ schedules of UE2-tolerance-1, and so on for all UEs. Next, fill all $k_2$ schedules of UE1-tolerance-2, and so on for all UEs. Finally, assign all $k_4$ schedules of UE1-tolerance-4, all $k_4$ schedules of UE2-tolerance-4 and so on. Note that this step ensures contiguous PRB grants to every UE on every beam.

5. We are yet to account for the additional physical constraint that no UE shall get more than one contiguous PRB grant per frame. For example, UE 1 on beam1 may get 20 contiguous PRBs as a part of its first grant. However, once another UE has been assigned PRBs after UE1's 20 contiguous PRBs, UE1 cannot be granted more PRBs on this frame.

To account for the constraint #5, we modify the algorithm as follows:

While filling PRBs with static schedules (as in #4) each beam keeps an ordered list of UEs who have been granted contiguous PRBs in the current frame.

Should a new grant be starting now which also happens to include a UE which had already received its first grant in this frame the following 2 cases may occur:

The new grant involving this UE is such that on the current frame the grants still continue a contiguous PRB assignment for this UE. This may happen, for example if the static schedule list were: ($k_1$ copies of (1, 2, 3, 4), followed by $k_1$ copies of (5, 2, 3, 6)) Note that although the schedule per se has changed after assigning the first $k_1$ PRBs as (1, 2, 3, 4) the continuation of assignment of static schedules (following #4) would still continue contiguous PRBs for UEs 2 and 3 on beams 2 and 3 respectively. In this scenario: DO NOT TAKE SPECIAL ACTIONS. KEEP FILLING according to the static schedules list.

The new grant involving this UE is such that on the current frame the constraint #5 is violated. This may happen, for example if the static schedule list were: ($k_1$ copies of (1, 2, 3, 4), followed by $k_1$ copies of (5, 2, 3, 6), followed by $k_1$ copies of (5, 2, 3, 4)) Note that there has been no violation up to the first $2 \times k_1$ PRBs. However, with the next PRB assignment, UE4 on Beam 4 starts receiving a second contiguous grant of PRBs separated from its first grant in the frame. In this scenario: Assume that the $k_1$ copies of the tolerance-4 schedule (5, 2, 3, 4) corresponded to UE 5 (refer to the rule in #4). In this case, the refine the list of static schedules by consider all those tolerance-4 schedules involving UE5 which do not involve UE 4.

Once all the static schedules have been assigned.

B.12 Example Embodiment/Dynamic Scheduler—Contiguous PRB Version

In this scheduler, we wish to upgrade the functionality of our hitherto PRB-independent look-up table dynamic scheduler by adding the functionality of contiguous PRBs to it. We shall be inspired from the STATIC SCHEDULER counterpart of the contiguous PRBs. The difference here is that we shall be looking to maximize weights. (i.e a heuristic approximation to maximizing throughput under the deadline constraints).

INPUT: (1) A set of beams and their respective associated UEs. (2) A power transfer matrix. (3) Maximum allowable latency for each packet of each UE. (4) The current time instant t. (5) A set of empty time-frequency resources (assumed to be a 4×16 table of PRBs, in this case). (6) Tolerance ratios (as defined in STATIC SCHEDULER—CONTIGUOUS PRB VERSION, INPUT)

Definition:

We carry forward the definition of tolerance.

Algorithm:

Create a look-up table as in FIRST-MAX WEIGHT #1-5.

Sort the UEs according to their decreasing personal-component of weights $w_1(u, t)$.

For each UE in the sorted list (starting from the top—the most urgent UE), do steps from static scheduler embodiment. Note here that for example, by the best tolerance-3 schedule of UE2 we mean the schedule with the highest weight $W(s, t)$ (This has been calculated by the central scheduler at the end of #1) which involves UE2 and has a total of 3 UEs. (i.e one beam is silent)

NOTE: The main difference from the static scheduler is that we must account for fresh traffic after every frame and not just create a large list of static schedules. Hence, the values of k1, ..., k4 should be such that the list formed in #3 above runs in length to about 1 or 2 frames only. Note that this is possible by a suitable choice of the ratios.

Once all UEs and (respectively) all tolerance schedules for them are collected, start filling frames by assigning one schedule (from the set formed in #3) to each PRB in the frame. Note that this step ensures contiguous PRB grants to every UE on every beam. While filling the frames with the collected schedules, the beams keep updating the queue buffers of their respective scheduled UEs. Continue filling in the schedules if all UEs have non-empty buffers.

If a UE should finish all its queued packets, then the UE for which this set of schedules (the ones which includes the UE with the empty buffer) were chosen as its best tolerance-k schedule should re-choose (precisely, the central scheduler should re-choose) a new set of best tolerance-k schedules which does not include UEs with empty buffers. (Equivalently, the schedules should not include UEs with zero personal weight).

To account for the physical constraint of a maximum of one contiguous grant of PRBs to a UE per frame, follow last two steps of static scheduler.

At the end of this assignment, refresh all UE traffic buffers with incoming traffic and continue from #1 (specifically, #4 in B.3.7.1).

B.13 Example Embodiment/Downlink Scheduler

1. Obtain the downlink Power transfer function matrix—either directly by ranging operations or calculated from the uplink Power transfer function matrix, as follows:

Recall that $P_{b,u}$, the element at the intersection of the $b^{th}$ row and the $u^{th}$ column of the uplink Power transfer function matrix represents the power received at the BS (precisely, by beam b) due to transmissions by UE u alone. Mathematically, $P_{b,u} = P_{Tx,u}|h_{u,b}|^2$, where $P_{Tx,u}$ is the transmit power of UE u and $h_{u,b}$ is the complex channel gain from UE u to beam b. Note that this accounts for the distance-dependent pathloss, antenna gains and other losses.

Let $P^{(d)}_{b,u}$ represent the downlink power received by UE u due to transmissions by beam b alone.

Similar to a) above, $P^{(d)}_{b,u} = P^{(d)}_{Tx,b}|h_{b,u}|^2$, where $P^{(d)}_{Tx,b}$ is the downlink transmit power of beam b and $h_{b,u}$ is the complex channel gain from beam b to UE u.

By reciprocity, $|h_{u,b}|^2=|h_{b,u}|^2$

Hence, $P^{(d)}_{b,u}=P^{(d)}_{Tx,b}|h_{u,b}|^2$, or $P^{(d)}_{b,u}=(P^{(d)}_{Tx,b}|h_{b,u}|^2)(P_{Tx,u})/(P_{Tx,u})$. But $P_{Tx,u}|h_{u,b}|^2=P_{b,u}$.

Hence, $P^{(d)}_{b,u}=(P^{(d)}_{Tx,b}/P_{Tx,u})P_{b,u}$

2. Continue with the Dynamic Scheduler—Contiguous PRB version algorithm.

B.14 Additional Exemplary Embodiments

This subsection describes further features that may be incorporated into various scheduler embodiments and the corresponding design and implementation considerations that can be taken into account.

More concurrent SLAs: Currently, we have assumed only one Class of Service per UE—max latency. In other embodiments, multiple Classes of Service (Max Latency, min throughput, etc) per UE concurrently may be considered. That is, the scheduler tries to solve the problem of maximizing the sum system throughput under the set of constraints provided by these Classes of Service. Currently, the only constraint is that each UE meet its packet deadlines. With the current scheduler framework, a proposed approach to address this is to have multiple virtual UEs per physical UE (equivalently, multiple queues per physical UE), where each virtual UE is associated with one Class of Service of the physical UE. The virtual UE inherits the physical UE's geographical location. Hence, the virtual UEs have the same social component of the weight as that of the associated physical UE. However, they shall differ in their personal component of the weights. Finally, when a virtual UE is scheduled, it shall represent the allocation of bandwidth to the associated physical UE's corresponding Class of Service queue. The personal component of the weights scale by a factor equal to the number of classes of service per UE. However, for an ambitious target of 100 UEs per beam and 8 Classes of Service per UE, each beam need only maintain ~800 numbers, which should not stress the limits of computation and memory available.

Minimum throughput may be handled with the current Look-up table scheduler with max latency deadlines. This may be done by artificially bringing forward the deadlines of the UE's packets to ensure they get more bandwidth. We may need to study how much should this deadline advancement be for a quantitative min rate guarantee.

Downlink Scheduler with DFE considerations (cold start/warm start, overheads, etc). Current simulations do not consider the impact of overheads that need to be accounted for DFE coefficient calculations and other possible places, such as overheads resulting from packet fragmentation. Also, for the DL scheduler, one grant per UE is to be used for transmitting Control Channel information. These considerations reduce the available bandwidth to be scheduled and need to be accounted for to mimic the actual system performance.

Power control has not been considered in both the UL and the DL. With power control being available, the scheduler gets another degree of freedom to mitigate interference. For example, in the UL the Power control may enable UEs to opportunistically set their transmit power levels based on the schedule, to maximize the sum throughput. For example, a poor performing UE may be asked to raise its transmit power until such a point where the marginal throughput gain to this UE is still more than the loss due to additional interference at other UEs. On the other hand, a UE that is close to the base station, may still get decent performance (in terms of MCS) if it transmits at a lower power level up to a point where the additional gains due to reduced interference are still more than this UEs lower MCS owing to a lower power level. Having outlined, the basic power control mechanism it is to be pointed out that power control may add more complexity to the scheduling module as the power levels for all UEs need to be computed for all the schedules in the look-up table. It remains to study an efficient way of incorporating power level calculations for the look-up table. However, the advantage (being FWA) is that all the power calculations need to be done only once for the whole table (along with the calculation of social components)

It was suggested that at a later time we should investigate whether dynamic beam assignment (possibly on a frame-by-frame basis) would give significant advantages. For a fixed wireless access system dynamically assigning beams to UEs should ideally happen only as a per-beam load management solution. UEs may be needed to be shifted either to adjacent beams in the same band or to the adjacent beam in the other band if the current associated beam is loaded with too many UEs that demand a lot of resources quickly. However, this will be a moot point for precoded systems.

Optimum home beam assignment for the UEs: As a new UE comes into the system it needs to be allotted a beam. This needs to be done judiciously, keeping in mind the factors that affect not only the throughput of this UE but also the sum system throughput. To do this, a proposed approach was to consider all possible partitions of UEs across the beams and evaluate for each partition the sum-rate or, a sum-log-SINR, and choose that partition which maximizes this metric. Each UE has 2 possibilities one in each band . . . .

Consider the throughput as the actual MCS throughput and not the restricted Shannon Capacity.

How can the set of all possible schedules be limited to only a few atomic schedules which capture the effect of all the schedules.

B14.1 Additional Embodiments—Constraints and Assumptions

The following describes some assumptions that are used in the simulations, and are useful for intuition of the problem. However, it is noted that the disclosed methods and apparatus are not restricted to the cases where these assumptions hold; they are just exemplary.

UL scheduler: 64 TF resources per 10 MHz, per beam.

Details: TF resources are assumed to be orthogonal, and completely equivalent. The latter assumption is not strictly true, as different TF grids see slightly different transfer functions. However, the approximation is good: in flat fading channels, the variations over 4 subcarriers (the maximum spacing of the grids) is small. In highly selective channels, the averaging over the 128 subcarriers in a grid makes the grids almost equivalent. Finally, the performance at different times is equivalent, since the changes of the channel over the spacing of 15 symbols (time between two pilots) is negligible for scheduling purposes.

UL scheduler: Users are scheduled per a fixed beam assignment, which may be implemented as a permutation-type search to maximize a proportional fair metric (sum(log (rates))).

Details: first generation system assumes that beam assignment is changes at long timescales, ranging from weeks (re-assignment only when a new subscriber enters the system) down to hours (e.g., significant change of traffic when user starts watching movies). Beam assignment currently seen as secondary problem, and exhaustive search is used as temporary measure.

Also, at later time should investigate whether dynamic beam assignment (possibly on frame-by-frame) would give significant advantages. However, this will be moot in a precoded system.

DL scheduler: Different from UL—QAM/MCS ordering (TF resources are no longer equivalent)

Details: due to principle of DFE, users must be transmitted in sequence of their SNRs. If (i) a frame is fully occupied in all beams, and (ii) data are transmitted in each delay/Doppler slice, then the interference seen by each UE is constant over time (though it can be different between different UEs), and the ordering of the users is straightforward (see item 4). However, when empty slots are possible, then the best placing of those blanks is a task for the scheduler (see item 5). After an empty slot, a new ordering is possible.

In some embodiments, cold start and warm start may be implemented

Also, residual interference (from "spillover" of occupied block into a subsequent blank slot may be incorporated in some embodiments.

DL Scheduler: Case 1: Full request—schedule/arrange UEs according to SINR.

DL Scheduler: Case 2: Fewer requests—scheduler may put gaps to mitigate inter-beam interference.

Assumption: Gaps to be in minimum granularity of 8 rows.

DL Scheduler: Suggested approach—schedule in blocks of 8. In this case, there are only 2 cases—Interference or No Interference. No partial overlap. We need a guard between gaps (?) to account for spillover from neighboring beams.

Power Control—shelved for the time-being. From Turbo decoding pt of view—easier if all the users are at the same power.

128 symbols per PRB; 16 symbols for cold-start DFE.

UL scheduler: users allocated contiguous rows of PRBs to ease on DFE calculation, which is done per row.

This can be a complication for the scheduler, in particular when different "viritual users" (different data streams, with different quality requirements, for the same users) should be taken into account UL scheduler: 2 cases may be considered—

Schedule as if each PRB can get capacity=<bandwidth>×$\log_2(1+SINR)$

Schedule based on fixed QAM—given by the SINR of the weakest user.

Investigate performance gain by having fast-adaptive MCS

Single stream, single polarization assumed.

Metrics to compare:

SLAs met?

Utilization of capacity

Compute time/complexity

To start with—assume only deadlines as SLA

Each UE has 8 queues, corresponding to 8 different classes of service, with different SLAs for each queue. Equivalent to 8×(#UE) virtual users.

Each virtual user inherits the SINR seen by the original user.

Scheduler should have a metric which is an amalgamation of the various SLA requirements. Each virtual queue should have this metric which translates into its priority.

Traffic model—3 different types of traffic types:

Persistent (0 delay)

Poisson distributed—short time constant—ex. Video traffic

Poisson distributed—larger time constant—ex. Web page requests

Possible weights on traffic types: 70% video, 2% persistent, 28% webpage.

Embodiments may include traffic models used in academia, other vendors.

Embodiments may include intro material on leaky bucket/token bucket algorithms.

TASKS:

UL: a) Fixed beam assignments b) 64 resources, no constraint on sequence

2. DL: (All the following assuming 8 block quantization)

a) all 64 units occupied (unordered)

b) <64 units (cold start—similar to UL)

c) <64 units (ordered)—(fixed and adaptive MCS)

B.15 Example Embodiments for Scheduler Implementation

The following describes a sample implementation of the scheduler ("current implementation"), and some variants.

The current implementation assumes instantaneous per-PRB MCS.

3 scenarios suggested, regarding MCS

Have an Interference graph. As soon as interference from a user goes above a threshold (ex. Noise level), do not schedule. May result in poor spatial reuse.

Change MCS based on an exhaustive search. Maybe only needs to be done once every hour.

Scheduler is in charge of deciding the MCS.

Current implementation assumes packets can be fragmented and zero resulting overhead. Overhead may be taken into account in other embodiments.

Current implementation assumes distance-dependent pathloss. It was suggested that in the UL, UEs transmit at different powers but have the same received powers. (Confirm with Mike Grimwood about power tuning in the UL).

Mean arrival rates in terms of bytes may be the same for different users but they can be different in terms of PRBs.

No of users to be considered should be more than the current choice of 10.

Far scatterers have not been implemented. Implement far scatterers.

A suggestion for fair beam update order: Each PRB table can be broken into 4 segments of 16 PRBs each and each beam gets first-dibs on a different segment.

The simulation numbers (throughput) seem low (~40 Mbps). Should be ~250 Mbps for a single-stream 10 MHz band.

B.15.1 Possible Additional Features

Baseline check: Schedule users assuming no interference. Models zero-forcing. Also gives an upper bound.

Look-back: While choosing the best user to be scheduled on a PRB, consider not only the interference from the already scheduled users but also modify the interference (hence, weights) of the already scheduled users and make the decision based on the actual sum-weights.

Correct flushing of queues: Model incoming traffic in terms of bits. When scheduling a user on a PRB, calculate its MCS using the SINR→MCS mapping table. Based on this MCS, and 128 symbols per PRB, calculate the throughput and remove the corresponding number of bits from the queue.

B.16 Additional Exemplary Embodiments

1. May include some corner cases
2. May include more users per beam, various physical environments, different QoS queue queues, compare to bruteforce, processing requirements and info latency.
3. May include deciding on a scheduling metric/function in a way that contains all SLA parameters.
5. May include a difference between max f sub to constr vs max f=wt
6. May include focusing on max wt.
7. May include multi-sector scheduling—going for non-optimal algorithm but easily communicable informations.
8. No of beams=16, (8×10) UEs per beams. May include centralized scheduler performance analysis
9. May include comparing run times of 1 beam-scheduling
10. Compare with a scheduler which only consider a fixed number of beams silent.
11. May include distributed computation of weights by each beam.
12. May include reporting why the SLAs weren't met.
13. May include guaranteed throughput into the max weight.
14. May include a simple test case with only deadlines, wherein the max throughput subject to meeting deadlines optimally is considered
15. May include a single-function approximation for the weights being sufficient.
16. May include real-world traffic models.

In the next section, some additional examples of fixed wireless access channels and the concept of grouping of wireless devices for scheduling is disclosed.

C1. Example Characterization of the FWA Channel

There is a wide interest in FWA systems, as they promise to deliver fast internet connectivity without the need for the expensive laying of cables to the customer premises. Many of the systems currently under development (or ready for deployment) are based on cellular standards such as the LTE (Long Term Evolution) standard of 3GPP. However, use of such standardized products for FWA is inefficient because those systems are designed to cope with user mobility. This document discloses various methods, which can be used individually, or in conjunction, on how to exploit the special properties of FWA propagation channels in order to improve system performance.

Some of the disclosed embodiments use a property that an FWA channel consists of the sum of a time-invariant part, superposed with a weaker time-variant component; the schemes thus typically do not have equivalents for mobile wireless systems where the entire channel typically changes with time.

An FWA channel consists of components that are temporally invariant, such as (possibly) a line of sight (LOS) component, reflections on buildings, diffraction over rooftops, etc. Note that these time-invariant components exist even in the case of a non-LOS scenario, i.e., where the direct optical LOS is blocked. In addition to these time-invariant components, there are also time-varying components, which mostly arise from three factors—(1) moving cars/trucks, (2) moving people, and (3) moving leaves.

In this document, the ratio of the total sum power of the time-invariant components to that in the time-variant components is called the temporal Rice factor. To make this more precise, define the set $S^s$ and $S^d$ as the sets of multi-path components (MPCs) being time-invariant and time-variant, respectively. Then the temporal Rice factor (denoted $K_t$) is defined as $$K_t = \Sigma_{i \in S^s} P_i / \Sigma_{i \in S^d} P_i. \quad (1)$$

This temporal Rice factor may be compared to the definition of the "standard" (mobile) Rice factor, which is usually assumed to be nonzero only when either a LOS or (for NLOS) a dominant reflected MPC exists. The standard Rice factor (denoted $K_r$) is defined as $$K_r = P_{LOS} / \Sigma_{\notin LOS} P_i. \quad (2)$$

Thus, a high temporal Rice factor (e.g., 20 dB) is common in fixed wireless systems even in NLOS situations. In contrast, in mobile systems, the temporal Rice factor cannot be meaningfully defined; the "standard" Rice factor typically is on the order of 10-20 dB in LOS situations, and is near 0 in NLOS. A further interesting difference, the LOS component in a mobile system actually shows phase variations as a function of time, though the amplitude stays constant.

As discussed, an FWA channel is fundamentally different from a mobile channel with a slow-speed UE. While both channels have small root mean-squared (rms) Doppler spreads, an FWA channel has a time-invariant component around which there are (possibly quite fast) small variations. By contrast, a mobile channel with a slow UE may change completely over a large enough timescale. It is this difference that allows some of the disclosed embodiments to create more efficient channel estimation and extrapolation schemes.

In some embodiments, an additional property of FWA channels is that the time-variant components dominantly occur at small excess delays, which may be due to the fact that relevant time-varying scatterers (in particular, cars and moving people) are usually close to the UE (whereas signals from cars "around the street corner" suffer strong attenuation, and are thus not relevant). Multi-path channels (MPCs) going via these scatterers, and from there via the dominant propagation paths, have a small excess delay relative to those dominant paths.

For example, a path defined as: UE to nearby moving scatterer to far scatterer to BS, would typically have low power. Long-delayed components have a somewhat weaker power than short-delayed ones, since they suffer larger distance-dependent pathloss, and also might have to traverse more obstacles on the way form TX to RX. Thus, even if the relative power ratio between time-invariant and time-variant contributions of the long-delayed MPCs is the same, the absolute contribution of time-variant MPCs with long delays is small. This is compounded for the situation that the time variations are coming from moving cars. In that case, time-variant MPCs with large delay would take the path UE (with downward direction)—car (upward)—far scatterer (upward)—BS. From the usual laws of reflection angles and typical heights of UEs and BSs in FWA systems, it can be easily seen that nearby cars do not play a role, since reflections off them would go "over the head" of the far scatterer; while far-away cars carry little power.

To a first approximation, the support of the delay-Doppler impulse response can be expressed as the sum of two rectangles: one extending from $[0, \kappa_\tau^d; -\kappa_\nu^d/2, \kappa_\nu^d/2]$ (where the first coordinate is delay and the second coordinate is Doppler) and a second one extending along the delay axis, with the extent along the y-axis either infinitesimal (e.g., a delta function at $\nu=0$, or extending $[-K_T^s/2, K_T^s/2]$. This document provides interpretations of this latter definition as reflecting hardware non-idealities. Let $K_T^{pne}$ be defined as some constant $K_T^{pne} < K_T^S - K_T^d$; it can be interpreted as the part of the static impulse response that will be used for estimation of phase noise etc.

In some embodiments, when pilot tones are scheduled such that the corresponding received signals overlap, as described above, then it may be necessary to from time to time also transmit pilots that do not have such an overlap. This advantageously enables the time-invariant part to be extracted. The frequency of these additional pilots may be much lower than those required to estimate the time-variant part.

C2. Example Embodiments for Beam Scheduling

In recent years, new developments in wireless communication technology has made is possible for wireless systems to use spatial multiplexing in addition to the time/frequency/code division multiplexing. For example, in cellular networks such as the upcoming 5G networks and the above-described FWA networks, a network side node such as the tower 308 may form communication links with user devices using transmission beams that provide a spatially directed beam for transmitting to or receiving from user devices. In principle, transmission and reception can be made on different beams without causing interference between such signals due to their separation in the beam domain or spatial domain. This multiplexing can be advantageously used along with time/frequency/code division multiplexing to increase the data capacity of a wireless network. However, one difficulty faced by such systems is how to group all user devices to which the network node offers wireless connectivity into different groups such that the beam-based multiplexing maximally leverages the use of separation of transmission paths between the network node and the user devices.

The present document disclosed techniques that can be used by embodiments to increase the efficiency of scheduling transmissions in a beam-based wireless communication system. For example, embodiments may achieve this increased efficiency by first grouping user devices into groups such that each group can be served by a transmission beam. Each such group may further be divided into fractions (e.g., 2 or more groups) of user devices using a metric of transmission paths between the network node and the user devices. Then, transmissions may be scheduled to occur for each transmission beam to serve a user device in the subgroup, thereby having a fractional use of each beam for each group. The present document provides additional techniques and embodiments of the grouping and scheduling technique.

Figure 12:
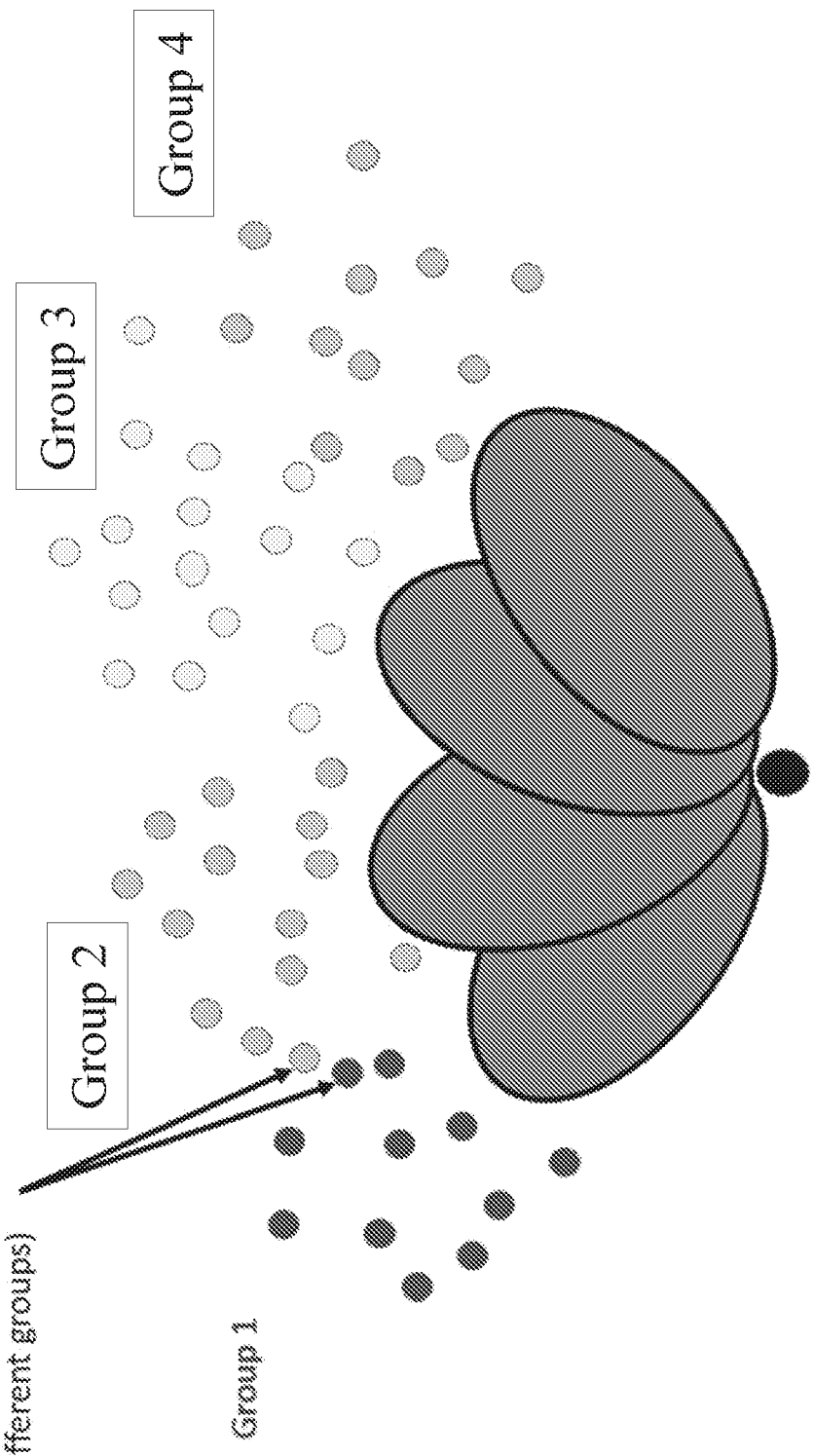
FIG. 12 shows an example of a fractional beam scheduling scenario.

FIG. 12 shows an example of scheduling multiple transmission beams for a plurality of user devices divided into different groups. As shown therein, Groups 1-4 comprise spatially separated user devices, such that the user devices (or users) in each group are covered by a single transmission beam. However, if two users with an angular separation that is lower than a threshold are selected from different groups, the resulting simultaneous transmission to these users would result in degraded performance due to high interference levels. Thus, a separation into groups based on the transmission beam may result in degraded transmissions.

Figure 13:
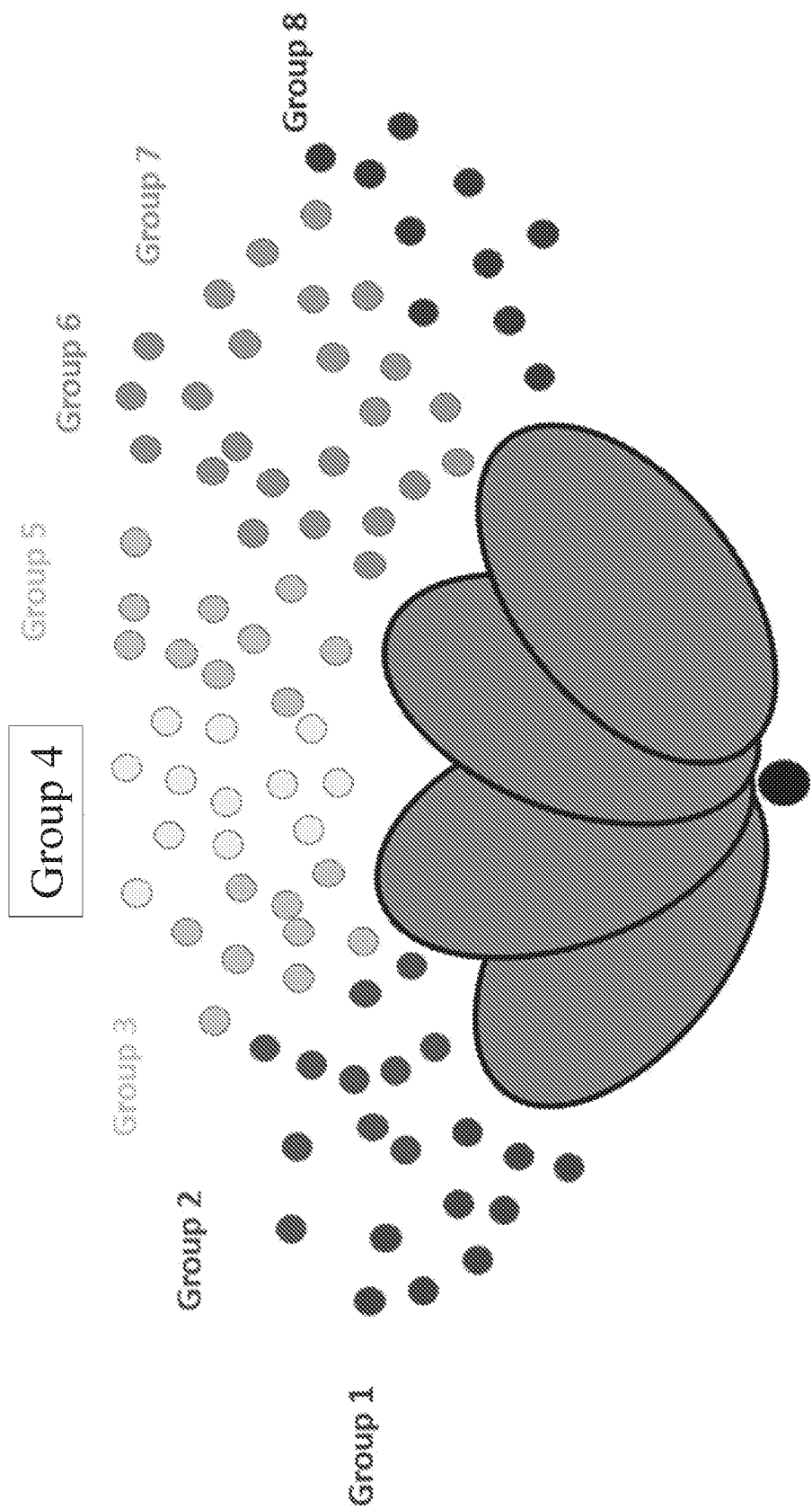
FIG. 13 shows another example of a fractional beam scheduling scenario.

FIG. 13 shows another example of scheduling multiple transmission beams for a plurality of user devices divided into groups and sub-groups. As shown therein, Groups 1-4 shown in FIG. 12 are halved and result in Groups 1-8, wherein two adjacent groups are covered by a single transmission beam. For example, Groups 1 and 2 are covered by a first transmission beam, and Groups 5 and 6 are covered by a third transmission beam. As will be described next, doubling the number of groups (referred to, in an example, as "half beam groups") may result in better performance.

Figure 14:
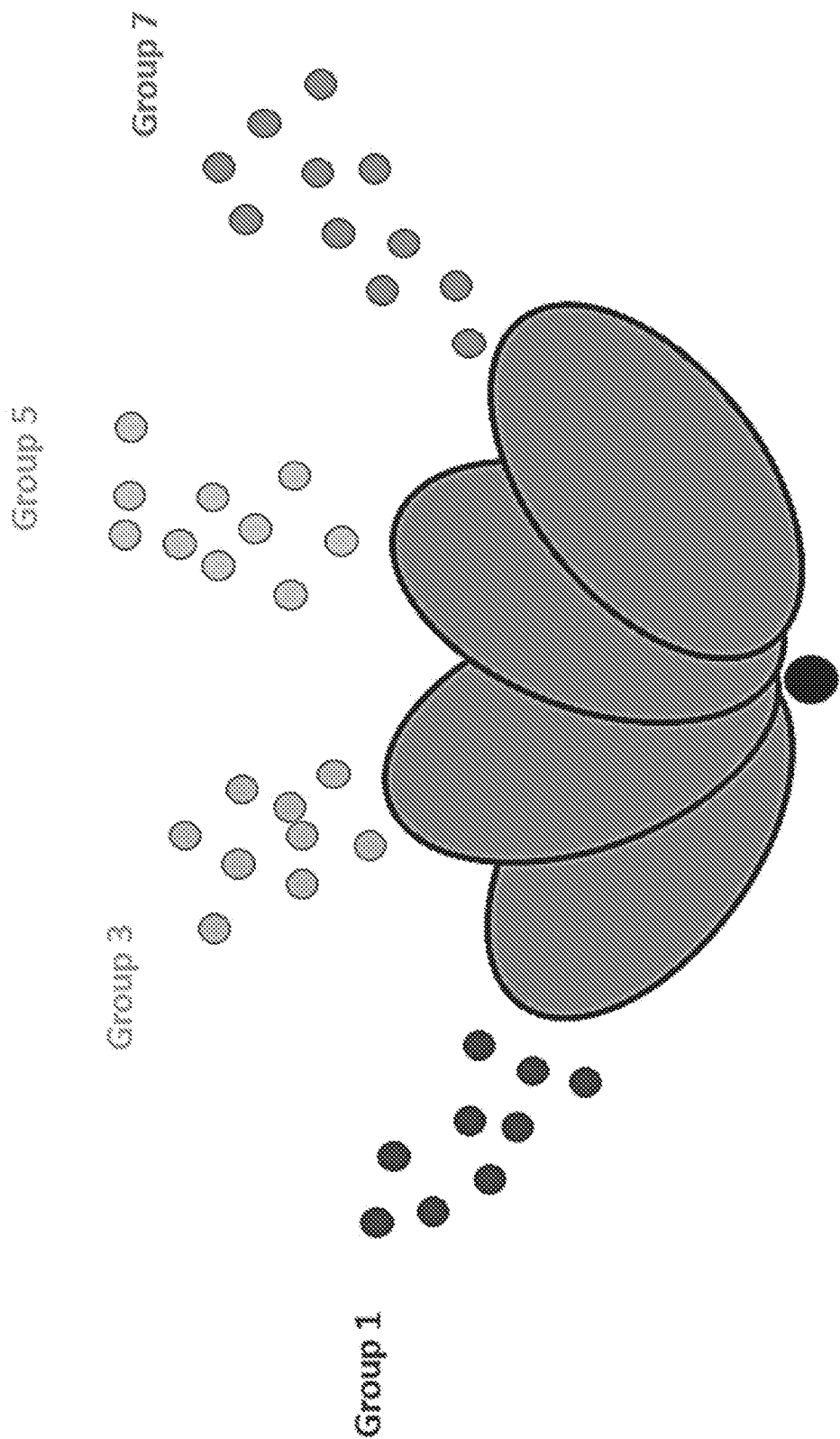
FIG. 14 shows another example of a fractional beam scheduling scenario.
Figure 15:
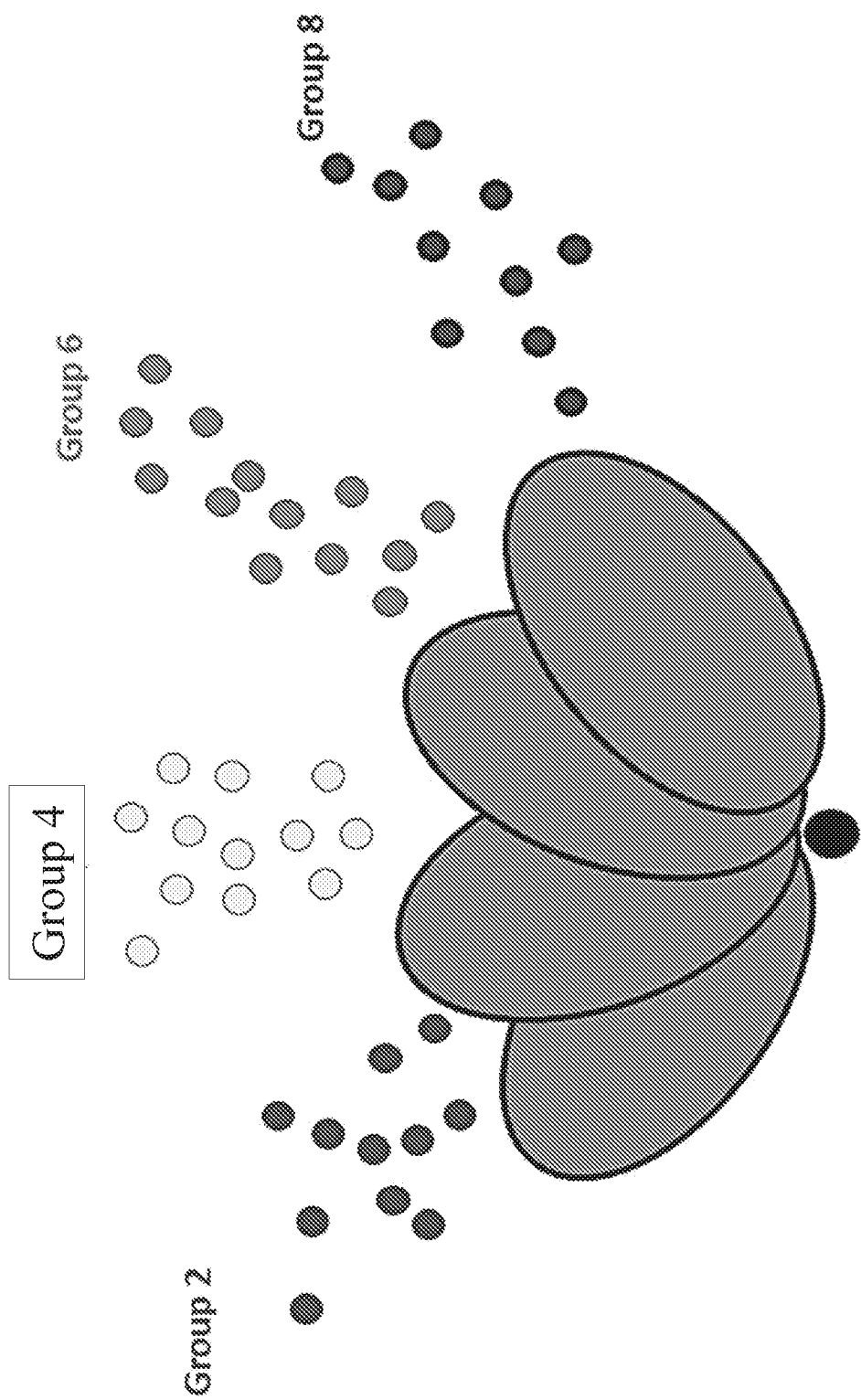
FIG. 15 shows another example of a fractional beam scheduling scenario.

FIGS. 14 and 15 shows an exemplary embodiment for scheduling multiple transmission beams, based on time-multiplexing, for a plurality of user devices. For example, the network node may simultaneously transmit to users (or user devices) in Groups 1, 3, 5 and 7 at a first time (as shown in FIG. 14), and to users in Groups 2, 4, 6 and 8 at a second time (as shown in FIG. 615. That is, users that are served at the same time have transmission metrics that are greater than a threshold. In an example, the threshold may be determined based on an intended level of interference that may be tolerated at the user devices. In some embodiments, the level of interference may be quantified using the signal-to-noise ratio (SNR) or the signal-to-interference-plus-noise ratio (SINR).

In some embodiments, user devices in the "half beam groups" may be scheduled simultaneously based on the transmissions being precoded at the network node, and the user devices implementing joint equalization techniques to process the received signals. For example, the precoding at the network node may be based on Tomlinson-Harashima precoding vectors.

The subsequent discussion in the present document includes parameters and setup information for numerical implementations of the disclosed technology. The various exemplary scenarios for which the fractional beam scheduling methods are implemented are (a) pure line-of-sight (LOS) with a square window, (b) synchronous unscheduled multiple access (SUMA) LOS with a square window, and (c) SUMA non-LOS (NLOS) with a Hamming window.

C3. Exemplary Methods for Fractional Beam Scheduling

In some example embodiments, fractional beam scheduling may be performed as follows. Let T1, T2, T3 and T4 be four transmission beams in a wireless communication network. User devices may be partitioned into corresponding four groups A, B, C and D such that the transmission path for each user device in one group corresponds to a same transmission beam (e.g., all user devices in group A use T1, all user devices in group B use T2, and so on).

According to some embodiments, the groups A, B, C and D may further be divided into multiple sub-groups. For example, A1, A2, B1, B2, C1, C2 and D1, D2 respectively. This grouping may be performed such that corresponding sub-groups in each group are isolated from each other by a transmission metric (e.g., their cross-effect, measured as SINR, is below a threshold). As an example, sub-groups A1, B1, C1 and D1 may form a first partition, while A2, B2, C2 and D2 may form a second partition. Therefore, a scheduler may schedule transmissions for all user devices of sub-groups in the first partition to occur at the same time, while being assured that the relative isolation between these transmissions will be maintained. Similarly, in a next time slot, the scheduler may schedule transmissions for user devices from the second partition, and so on, as described with respect to odd/even grouping in FIG. 12. Accordingly, it will be appreciated that using only a fraction of a group served by a transmission beam at a given time results in an overall improvement in the quality of signal transmissions received by user devices and the network node.

Figure 16:
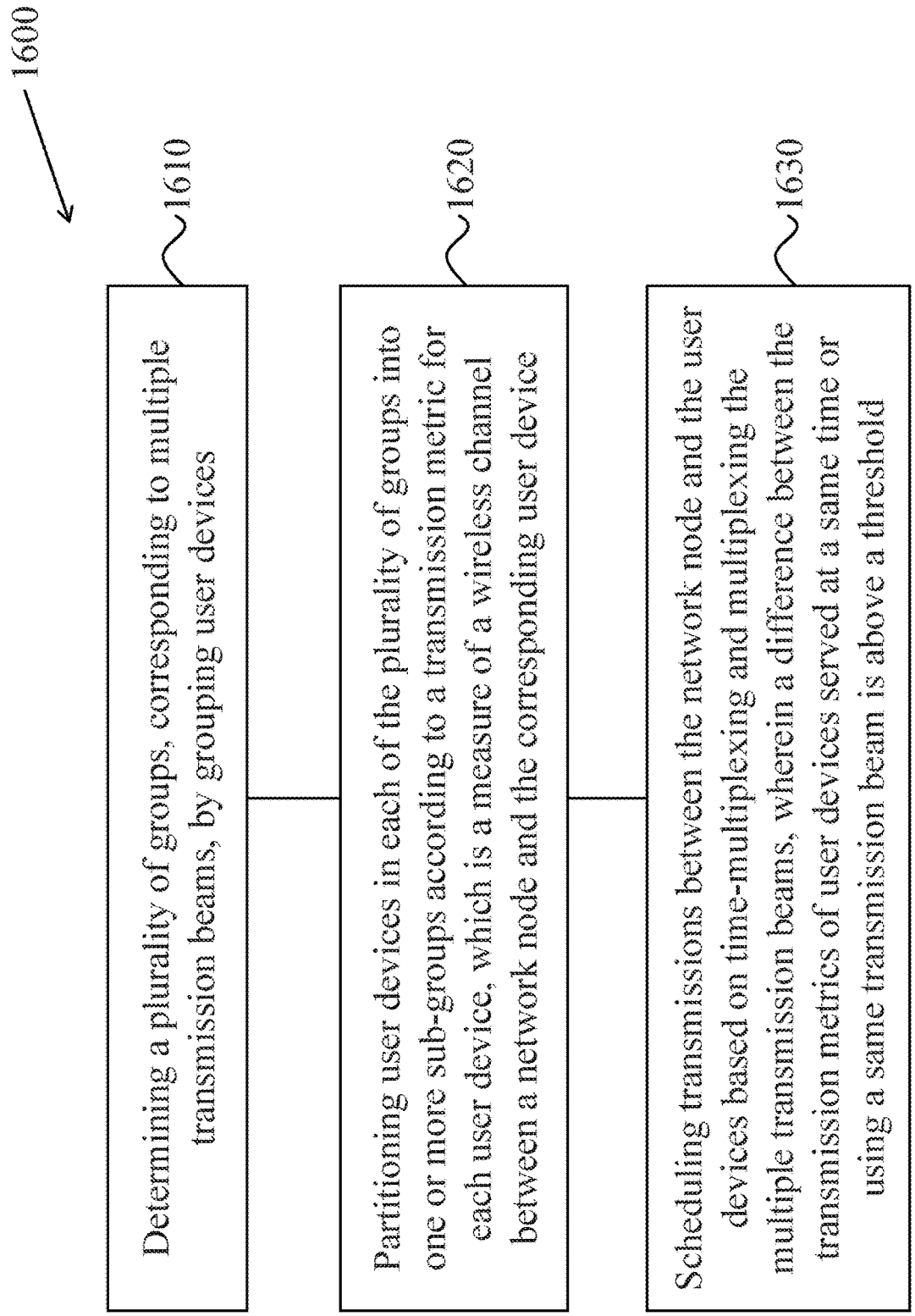
FIG. 16 is a flowchart for an example process of scheduling.

FIG. 16 is a flowchart representation of an example of a wireless communication method 1600 that uses fractional beam scheduling in wireless systems. The method 1600 includes, at step 1610, determining a plurality of groups, corresponding to multiple transmission beams, by grouping user devices.

The method 1600 includes, at step 1620, partitioning user devices in each of the plurality of groups into one or more sub-groups according to a transmission metric for each user device, which is a measure of a wireless channel between a network node and the corresponding user device. In some embodiments, an interference level at the subset of user devices is based on the transmission metrics of user devices.

In some embodiments, the transmission metric comprises one or more of a distance, an angular distance or a precoding vector. In one example, the precoding vector comprises a Tomlinson-Harashima precoding vector.

In some embodiments, the user devices are configured to implement a joint equalization algorithm to process the simultaneous transmissions that have been processed using precoding vectors based on the transmission metric corresponding to those user devices.

The method 1600 includes, at step 1630, scheduling transmissions between the network node and the user devices based on time-multiplexing and multiplexing the multiple transmission beams, wherein a difference between the transmission metrics of user devices served at a same time or using a same transmission beam is above a threshold. In some embodiments, the threshold is based on an intended interference level at each of the subset of user devices. In other words, the signal-to-interference-and-noise-ratio (SINR) is deterministic, and may be computed or calculated, based on the transmission metrics for each of the user devices.

For example, the precoding vectors for transmissions to the user devices may be selected based on the angular (or linear) separation between the user devices to ensure that the SINR at the user device remains below a predetermined threshold.

Figure 17:
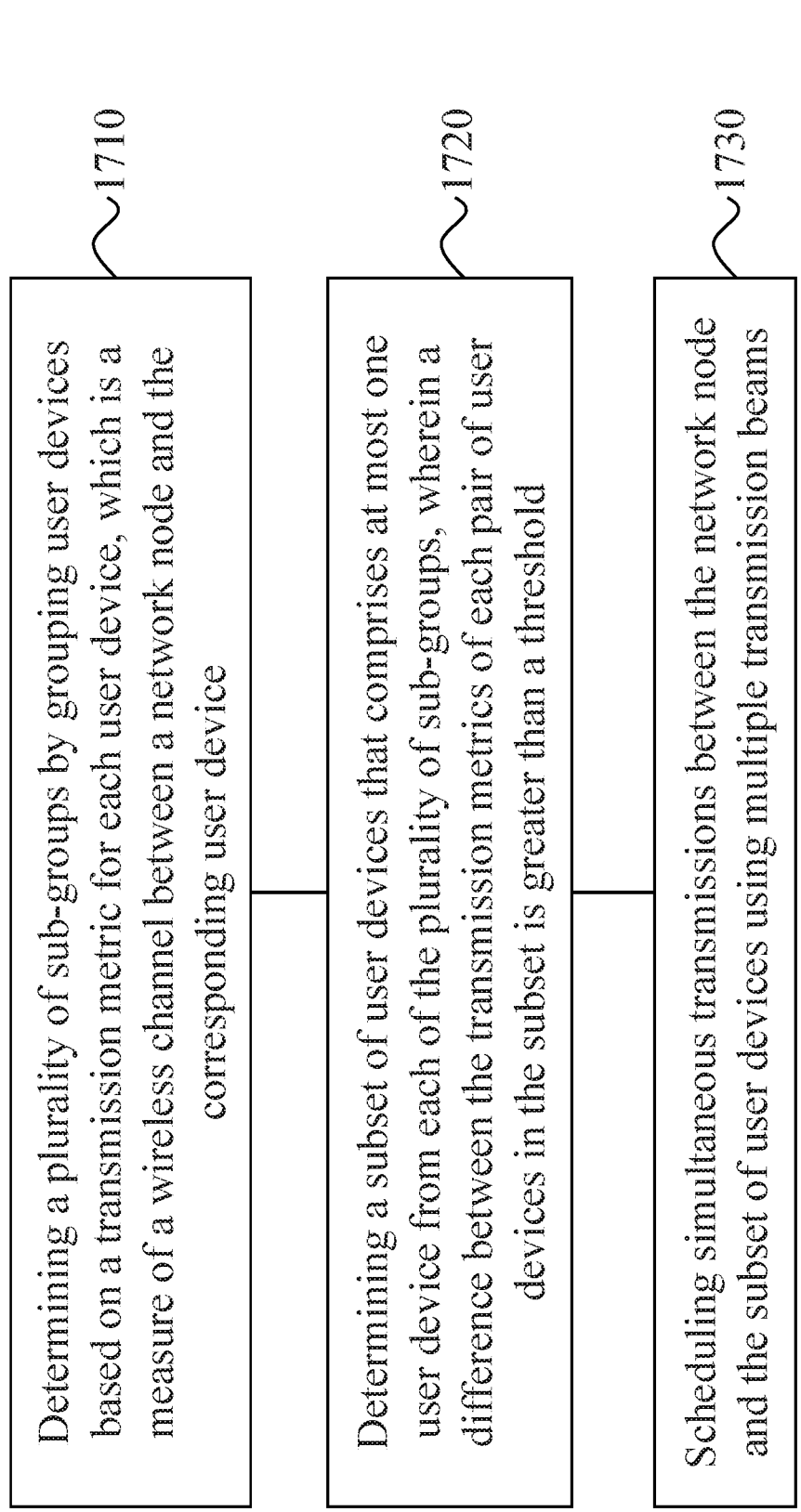
FIG. 17 is a flowchart for an example process of scheduling.

FIG. 17 is a flowchart representation of another example of a wireless communication method 1700 that uses fractional beam scheduling in wireless systems. The method 1700 includes, at step 1710, determining a plurality of sub-groups by grouping user devices based on a transmission metric for each user device, which is a measure of a wireless channel between a network node and the corresponding user device.

The method 1700 includes, at step 1720, determining a subset of user devices that comprises at most one user device from each of the plurality of sub-groups, wherein a difference between the transmission metrics of each pair of user devices in the subset is greater than a threshold. In some embodiments, the threshold is based on an intended interference level at each of the subset of user devices.

The method 1700 includes, at step 1730, scheduling simultaneous transmissions between the network node and the subset of user devices using multiple transmission beams.

The present document further provides additional details related to various metrics used for the grouping and sub-grouping and performance of a scheduler as tested by the inventors for various operational parameters in a wireless system. For example, the Signal to Interference plus Noise (SINR) measure is one example metric that may be used for the transmission paths between the network node and user devices, and has a direct impact on the error observed during transmission. For example, the figures show measured probability of error as a function of SINR (horizontal axis) for full-beam and half-beam scheduling for LP (line of sight propagation) and NLP (non-line of sight propagation) situations. The superiority of the fractional beam scheduling approach can be easily seen from the performance curves.

Next, we describe various examples of the precoder thresholds used for comparing transmission path metrics to achieve certain target SINR from the transmissions scheduled by the scheduled. It will be seen that the half beam approach provides superior SINR numbers for transmissions at each error probability. The present document also provides another way by which to measure the efficiency of a scheduler is to compute "median SINR" experienced by all user devices being served by the network node. The graphs presented next show the increased median SINR experienced by the user devices due to the use of half beam approach (or fractional beam approach, in general).

C4. Exemplary Implementations of the Disclosed Technology

Figure 4:
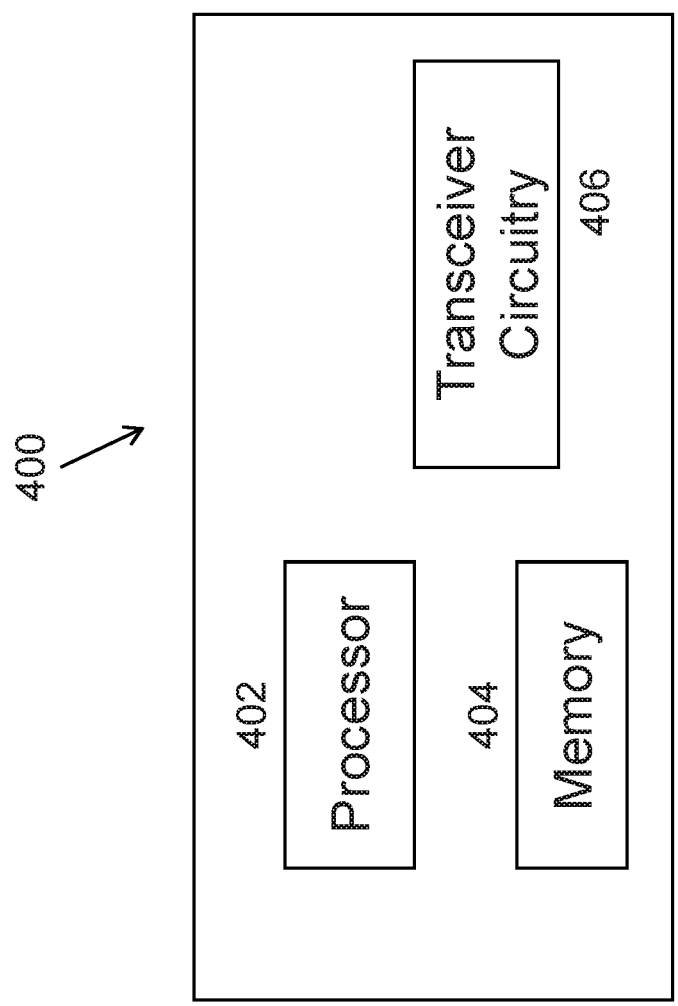
FIG. 4 shows an example of a wireless transceiver apparatus.

The apparatus 400 shown in FIG. 4 may be used to implement methods 1600 and 1700 described herein.

Sections C1 to C4 disclose technique that can be used by a scheduler in a multi-beam transmission system for improving quality of signal transmissions by partitioning user devices into sub-groups such that transmissions may be scheduled to occur via transmission beams to/from the sub-group of devices and a network node while at the same time ensuring that the user devices in the sub-group are isolated from each other to ensure interference to each other's transmissions stays below a threshold such as an SINR threshold. It will further be appreciated that these sub-groups are formed such that (1) user devices in the sub-groups of a given group all use a same transmission beam (at different times) and (2) user devices from different groups are partitioned into sub-groups based on a transmission metric.

C5. Fractional Beam Scheduling Examples

C5.1 Antennas

Figure 18:
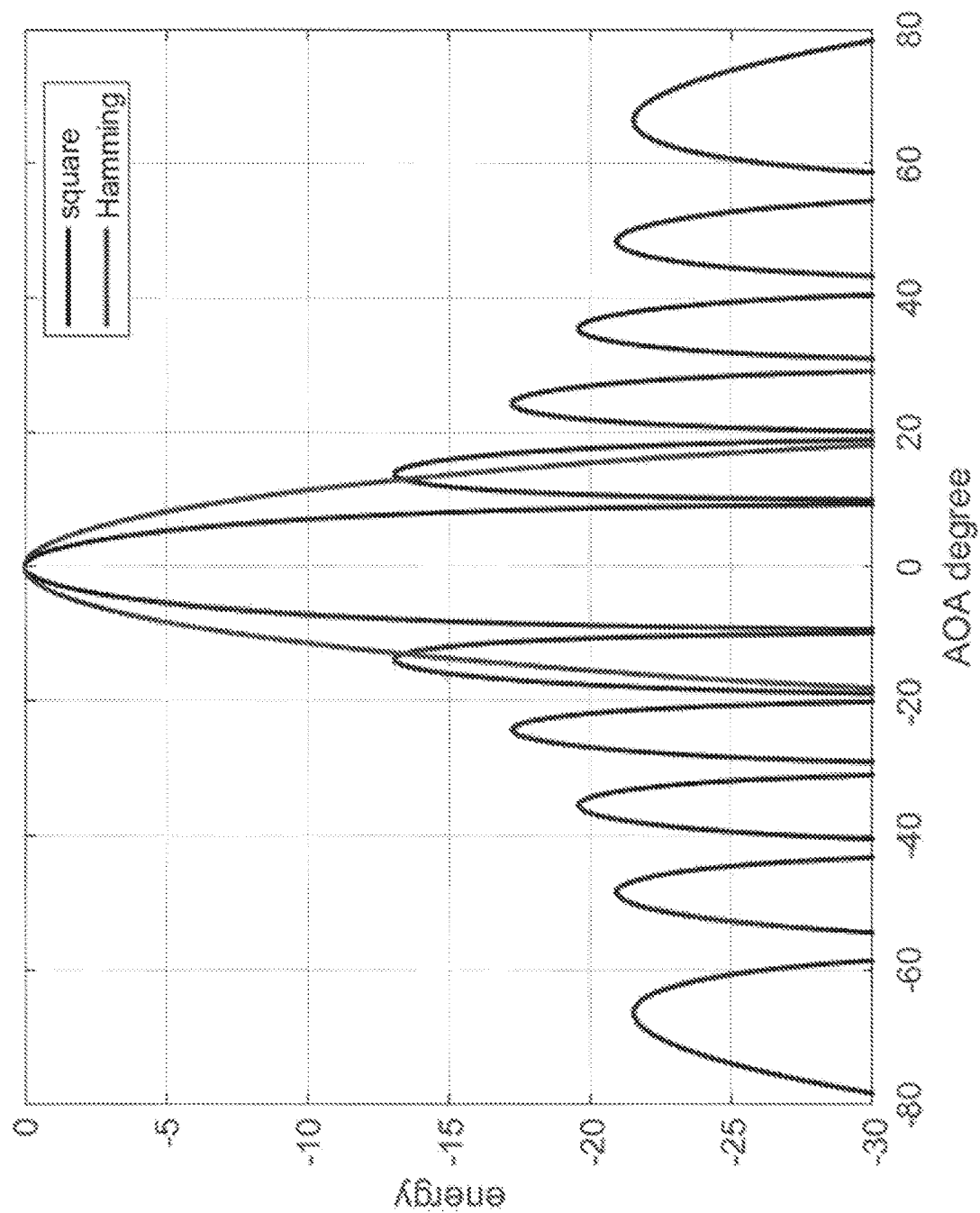
FIG. 18 shows examples of beam patterns.
Figure 18:
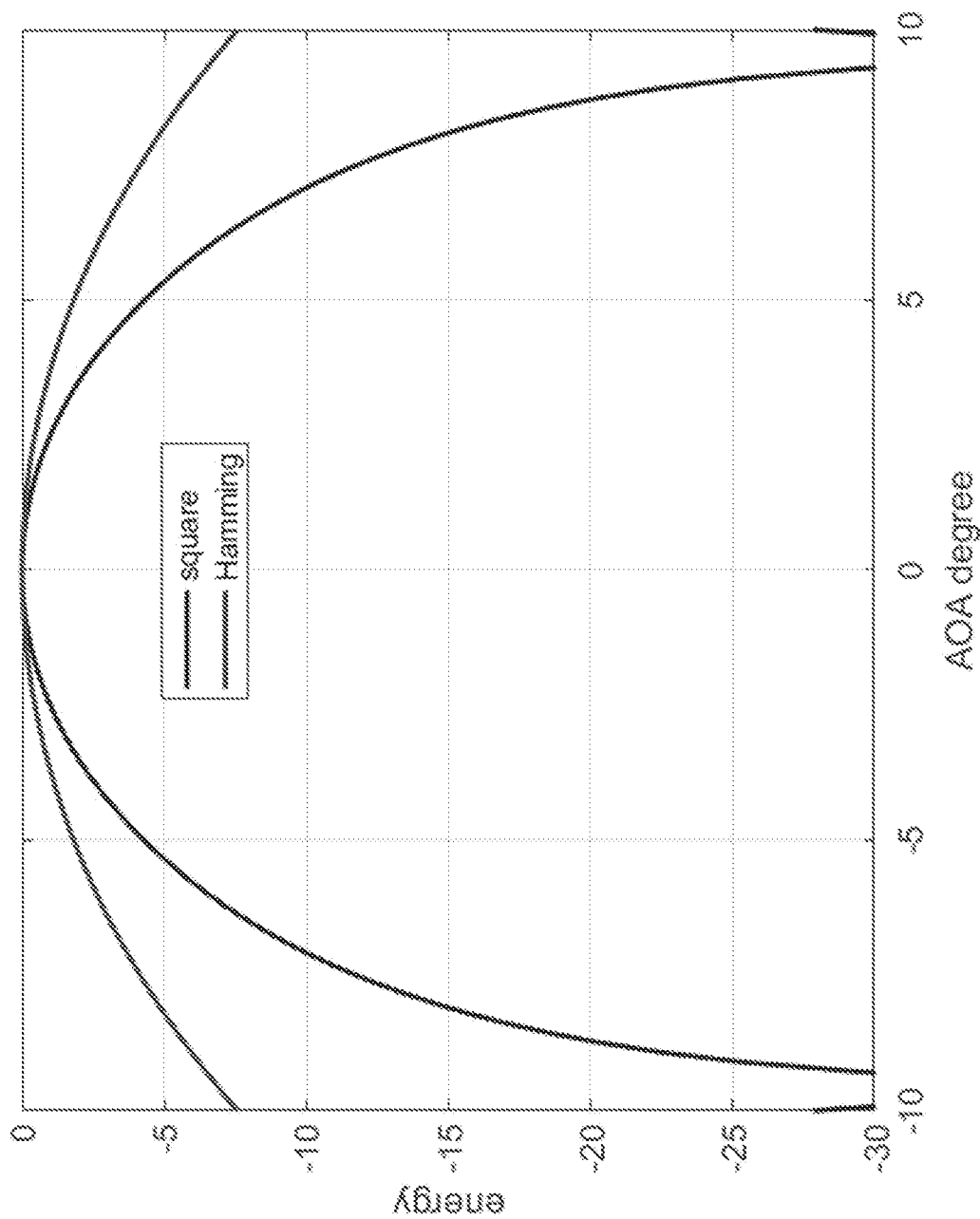

Base Station
12 single polarization beams
Bore sights angles evenly cover 120 degree sector
Beam pattern: either square or hamming window
UEs
Omni-directional, single polarization
FIG. 18 shows examples of beam patterns for two windows, plotted to show energy of beam as a function of Angle of Arrival (AOA).

UE geometry may include 2000 users randomly distributed in 120 degree sector, with: Min distance 100 meters, Max distance 1000 meters.

Channel models include: Pure LOS, $1/r^2$ pathloss, Quadriga suburban macro LOS, Quadriga suburban macro NLOS.

Example Embodiment—Pure LOS with a Square Window

Figure 19:
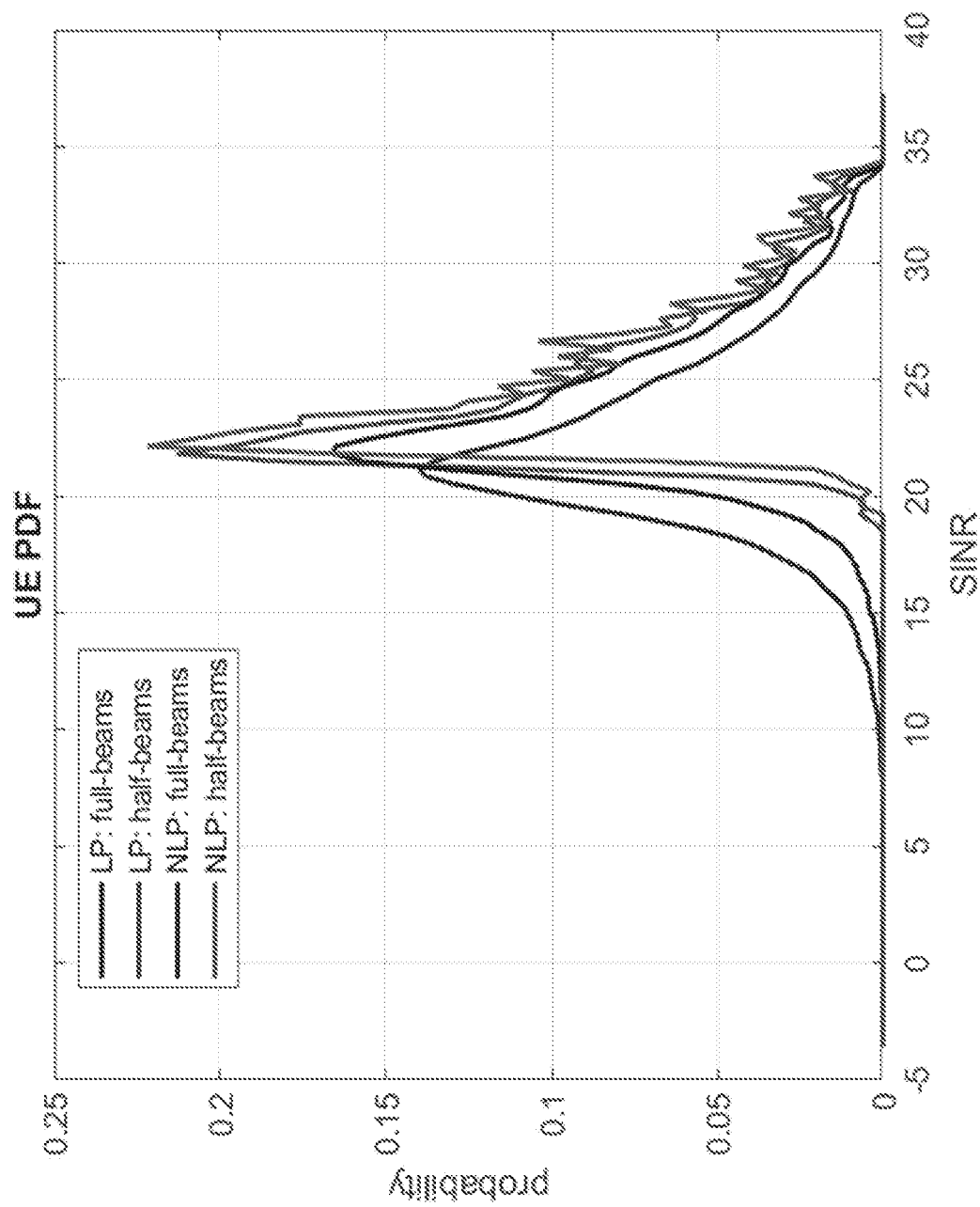
FIG. 19 shows example performances of various scheduling schemes.
Figure 19:
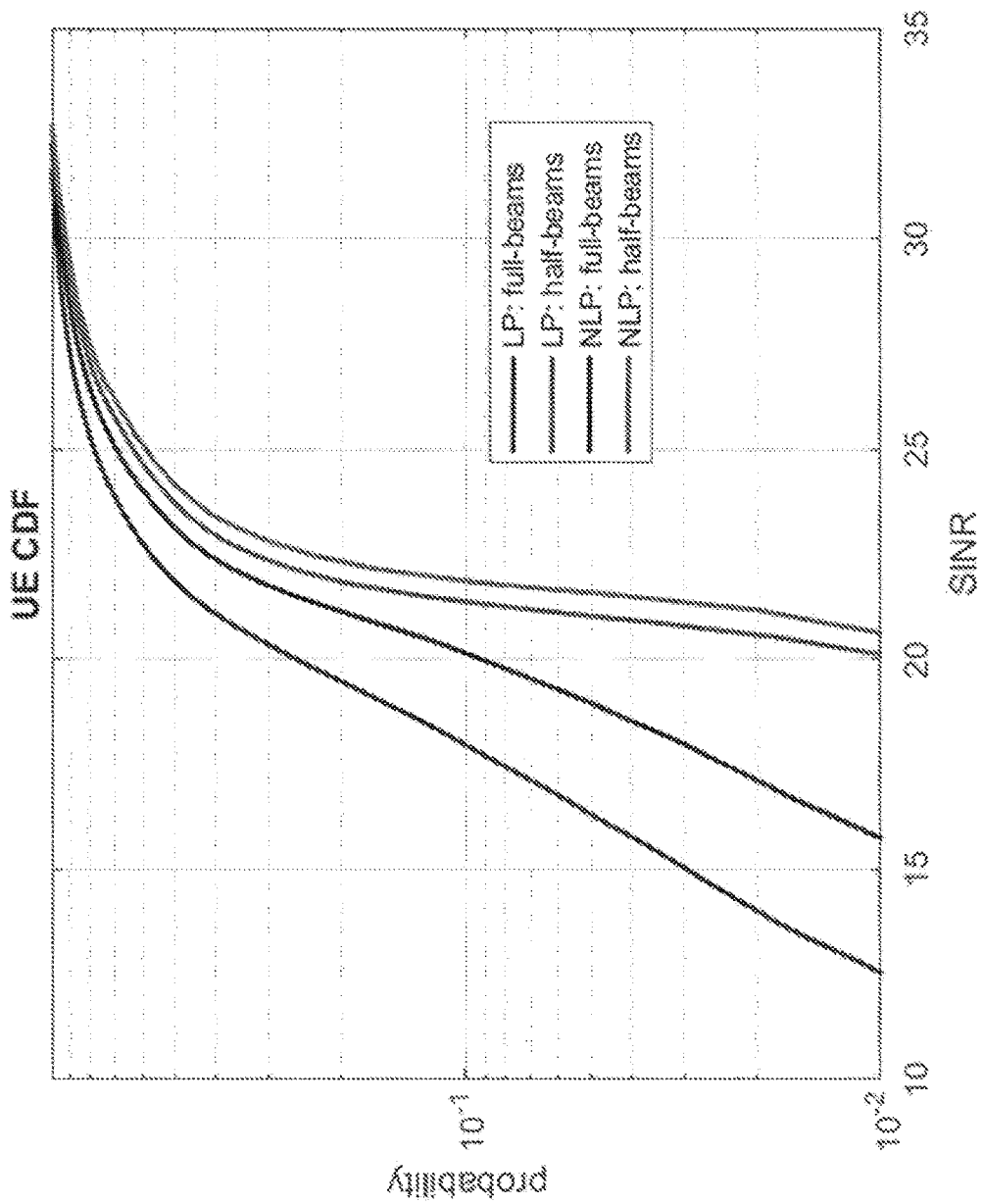

FIG. 19 shows simulation results for 10,000 random MU-MIMO drops. For each drop, a random UE is selected from each group.

Figure 20:
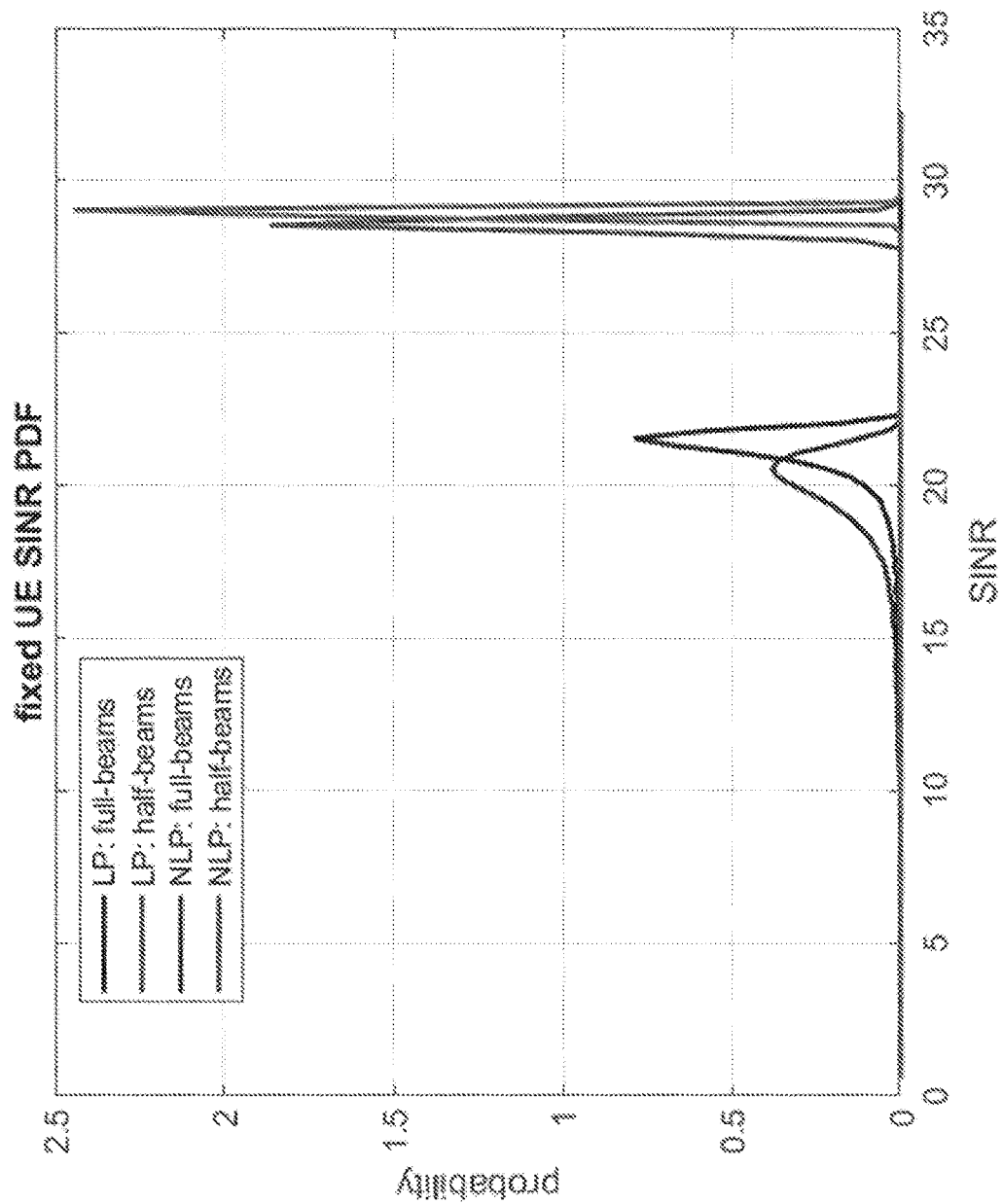
FIG. 20 shows example performances of various scheduling schemes.
Figure 20:
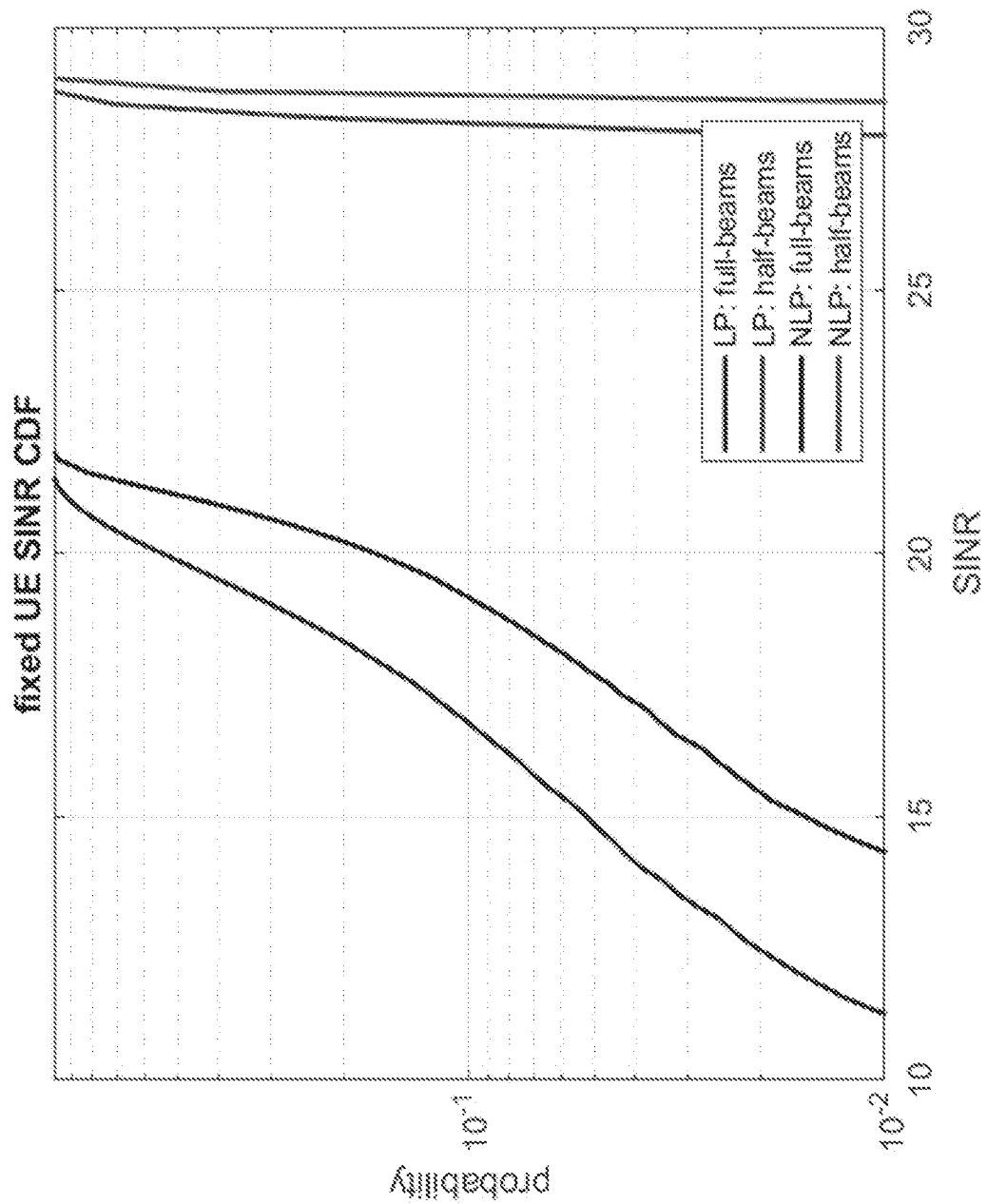

FIG. 20 shows results for a fixed user configuration for a fixed a UE in full-beam group 6, varied UEs selected in other groups, Fixed a UE in half-beam group 11, varied UEs selected in other groups, and SINR of fixed user being a random variable.

Figure 21:
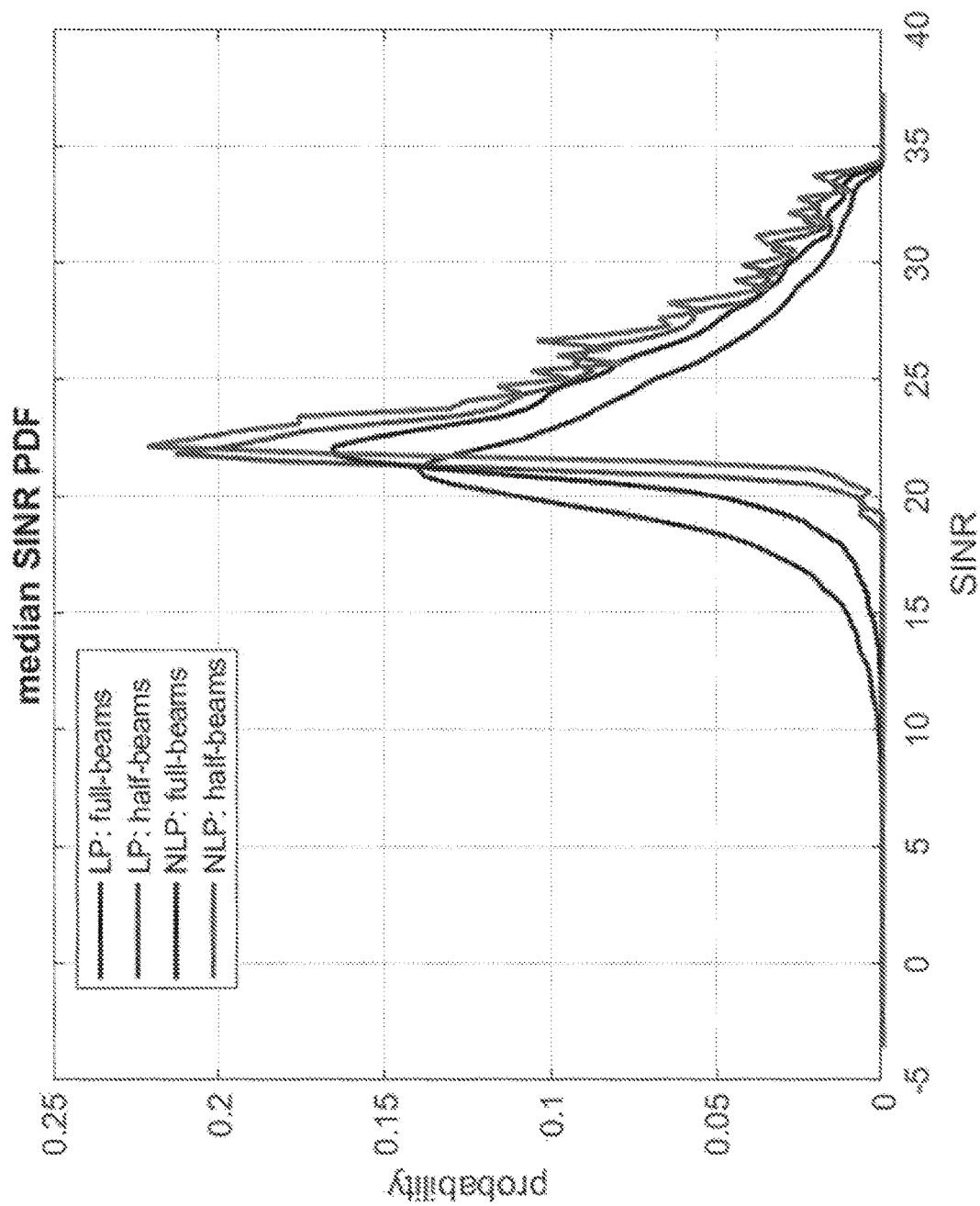
FIG. 21 shows example median signal to noise ratio (SNR) performance of scheduling schemes.
Figure 21:
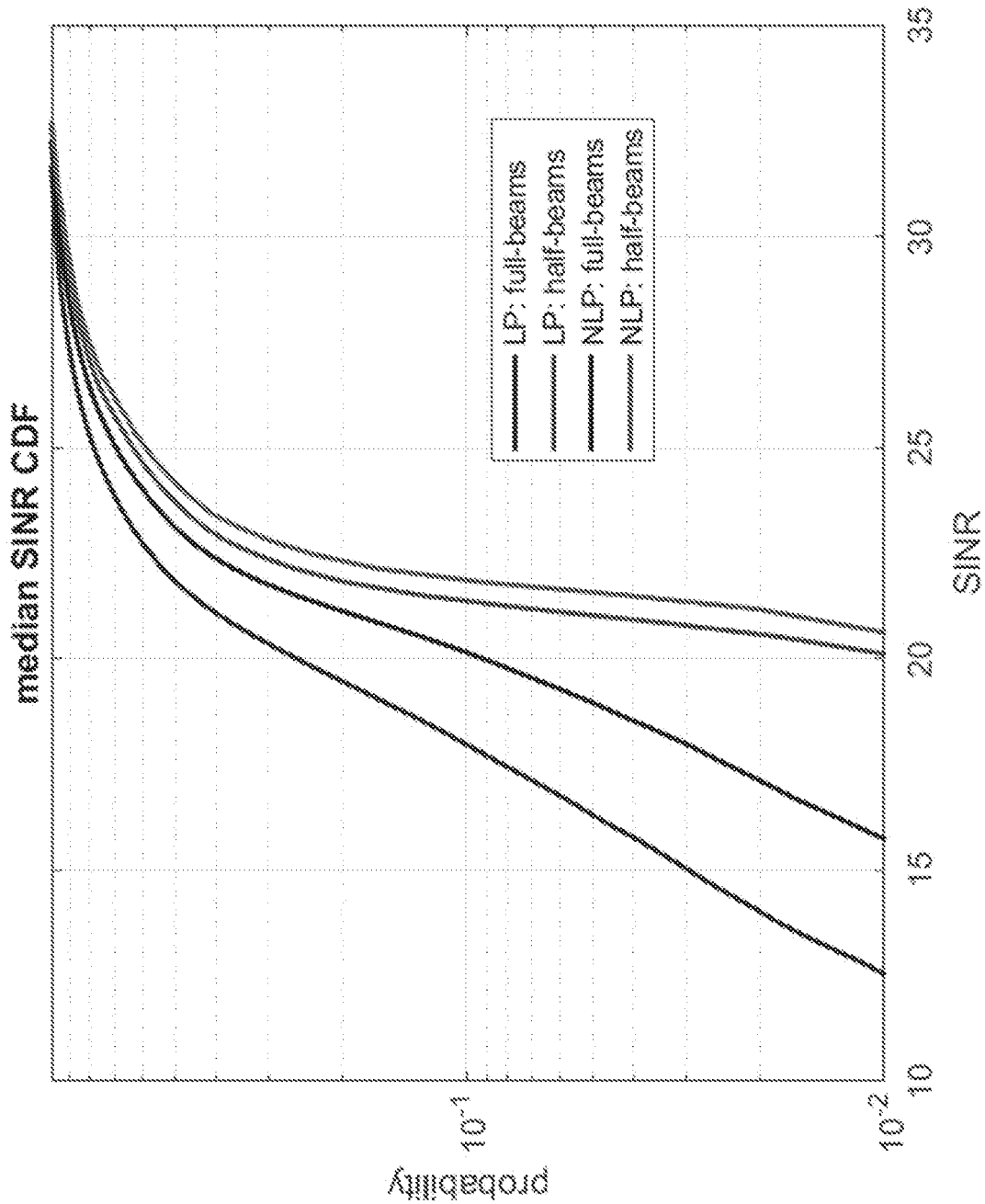

FIG. 21 shows results for median SNR values. This value represents the most likely SNR experienced by the UE. The graph shows median SNR experienced by the UE.

Figure 22:
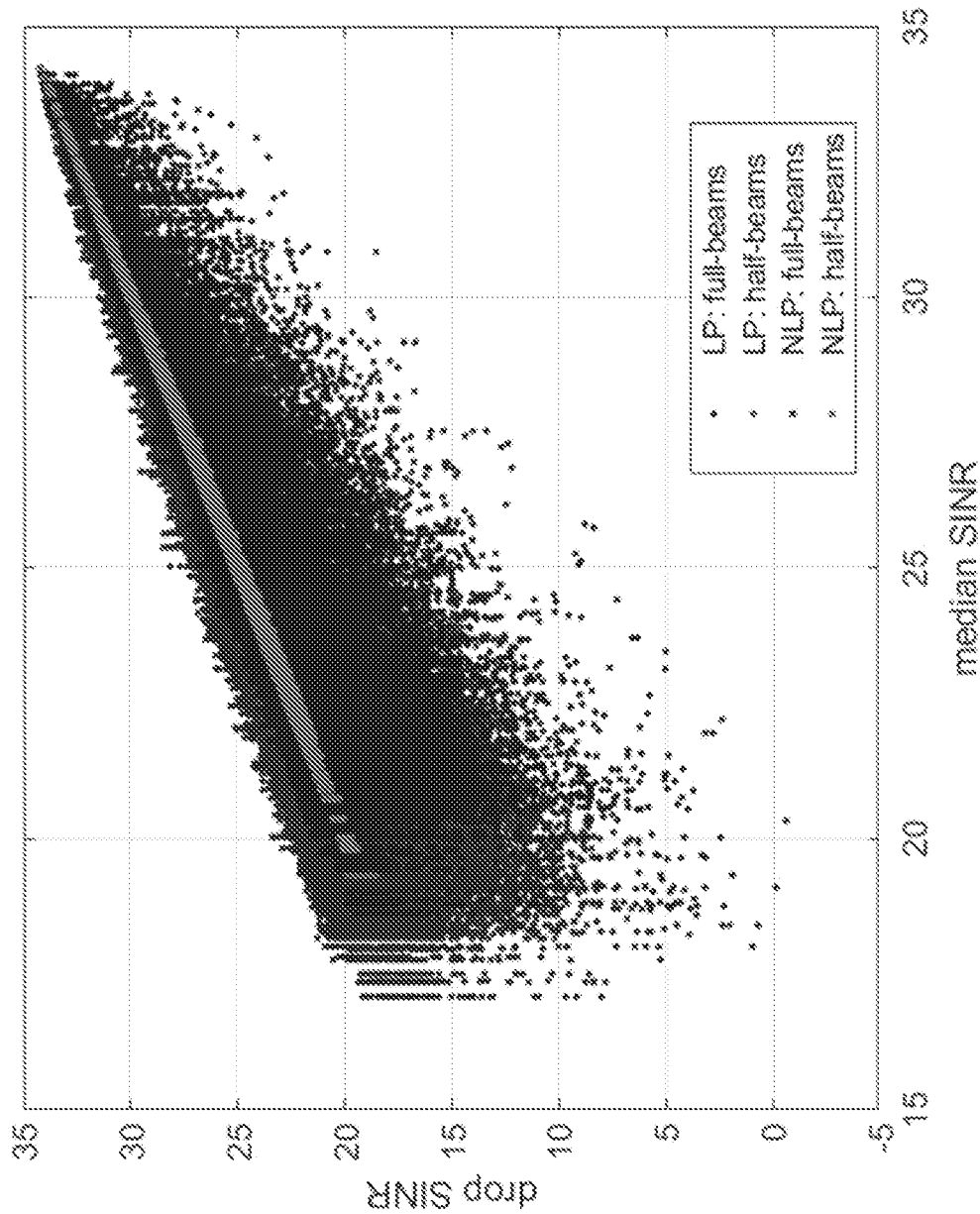
FIG. 22 is a scatter plot showing signal to interference plus noise ratio (SINR).

FIG. 22 shows a graph for drop SINR. For each drop, the UE's SINR will vary from the median SNR, this variation is viewed in the scatter plot of FIG. 21.

Figure 23:
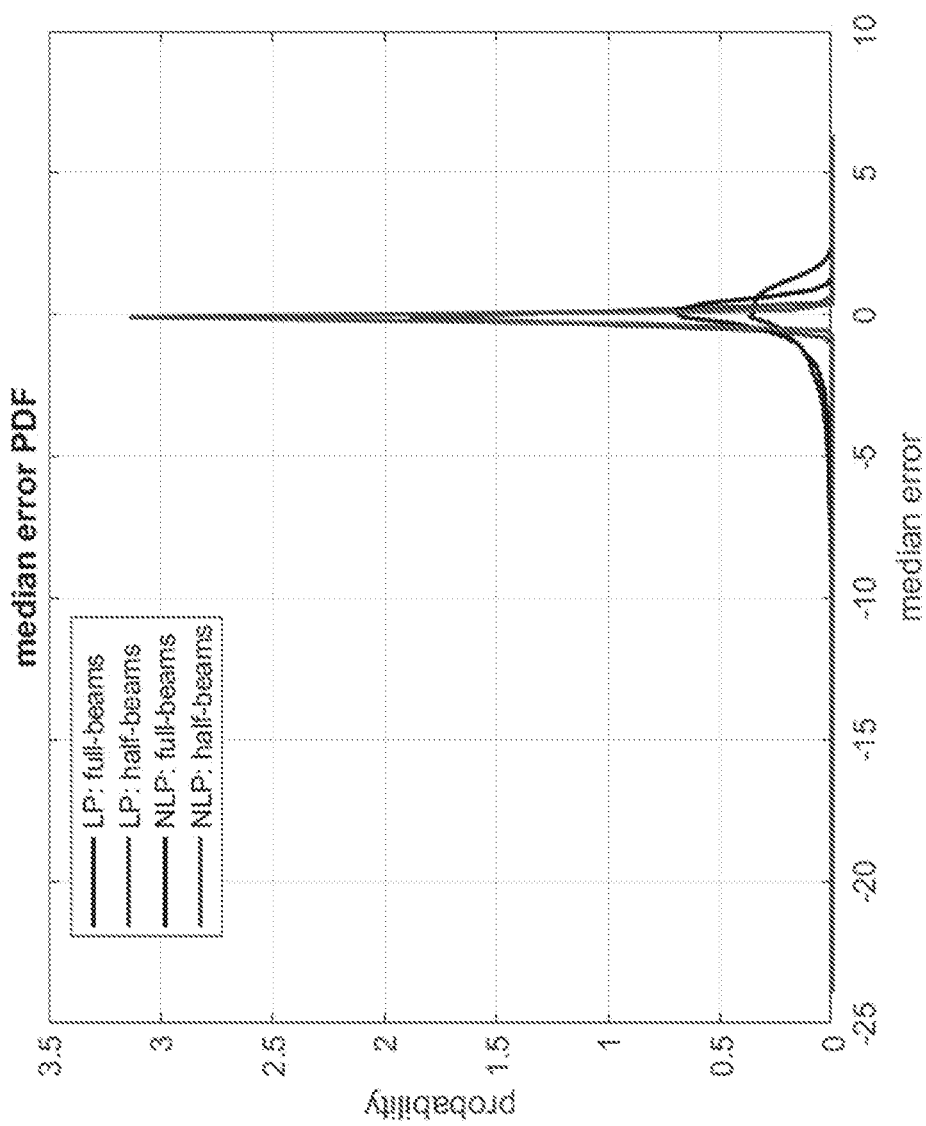
FIG. 23 shows graphs of media error in various embodiments.
Figure 23:
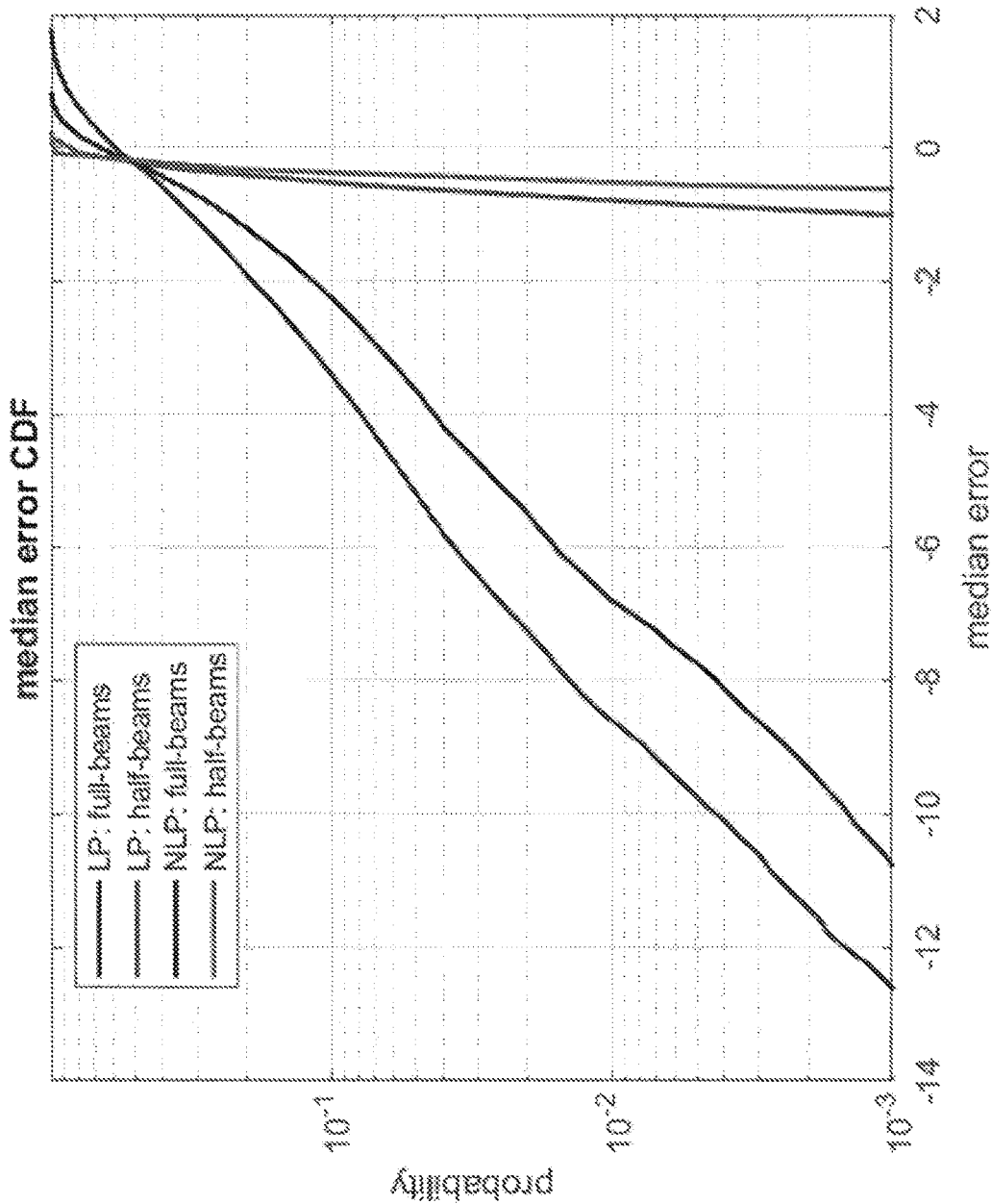

FIG. 23 shows a graph of median error probability distribution function and median error cumulative distribution function (CDF). The median error is defined as median error=drop SINR−median SINR. For 1% reliability, the scheduler should assume SINR about 1-9 dB less than median.

Figure 24:
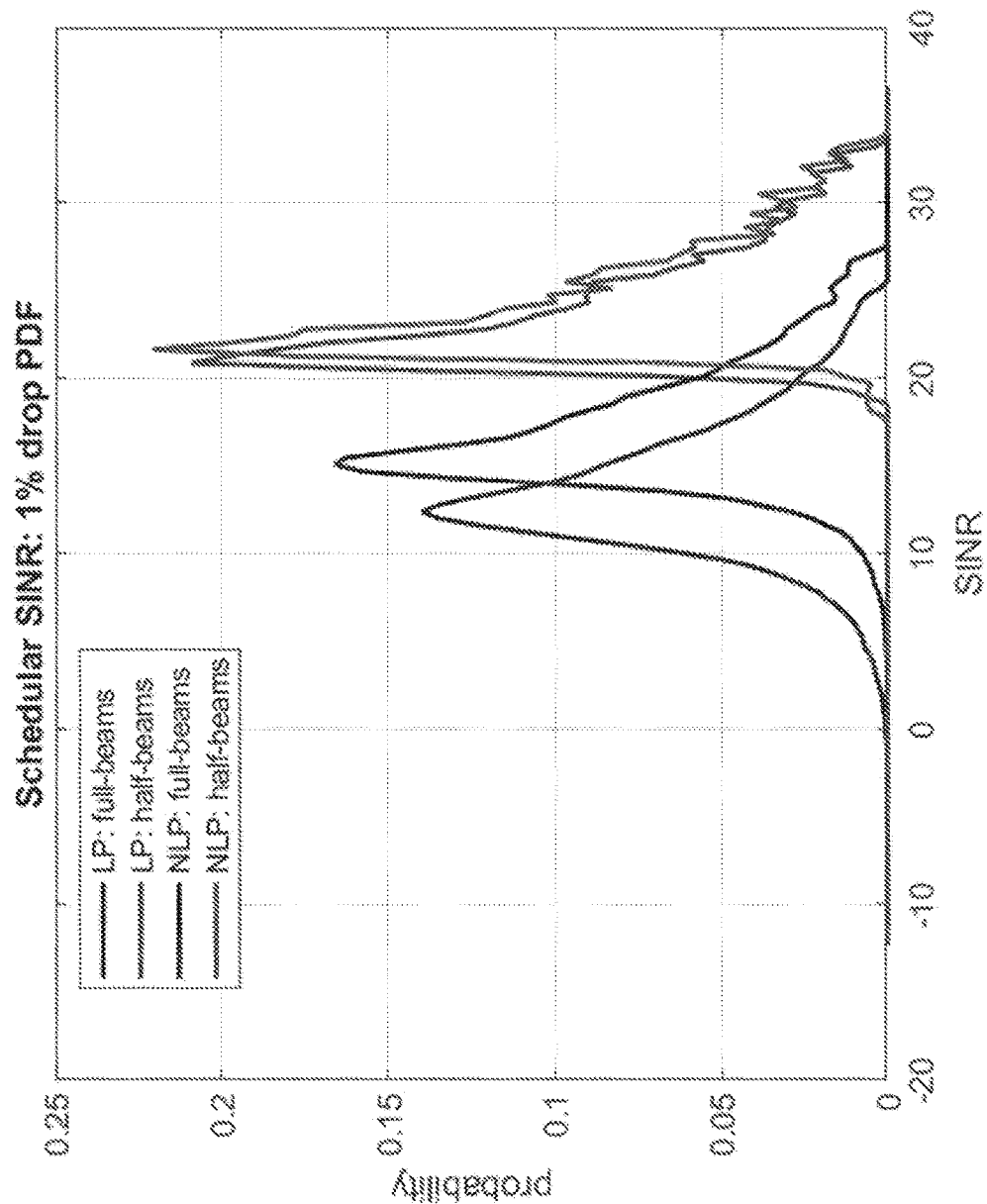
FIG. 24 shows graphs illustrating SINR distribution for a scheduler.
Figure 24:
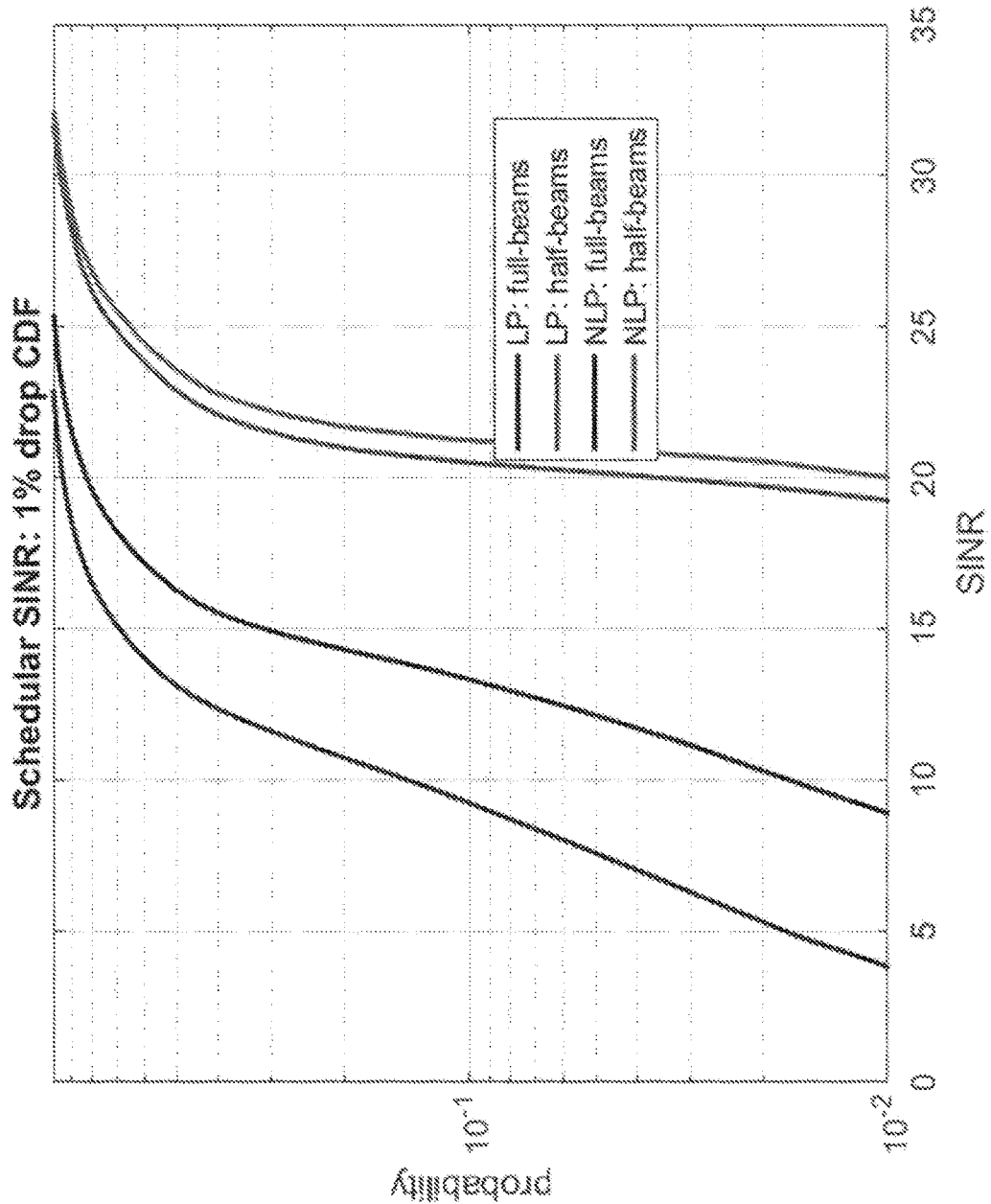

FIG. 24 shows results for SINR for the scheduler. A scheduler assumes UE will have SINR greater than median SINR minus some back-off. Size of back-off is determined by the desired PER.

The table below shows examples of scheduler SINR breakpoints.

TABLE 2

| Precoder | 1% SINR | 10% SINR | Average SINR |
| --- | --- | --- | --- |
| LP: full-beams | 3.9 | 9.3 | 14.0 |
| LP: half-beams | 19.4 | 20.5 | 24.1 |
| NLP: full-beams | 8.9 | 13.2 | 17.3 |
| NLP: half-beams | 20.1 | 21.3 | 24.8 |

Example Embodiment—SUMA LOS with a Square Window

Figure 25:
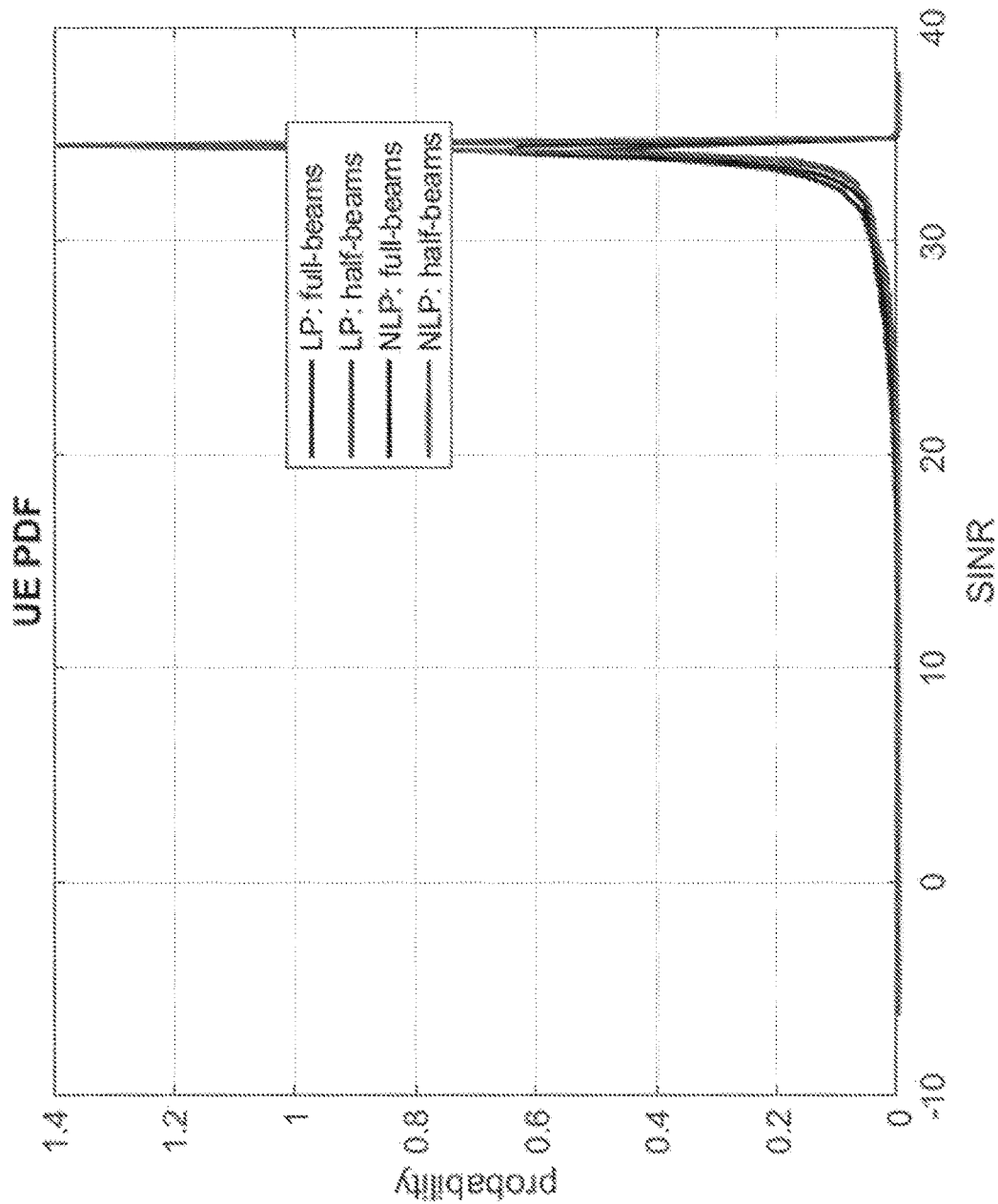
FIG. 25 show results of an example simulation result.
Figure 25:
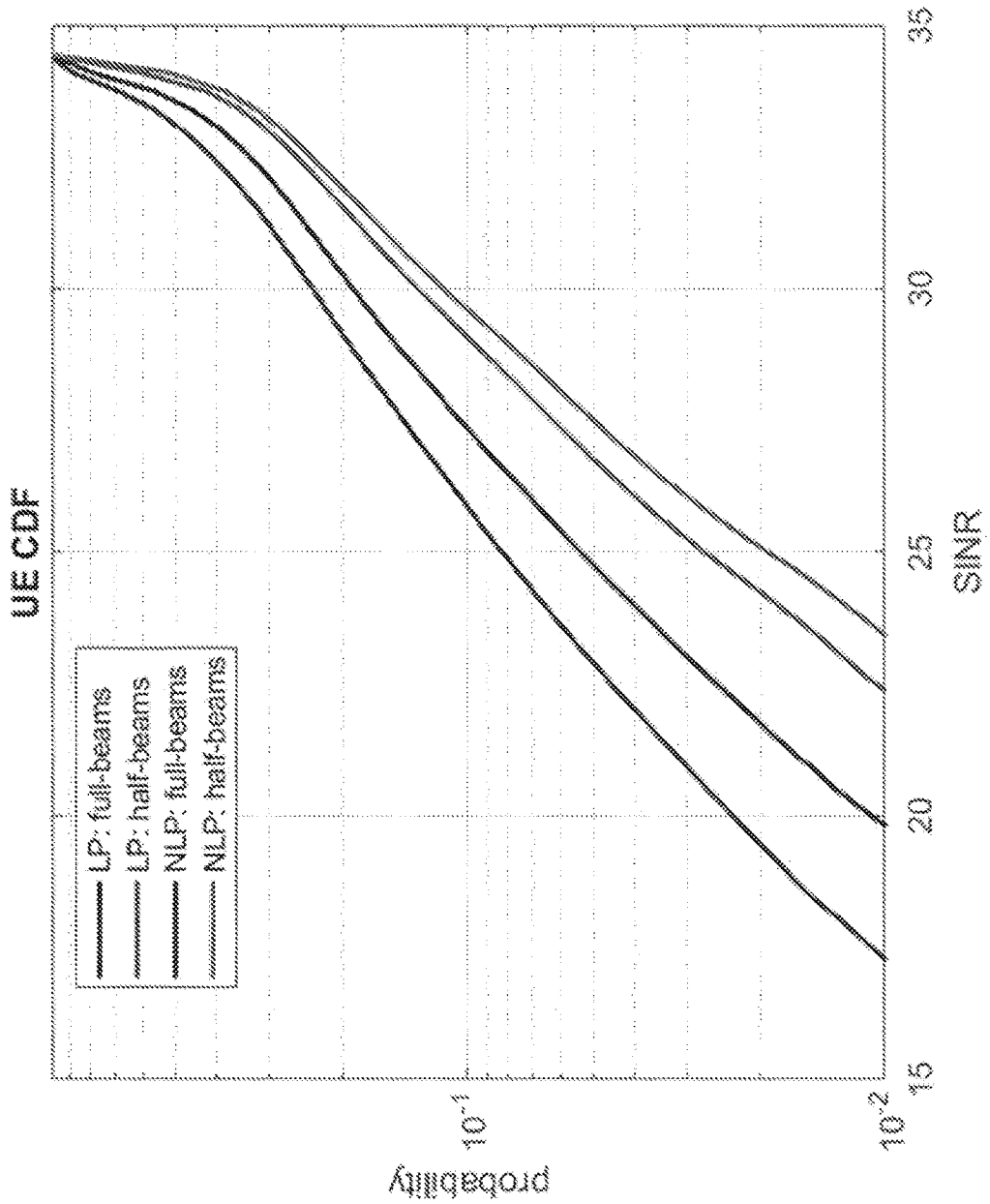
Figure 26:
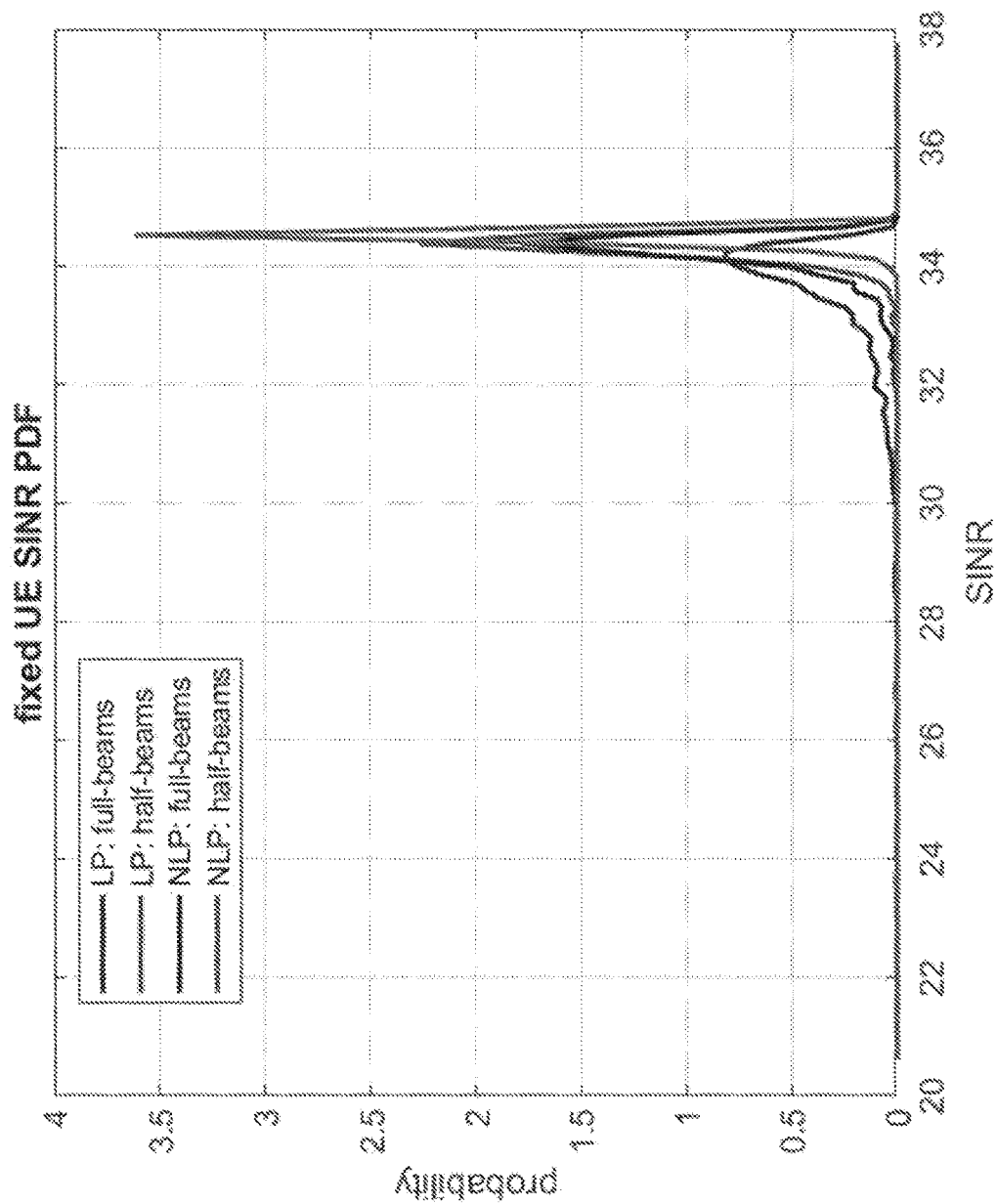
FIG. 26 shows an example of a fixed user device's SINR.
Figure 26:
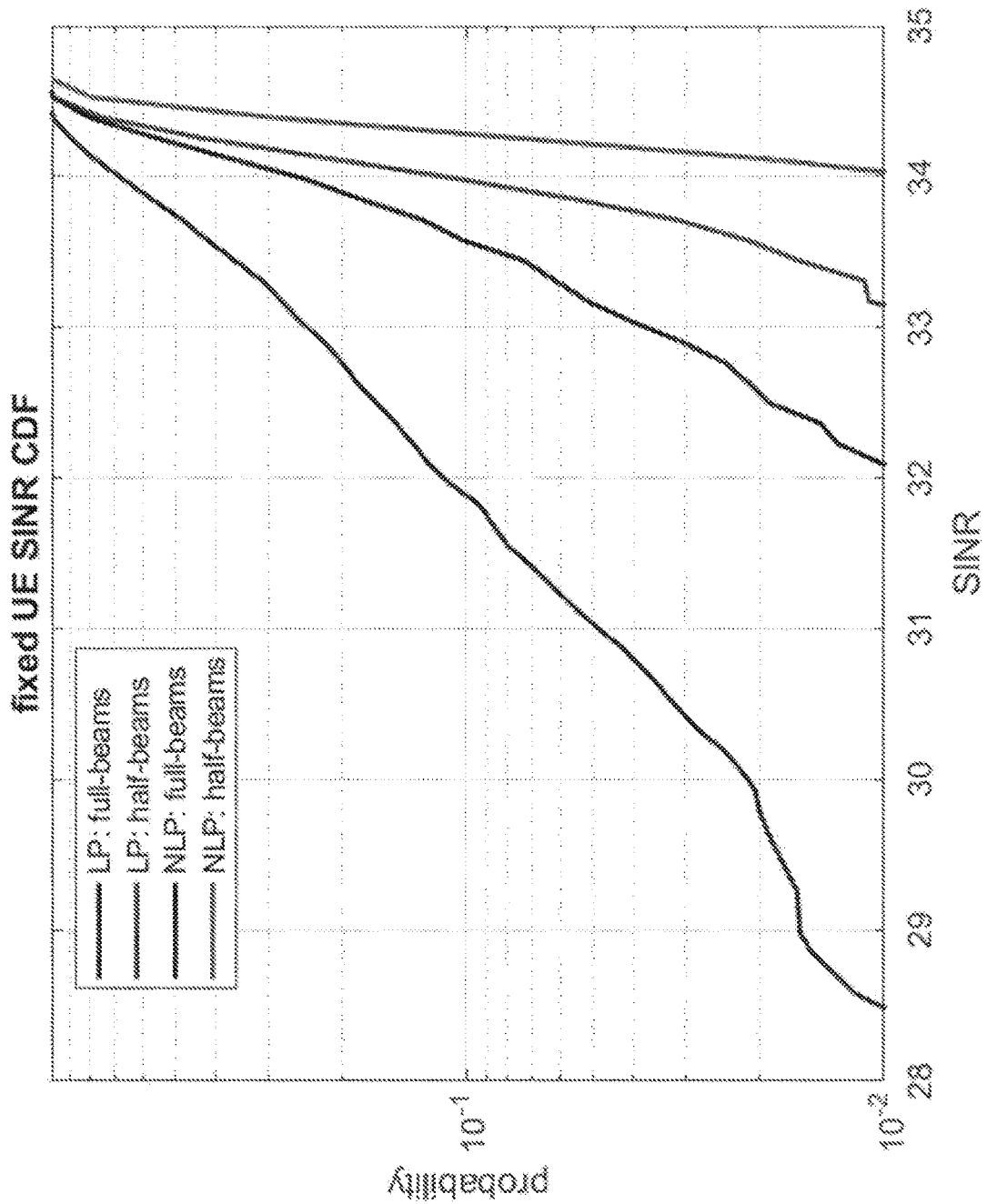
Figure 27:
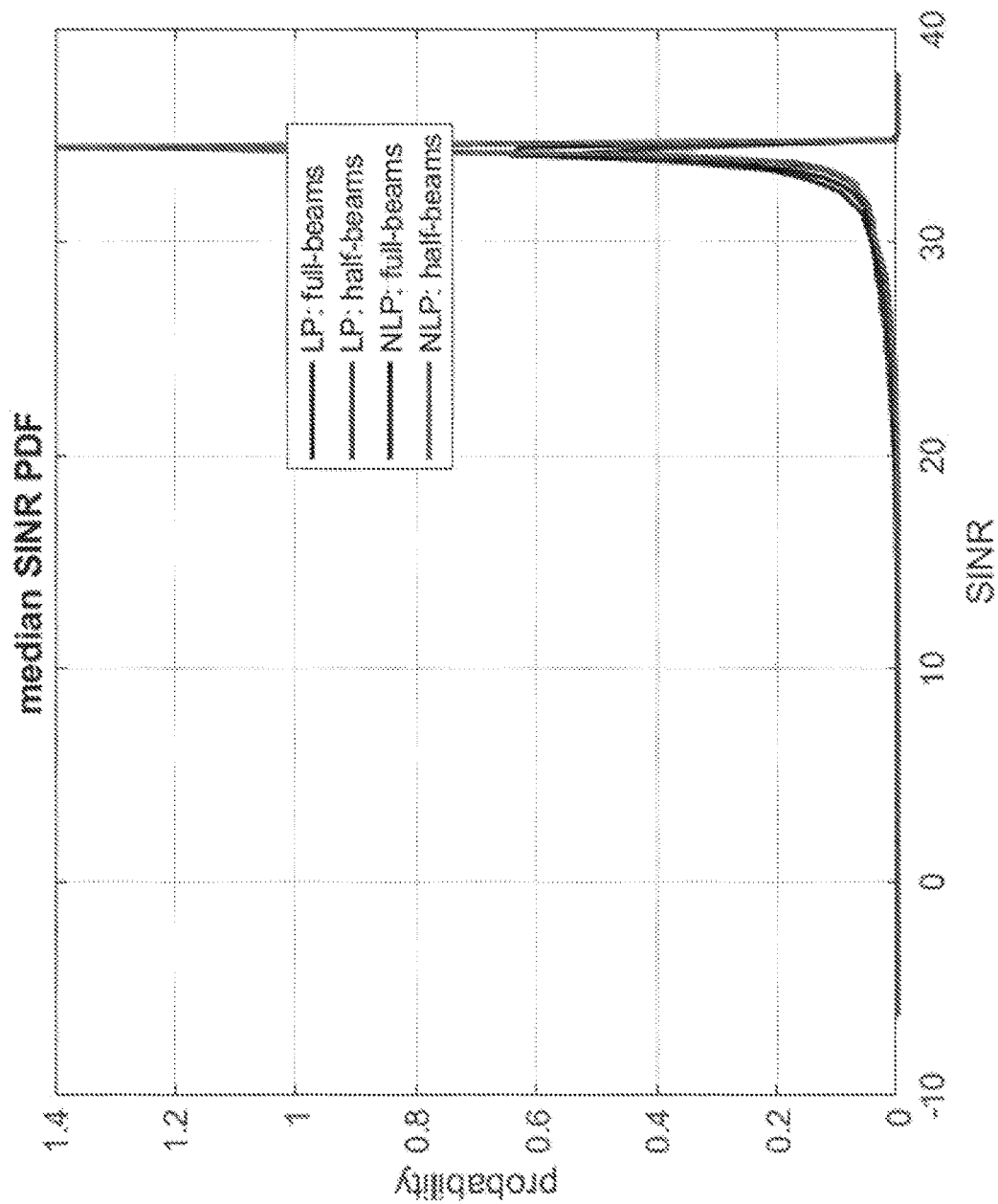
FIG. 27 is an example graph of median SINR obtained using a scheduler.
Figure 27:
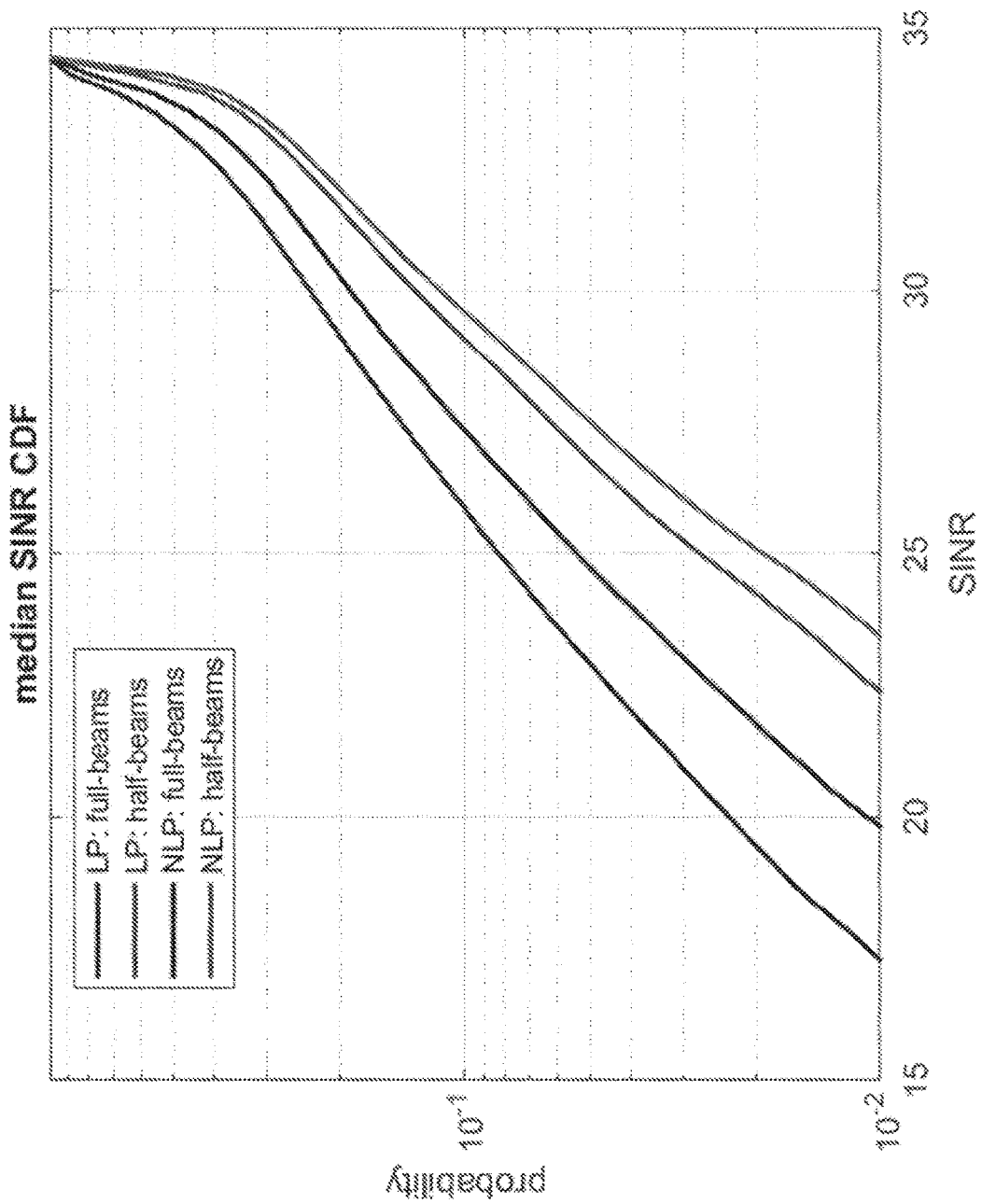
Figure 28:
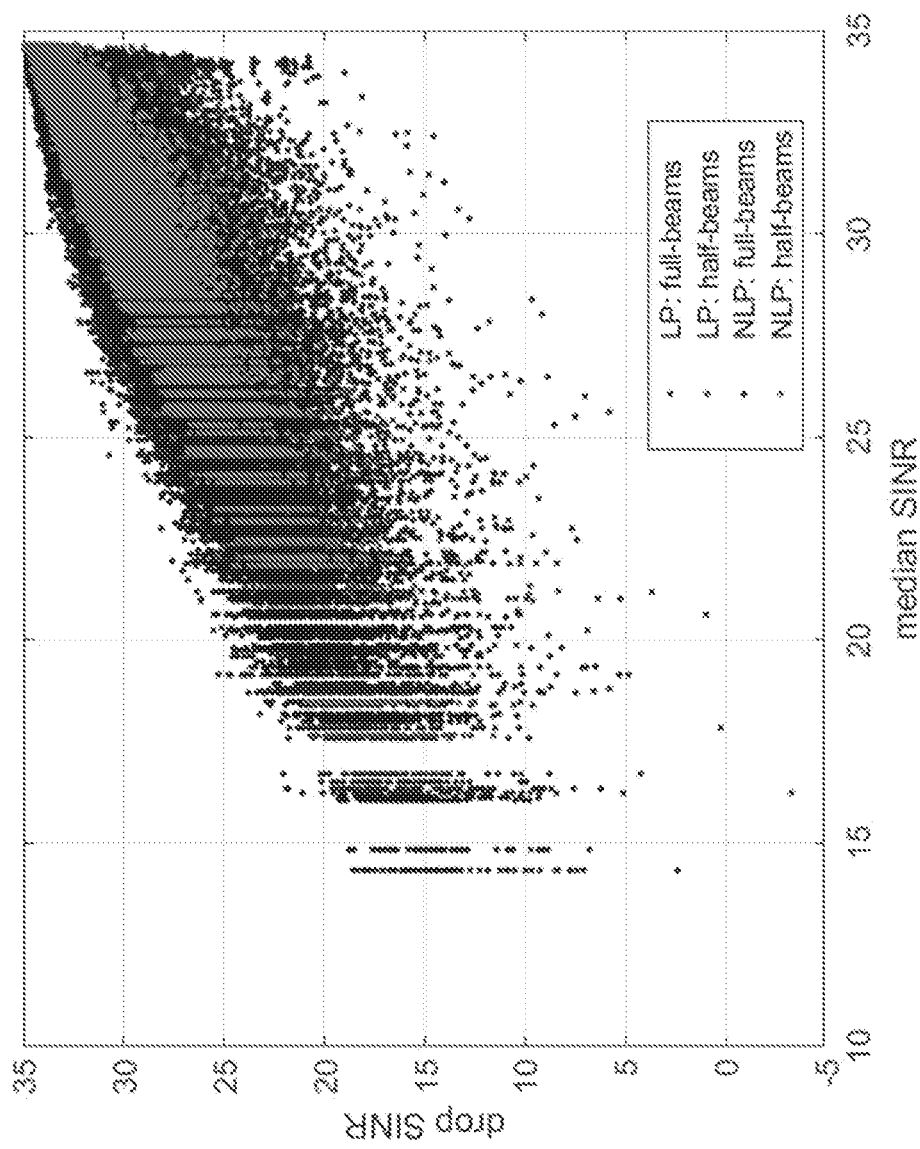
FIG. 28 is a graph of drop SINR results.
Figure 29:
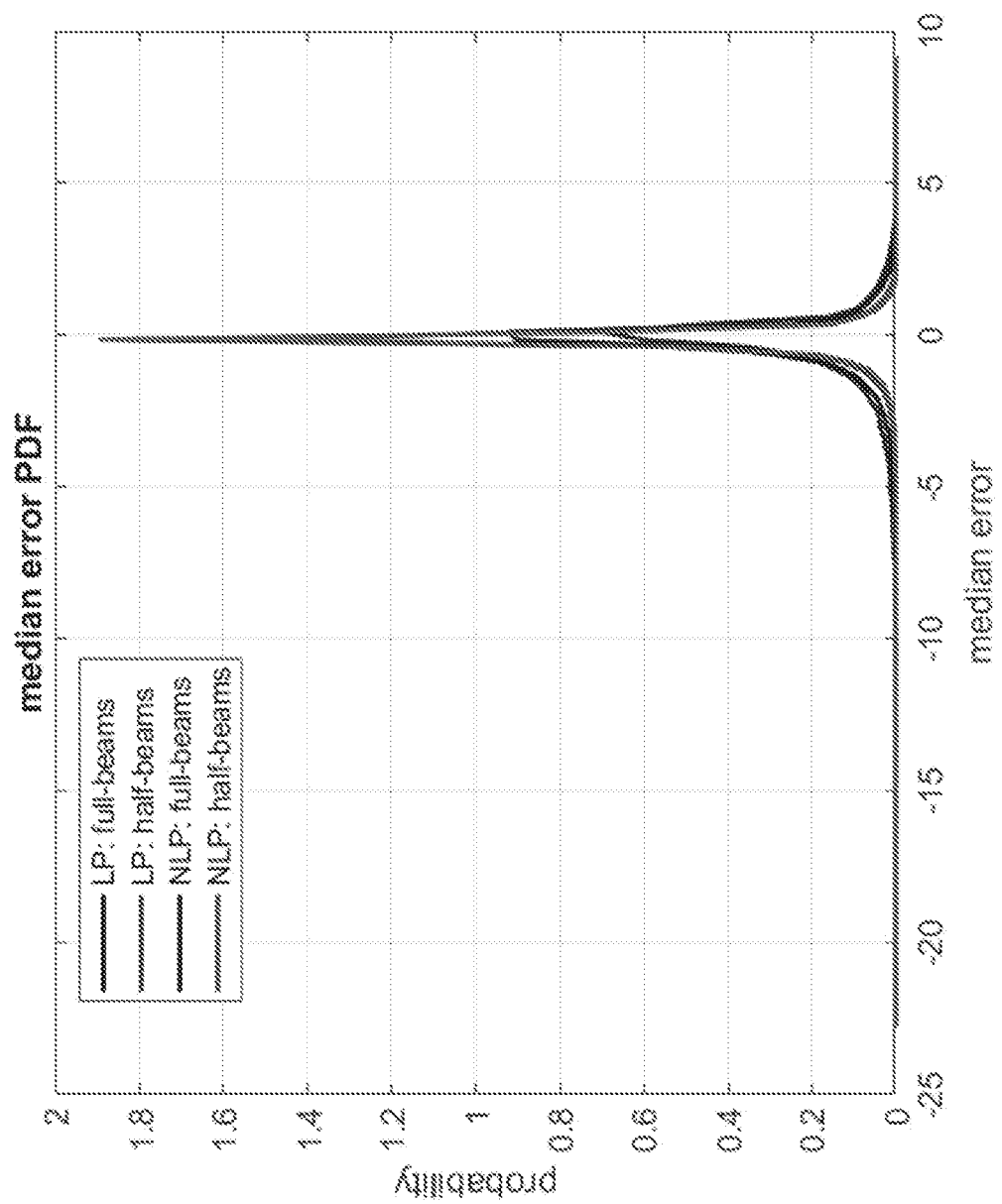
FIG. 29 shows a graph of median error in one scheduler implementation.
Figure 29:
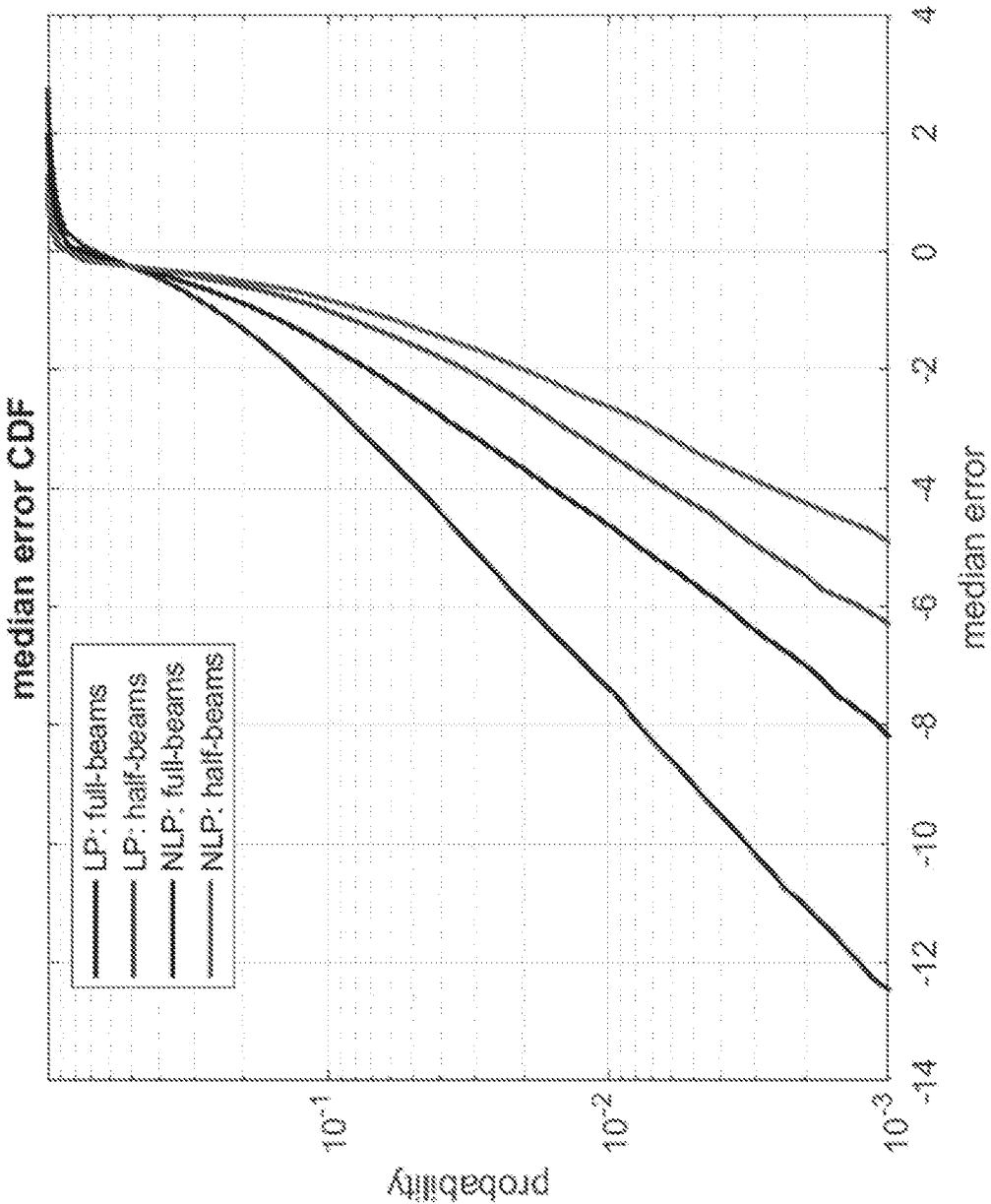
Figure 30:
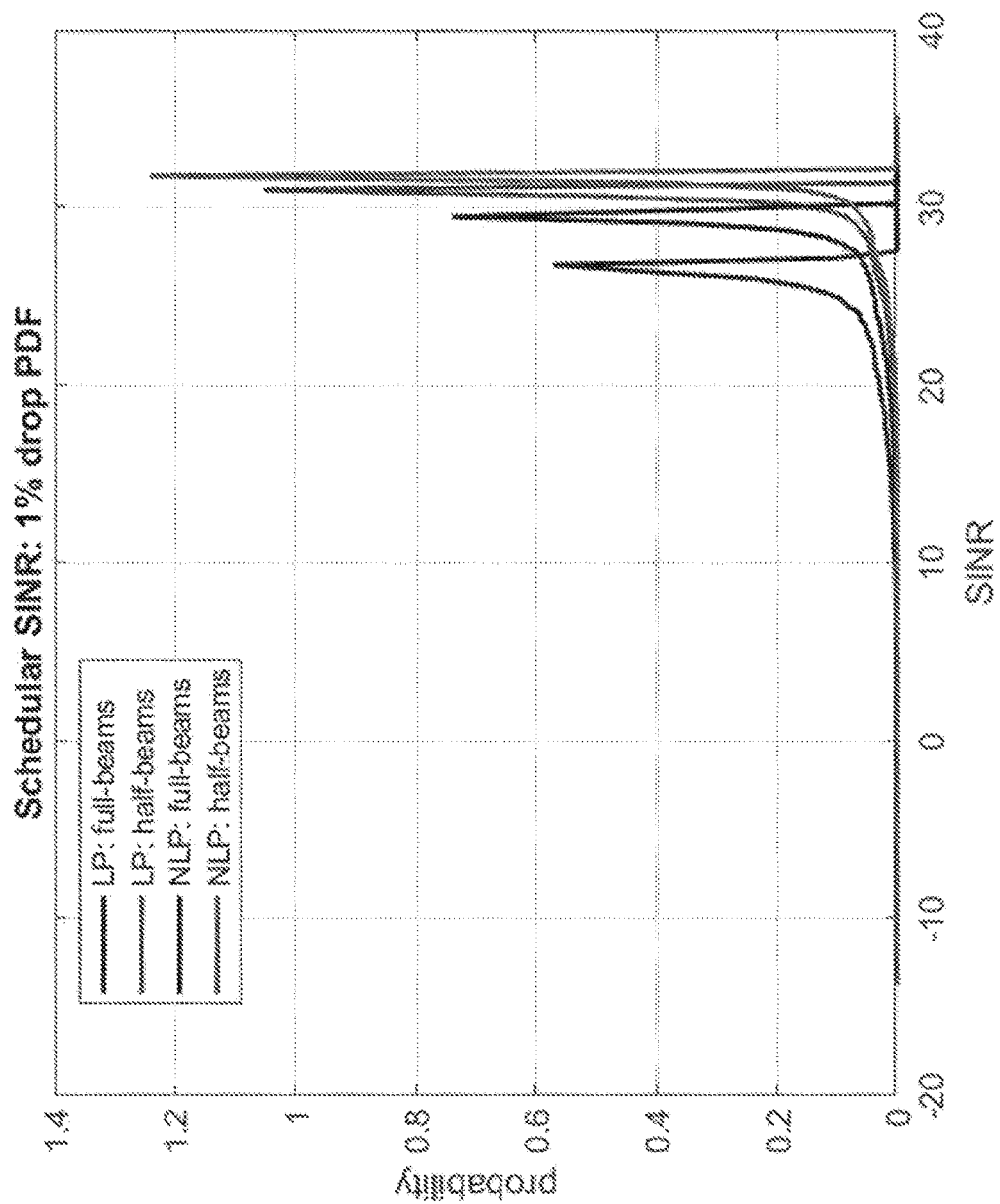
FIG. 30 shows graphs illustrating SINR distribution for a scheduler.
Figure 30:
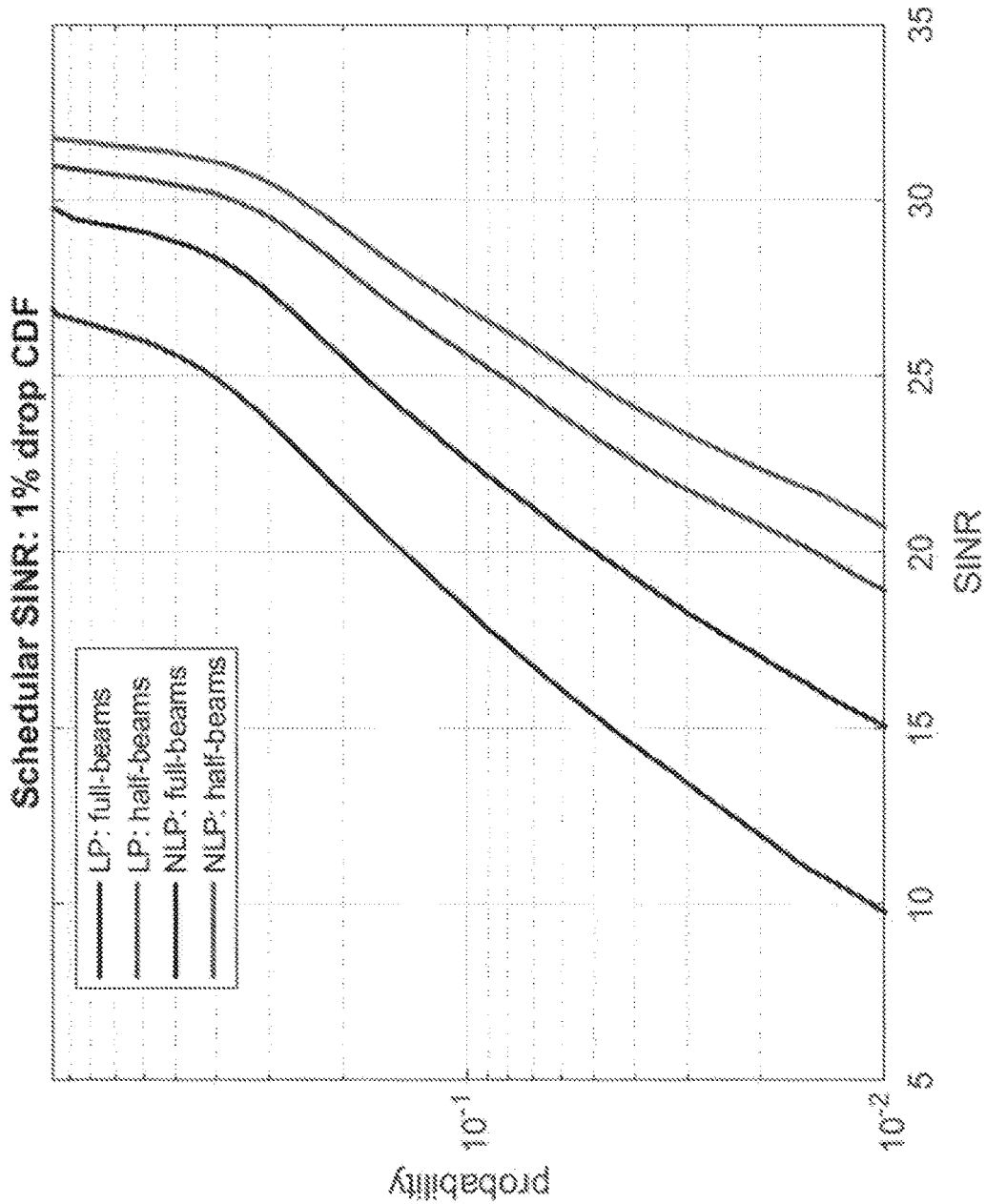

FIG. 25 shows UE SINR graphs.
FIG. 26 shows fixed user graphs.
FIG. 27 shows media SINR graph.
FIG. 28 shows drop SINR.
FIG. 29 shows median error graph.
FIG. 30 shows graphs of scheduler SINR distribution.
FIGS. 19-24 provide additional description of the details charted in FIGS. 25-30.

Table below shows examples of scheduler SINR breakpoints for this embodiment.

TABLE 3

| Precoder | 1% SINR | 10% SINR | Average SINR |
| --- | --- | --- | --- |
| LP: full-beams | 9.8 | 18.3 | 24.3 |
| LP: half-beams | 19.1 | 25.6 | 29.6 |
| NLP: full-beams | 15.2 | 22.5 | 27.7 |
| NLP: half-beams | 20.6 | 26.8 | 30.6 |

Example Embodiment—SUMA NLOS with a Hamming Window

Figure 31:
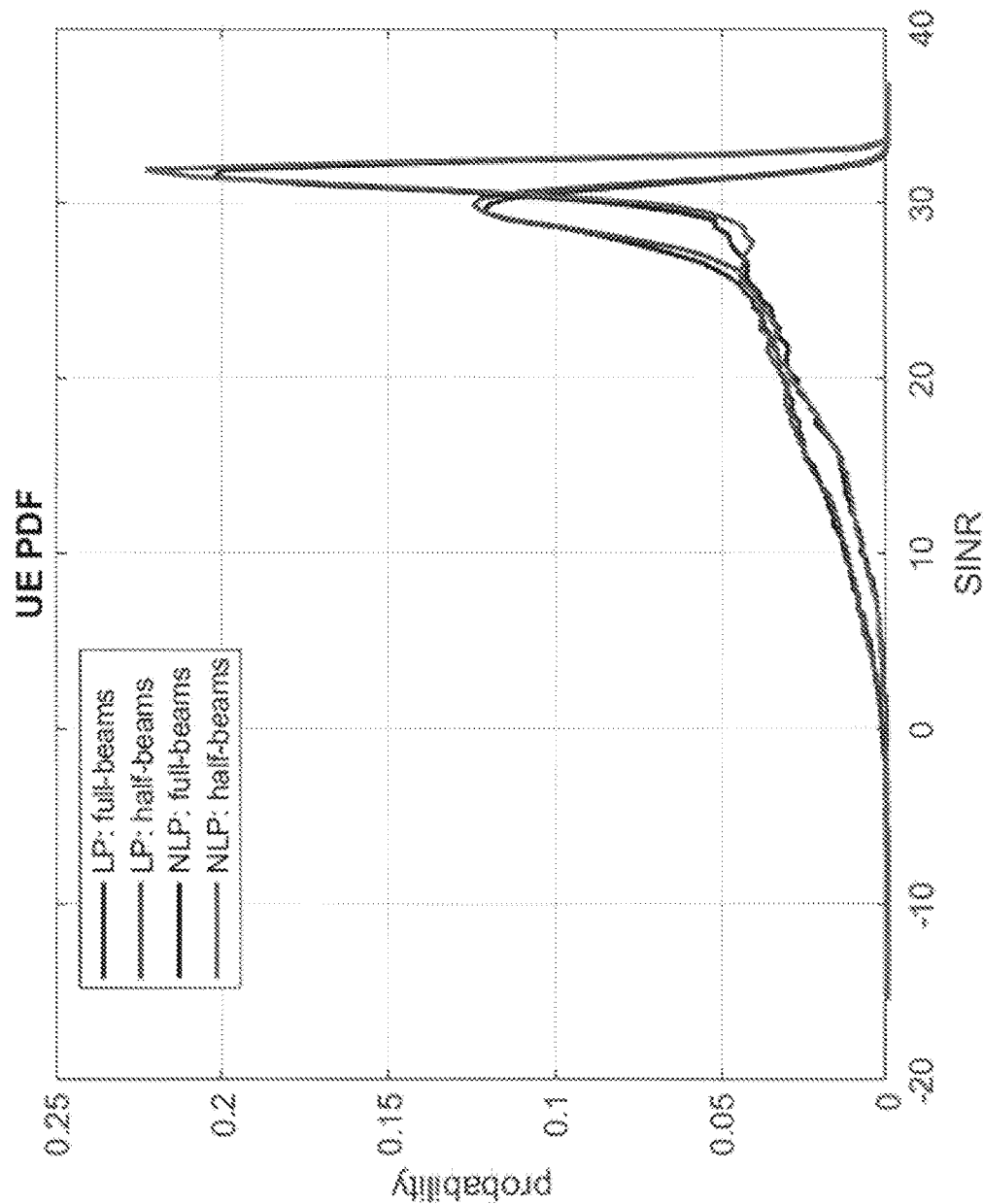
FIG. 31 shows graph of SINR for a user equipment (UE).
Figure 31:
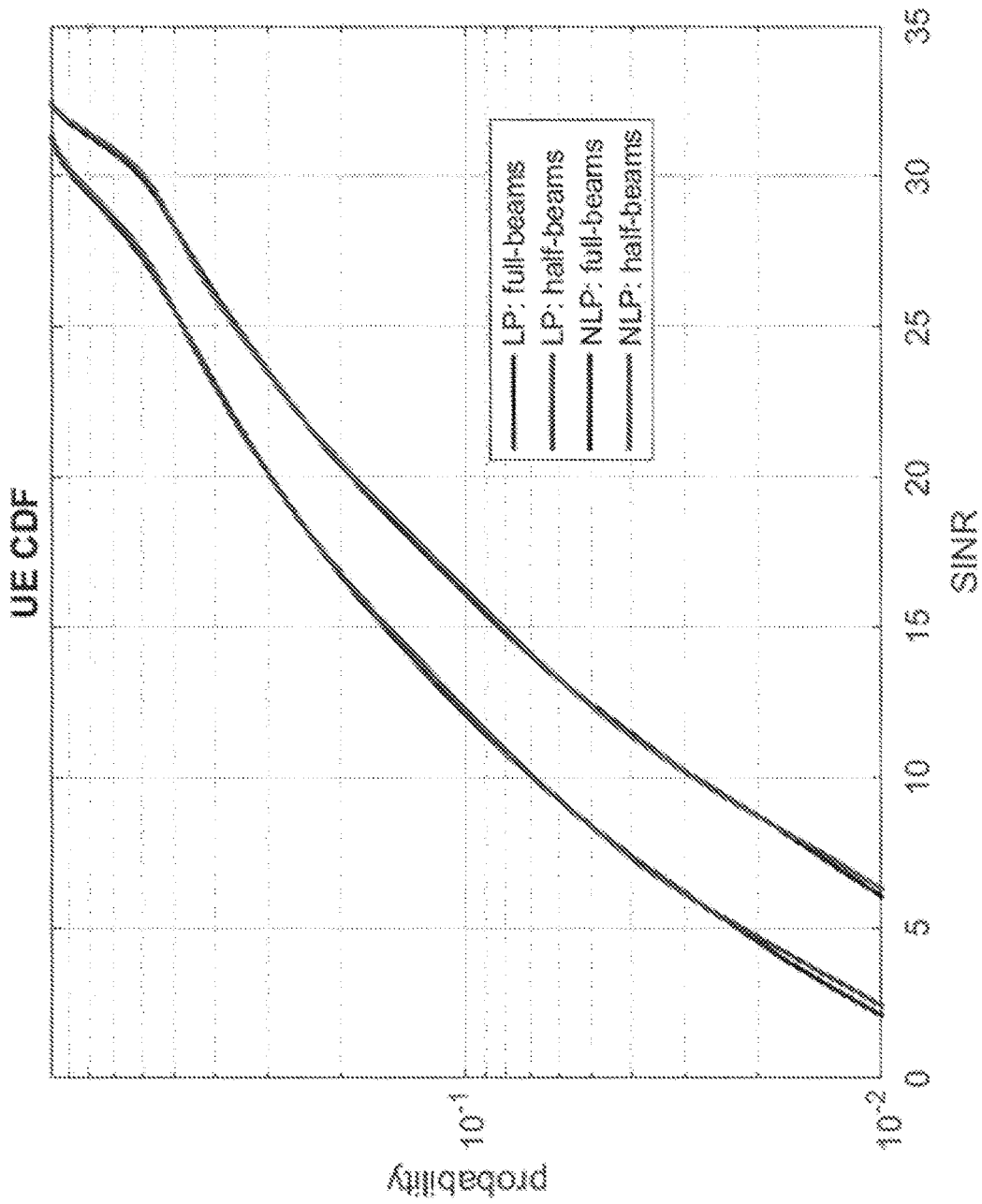
Figure 32:
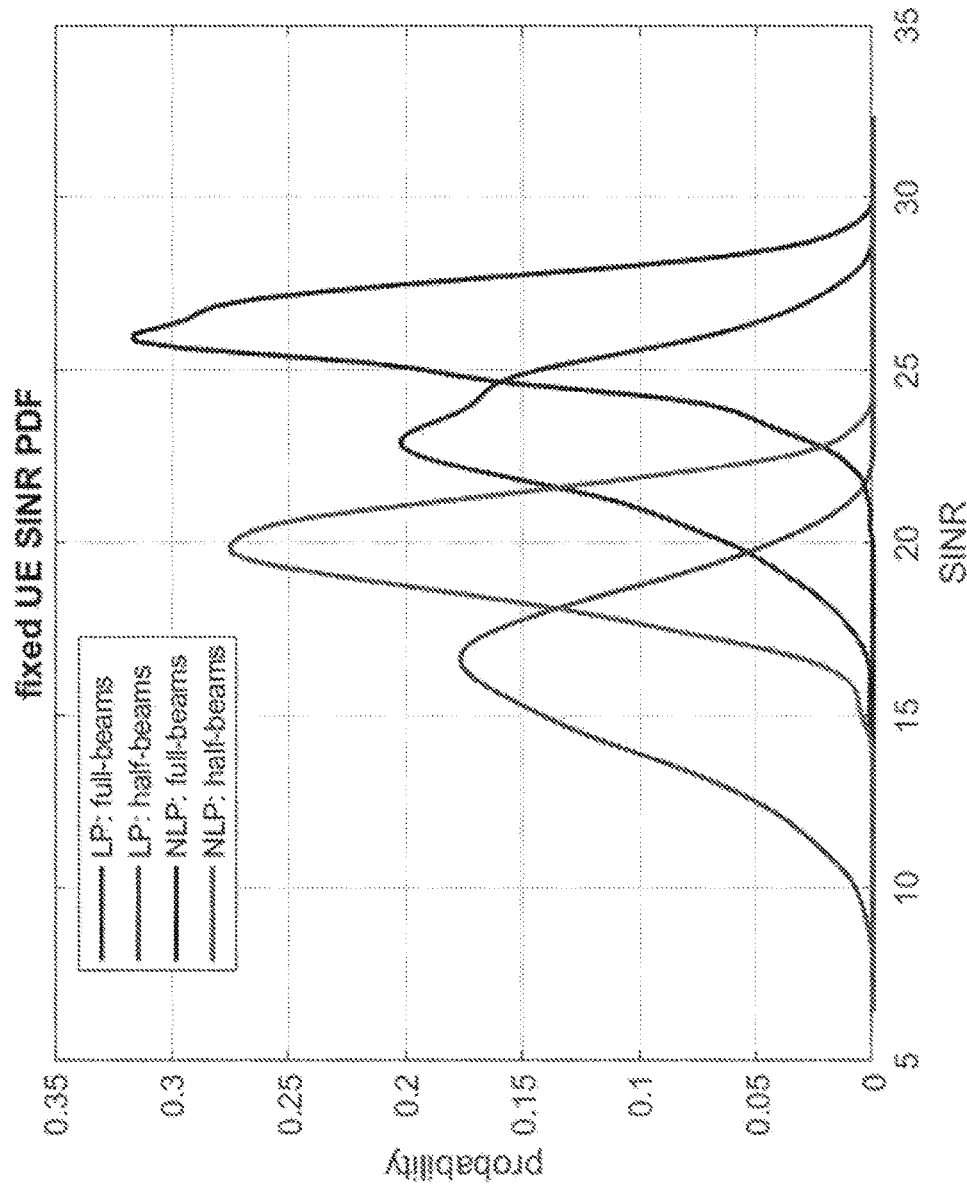
FIG. 32 shows an example of a fixed user device's SINR.
Figure 32:
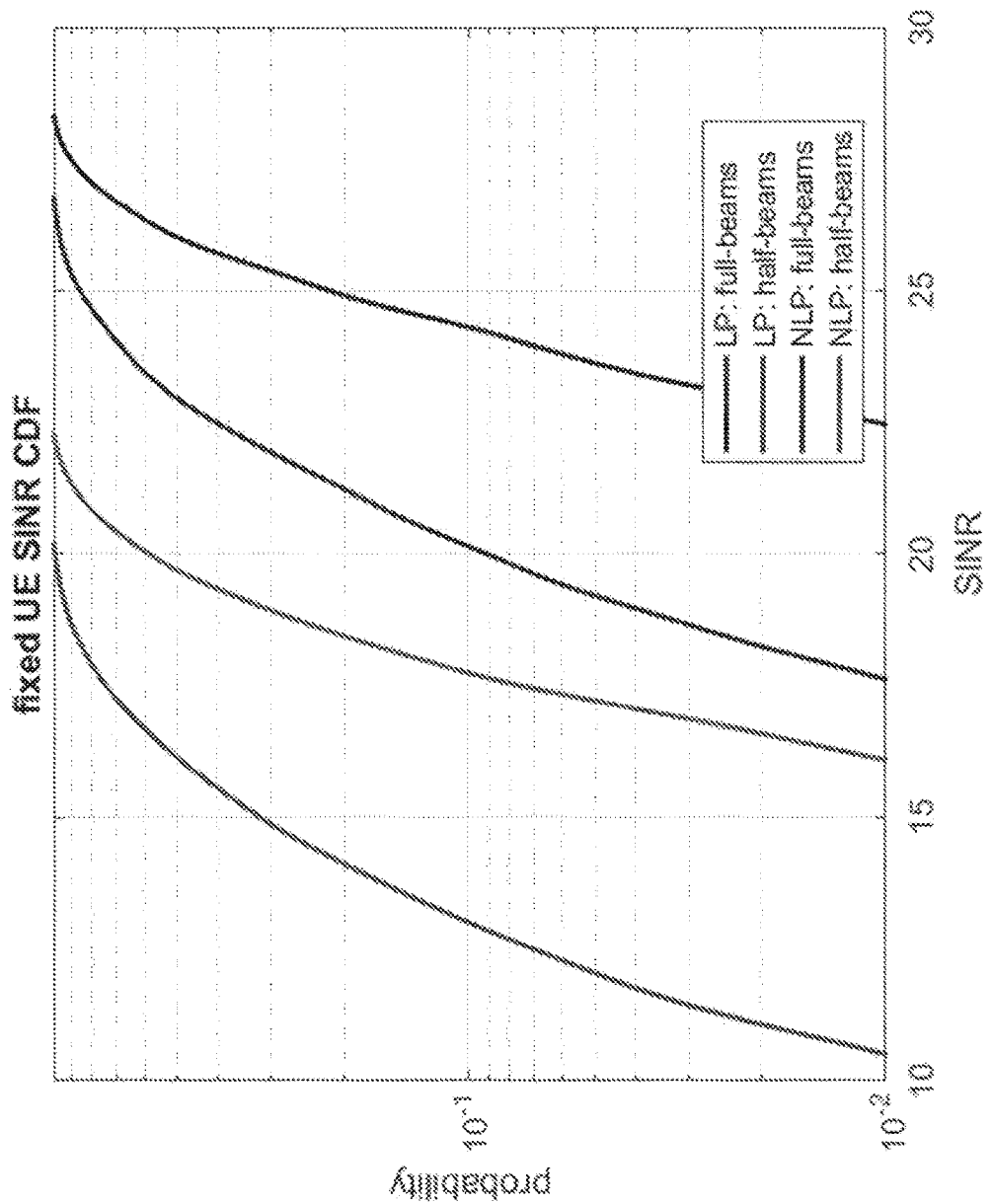
Figure 33:
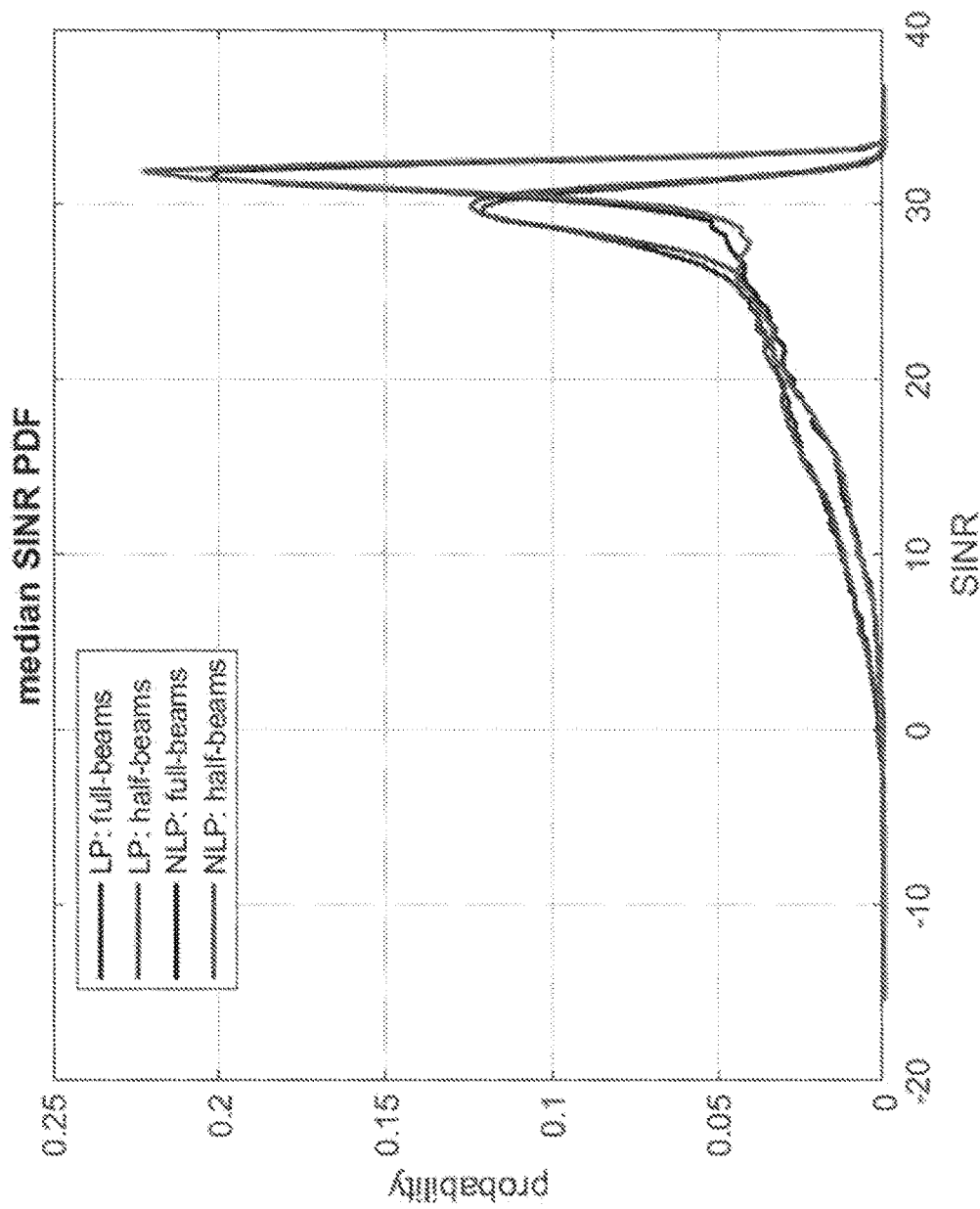
FIG. 33 is an example graph of median SINR obtained using a scheduler.
Figure 33:
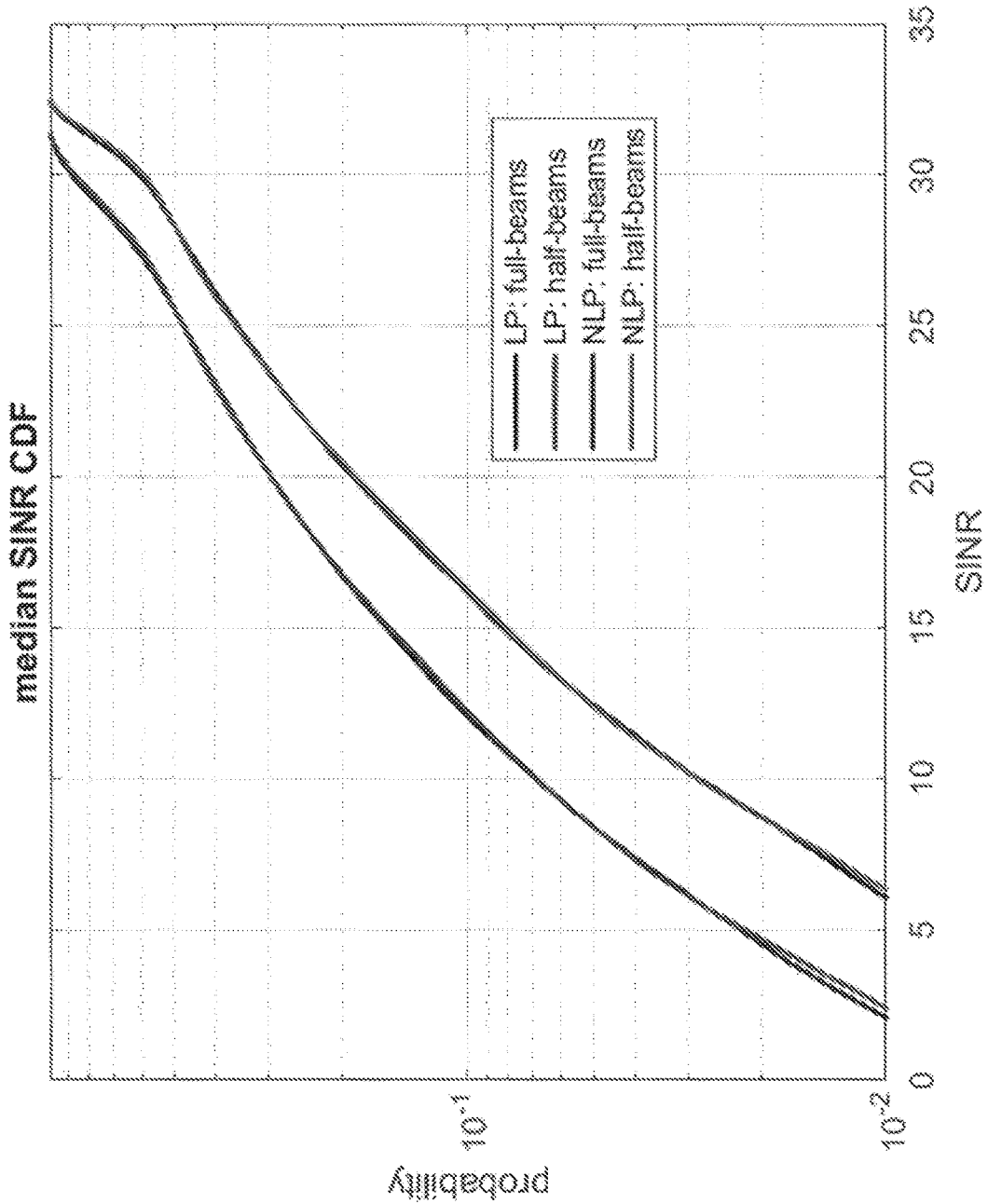
Figure 34:
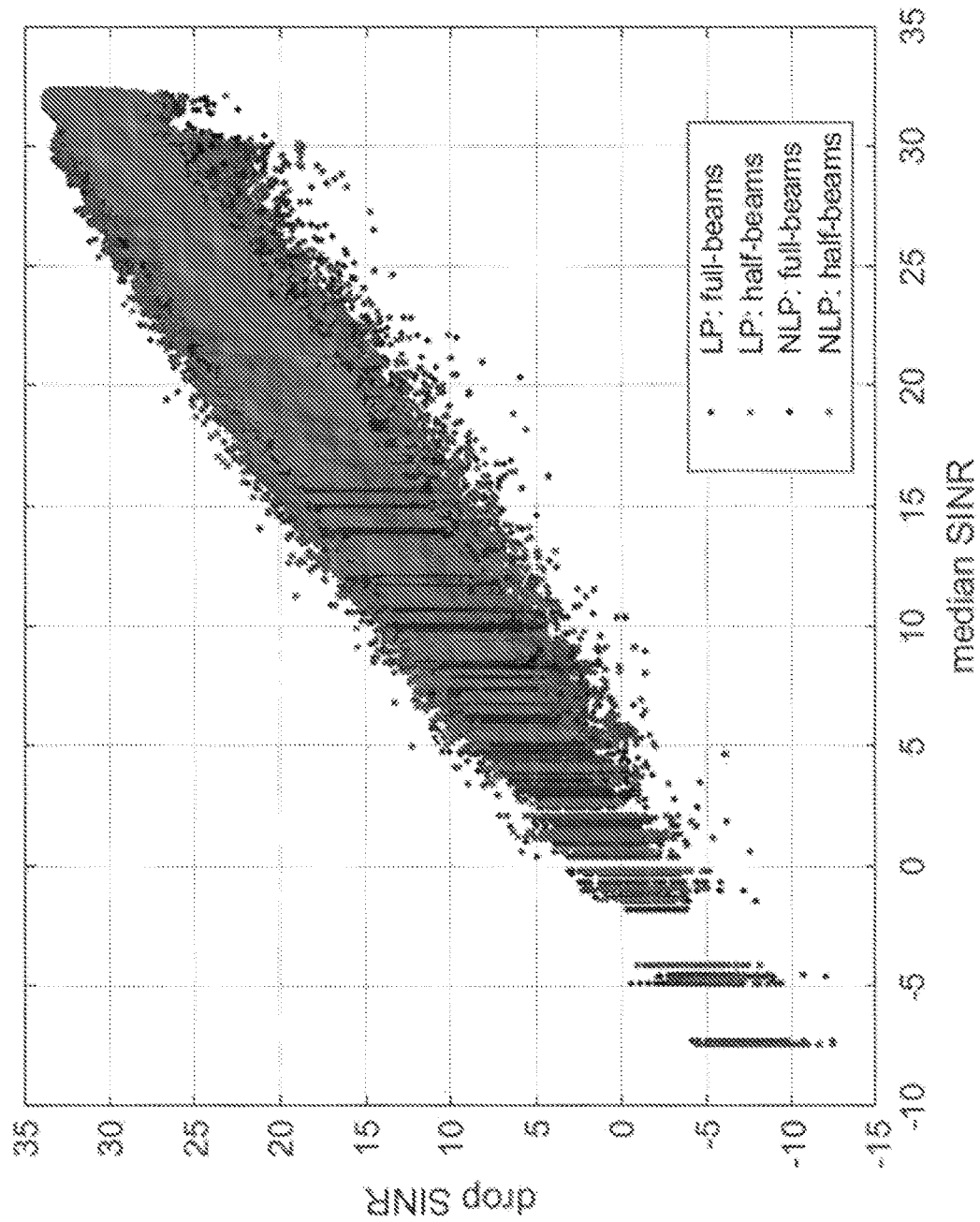
FIG. 34 is a graph of drop SINR results.
Figure 35:
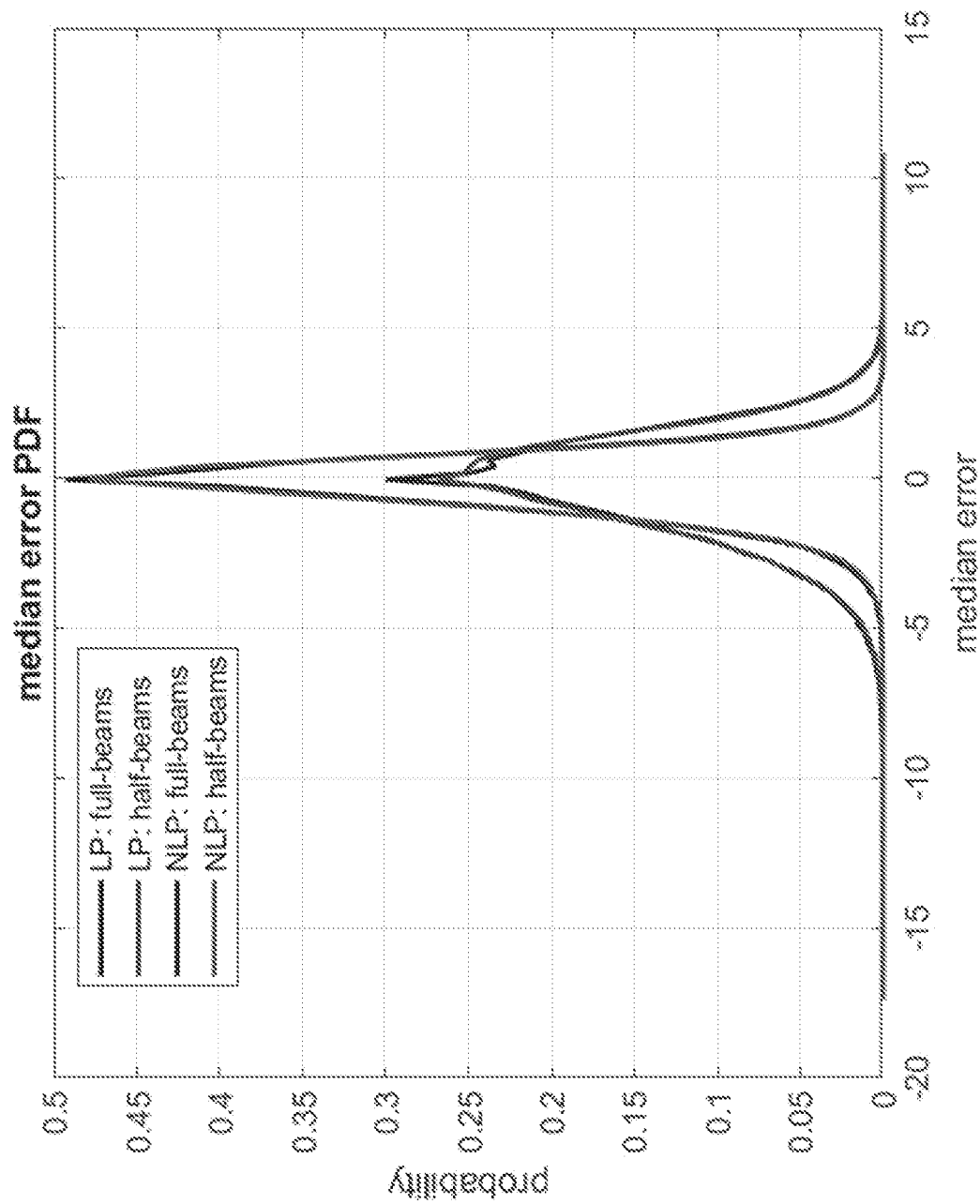
FIG. 35 shows a graph of median error in one scheduler implementation.
Figure 35:
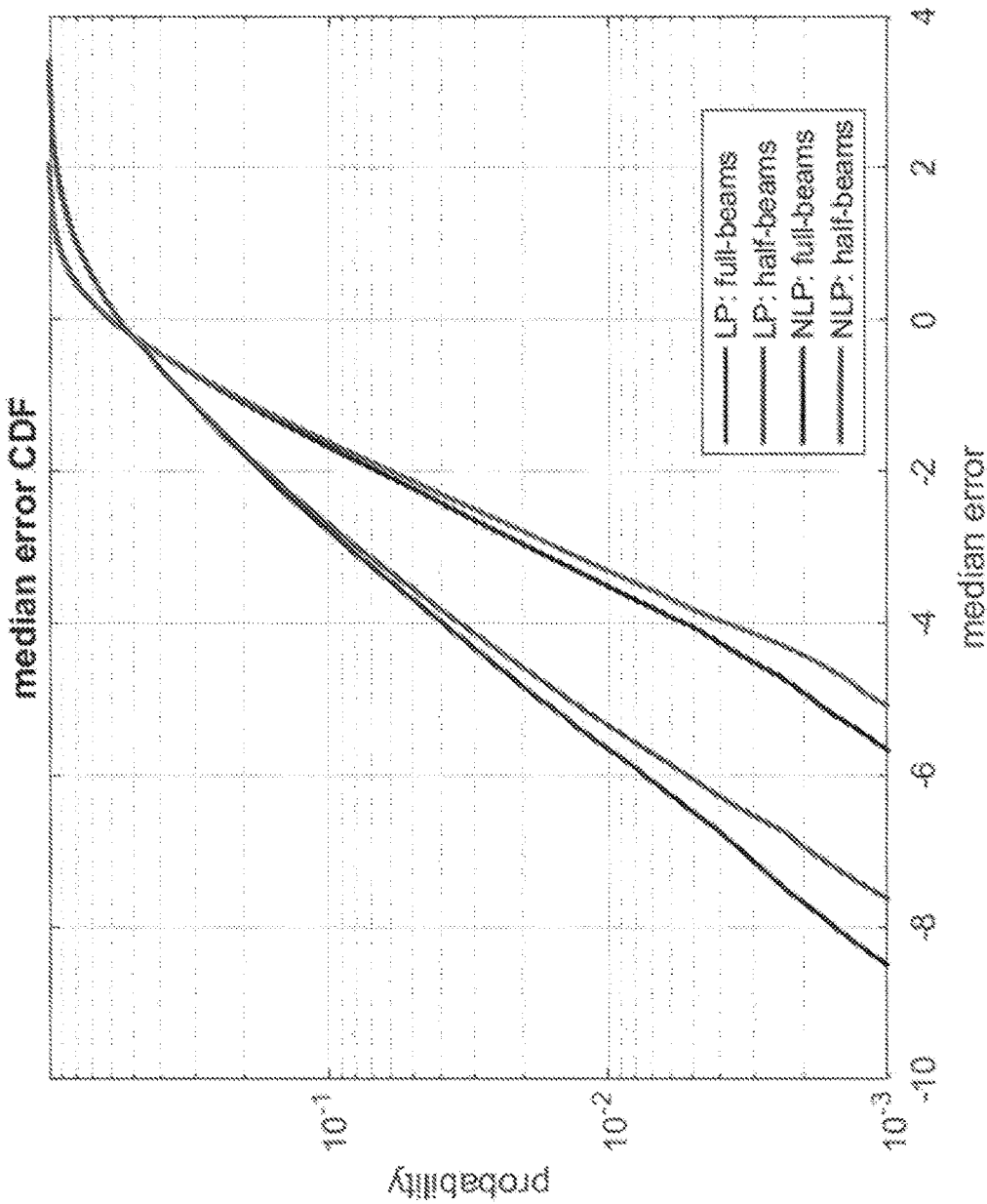
Figure 36:
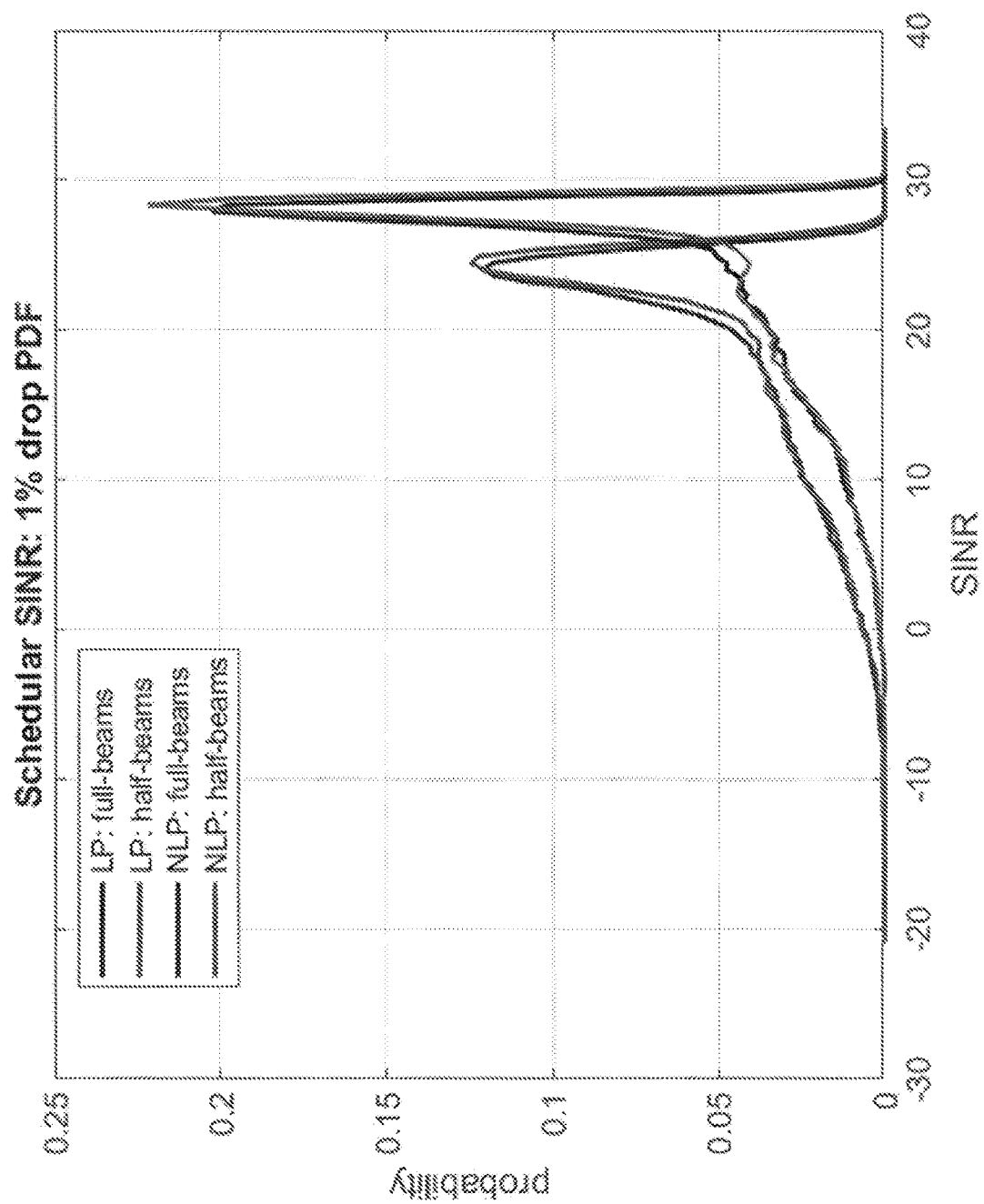
FIG. 36 shows graphs illustrating SINR distribution for a scheduler.
Figure 36:
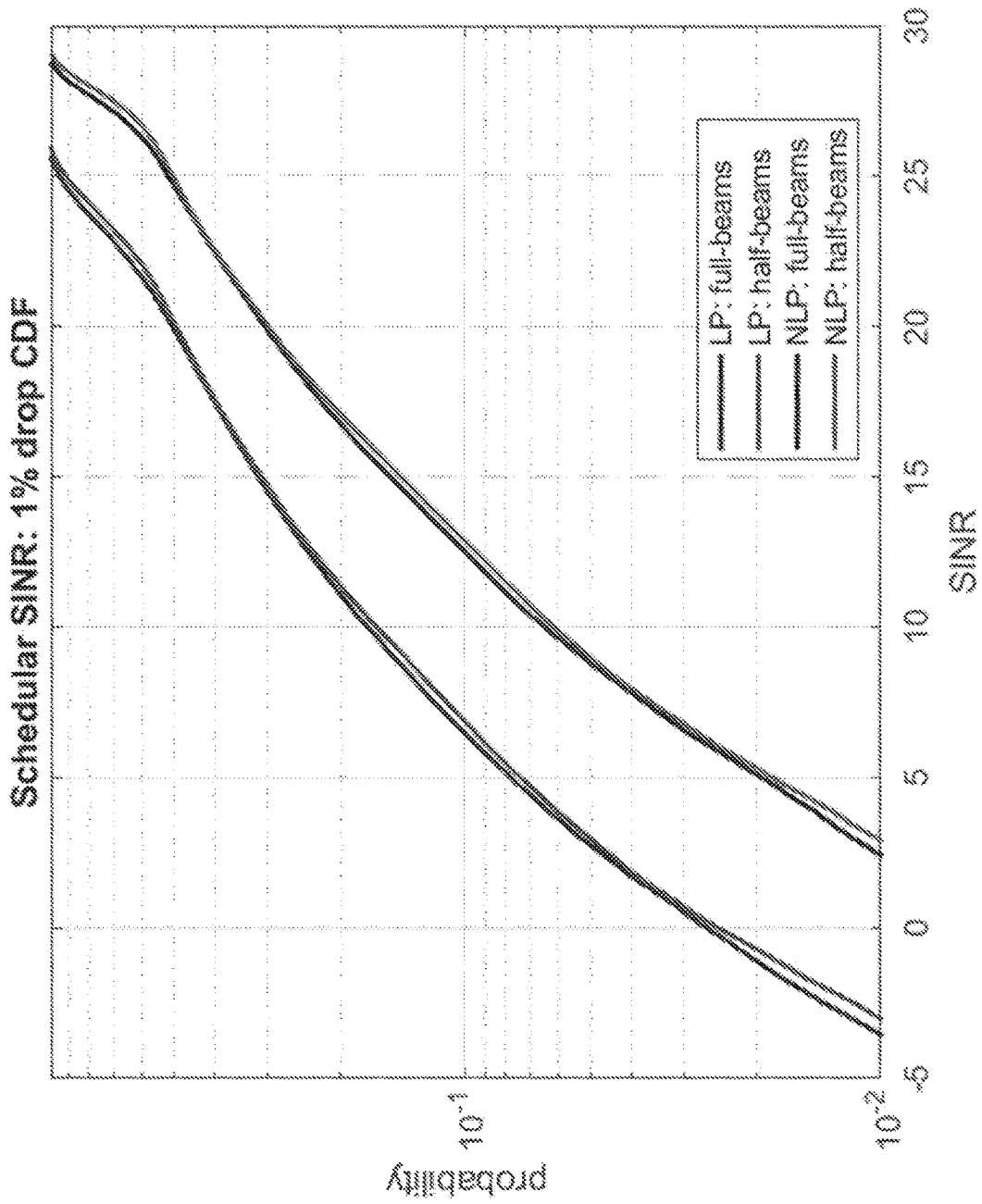

FIG. 31 shows UE SINR graphs.
FIG. 32 shows fixed user graphs.
FIG. 33 shows media SINR graph.
FIG. 34 shows drop SINR.
FIG. 35 shows median error graph.
FIG. 36 shows graphs of scheduler SINR distribution.
FIGS. 19-24 provide additional description of the details charted in FIGS. 31-36.

The table below shows examples of scheduler SINR breakpoints for this embodiment.

TABLE 4

| Precoder | 1% SINR | 10% SINR | Average SINR |
| --- | --- | --- | --- |
| LP: full-beams | −3.4 | 6.5 | 17.9 |
| LP: half-beams | −3.0 | 6.9 | 18.2 |
| NLP: full-beams | 2.2 | 12.5 | 22.7 |
| NLP: half-beams | 3.0 | 12.9 | 23.0 |

FIG. 4 is a block diagram of an example wireless communication apparatus 400 that may be used to implement method 300 or other techniques described in the present document. The apparatus 400 includes a processor 402, a memory 404 that stores processor-executable instructions and data during computations performed by the processor. The apparatus 400 includes reception and/or transmission circuitry 406, e.g., including radio frequency operations for receiving or transmitting signal and/or receiving data or information bits for transmission over a wireless network.

Some embodiments may be described using the following listing of example techniques.

BB1. A method for determining a schedule for a plurality of users over a plurality of beams in a set of time-frequency resources, comprising:
determining an objective function to optimize a metric, wherein the objective function is based on a maximum latency and transmit power for each of the plurality of users and a plurality of channel metrics between the plurality of users and the plurality of beams; and
optimizing the objective function using an optimization algorithm to generate the schedule, wherein the schedule comprises an assignment of each of the plurality of users to each of the plurality of beams in one or more of the set of time-frequency resources.

BB2. The method of example BB1, wherein the metric comprises a maximum throughput for the plurality of users.

BB3. The method of example BB2, wherein the metric further comprises a plurality of throughputs for each of the plurality of users.

BB4. The method of any of examples BB1 to BB3, wherein the optimization algorithm is based on a greedy policy.

BB5. The method of any of examples BB1 to BB3, wherein the optimization algorithm is based on a brute-force policy.

BB6. The method of any of examples BB1 to BB5, wherein the one or more of the set of time-frequency resources are contiguous.

BB7. Devices, systems and methods for scheduling jobs to users in a fixed wireless access system efficiently and with low-complexity as disclosed in this patent document.

BB8. An implementation of a scheduling algorithm for a plurality of users over a plurality of beams in a set of time-frequency resources in a fixed wireless access system as disclosed in this patent document.

The above-described methods may be implemented by a network-side device in a fixed wireless network.

Some embodiments of scheduling in a wireless network may be described using the following listing.

CC1. A method for scheduling transmissions in a wireless network, comprising:
determining a plurality of groups by grouping user devices, wherein each of the plurality of groups corresponds to one of multiple transmission beams;
partitioning user devices in each of the plurality of groups into one or more sub-groups according to a transmission metric for each user device, wherein the transmission metric is a measure of a wireless channel between a network node and the corresponding user device; and scheduling transmissions between the network node and the user devices based on time-multiplexing and multiplexing the multiple transmission beams, wherein a difference between the transmission metrics of user devices served at a same time or using a same transmission beam is above a threshold.

CC2. A method for scheduling transmissions in a wireless network, comprising:

determining a plurality of sub-groups by grouping user devices based on a transmission metric for each user device, wherein the transmission metric is a measure of a wireless channel between a network node and the corresponding user device;

determining a subset of user devices, wherein the subset comprises at most one user device from each of the plurality of sub-groups, and wherein a difference between the transmission metrics of each pair of user devices in the subset is greater than a threshold; and scheduling simultaneous transmissions between the network node and the subset of user devices using multiple transmission beams.

CC3. The method of example CC1 or CC2, wherein an interference level at the subset of user devices is based on the transmission metrics of user devices.

CC4. The method of example CC1 or CC2, wherein the transmission metric comprises one or more of a distance, an angular distance or a precoding vector.

CC5. The method of example CC4, wherein the precoding vector comprises a Tomlinson-Harashima precoding vector.

CC6. The method of example CC2, wherein the user devices are configured to implement a joint equalization algorithm to process the simultaneous transmissions.

CC7. The method of example CC2, wherein the threshold is based on an intended interference level at each of the subset of user devices.

CC8. The method of any of claims CC1 to CC7, wherein the wireless network is a fixed wireless access (FWA) system.

In some embodiments, the above described example methods may be implemented by an apparatus that includes a processor configured to implement one or more of the example methods listed herein.

In some embodiments, the various methods and techniques listed herein (including FIG. 3) may be stored on a computer-readable program medium in the form of processor-executable program code.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A method for scheduling a plurality of user devices in a fixed wireless access (FWA) system characterized by a temporal Rice factor being greater than a threshold, each of the plurality of user devices communicating over a corresponding channel of a plurality of wireless channels, the method comprising:
   determining a plurality of sets based on a first characteristic of the plurality of wireless channels, wherein each of the plurality of sets comprises at least one of the plurality of user devices, and wherein the first characteristic comprises a time-invariant part of each of the plurality of wireless channels;
   determining a subset of user devices by selecting at most one user device from each of the plurality of sets; and
   scheduling simultaneous transmissions by each of the subset of user devices based on a scheduling algorithm and a second characteristic of the plurality of wireless channels, wherein the second characteristic comprises both the time-invariant part and a time-varying part of the plurality of wireless channels, and
   wherein the temporal Rice factor is based on a ratio of the time-invariant part of the corresponding channel to the time-varying part of the corresponding channel.

2. The method of claim 1, further comprising:
   assigning a modulation and coding scheme to each of the subset of user devices based on the second characteristic.

3. The method of claim 1, wherein each of the plurality of wireless channels is characterized by a corresponding one of a plurality of capacities, and wherein the scheduling algorithm comprises:
   determining a utility function based on a sum of a plurality of products, wherein each of the plurality of products is a result of a multiplication of one of a plurality of weights and a corresponding one of the plurality of capacities; and
   maximizing the utility function based on an optimization algorithm.

4. The method of claim 3, wherein the optimization algorithm is a greedy scheduling algorithm with zero-forcing dirty paper coding.

5. The method of claim 3, wherein the optimization algorithm is an iterative water-filling algorithm.

6. The method of claim 3, wherein each of the plurality of weights is based on a backlog and deadlines of packets that are scheduled by the corresponding one of the plurality of user devices.

7. The method of claim 1, wherein the threshold is 20 dB.

8. A device for scheduling a plurality of user devices in a fixed wireless access (FWA) system characterized by a temporal Rice factor being greater than a threshold, each of the plurality of user devices communicating over a corresponding channel of a plurality of wireless channels, the device comprising:
   a processor configured to:
      determine a plurality of sets based on a first characteristic of the plurality of wireless channels, wherein each of the plurality of sets comprises at least one of the plurality of user devices, and wherein the first characteristic comprises a time-invariant part of each of the plurality of wireless channels;
      determine a subset of user devices by selecting at most one user device from each of the plurality of sets; and
      schedule simultaneous transmissions by each of the subset of user devices based on a scheduling algorithm and a second characteristic of the plurality of wireless channels, wherein the second characteristic comprises both a time-invariant and a time-varying part of the plurality of wireless channels, and wherein the temporal Rice factor is based on a ratio of the time-invariant part of the corresponding channel to the time-varying part of the corresponding channel.

9. The device of claim 8, wherein the processor is further configured to:
   assign a modulation and coding scheme to each of the subset of user devices based on the second characteristic.

10. The device of claim 8, wherein each of the plurality of wireless channels is characterized by a corresponding one of a plurality of capacities, and wherein the processor is further configured, as part of the scheduling algorithm, to:
    determine a utility function based on a sum of a plurality of products, wherein each of the plurality of products is a result of a multiplication of one of a plurality of weights and a corresponding one of the plurality of capacities; and
    maximize the utility function based on an optimization algorithm.

11. The device of claim 10, wherein the optimization algorithm is a greedy scheduling algorithm with zero-forcing dirty paper coding.

12. The device of claim 10, wherein the optimization algorithm is an iterative water-filling algorithm.

13. The device of claim 10, wherein each of the plurality of weights is based on a backlog and deadlines of packets that are scheduled by the corresponding one of the plurality of user devices.

14. The device of claim 8, wherein the threshold is 20 dB.

15. A device for scheduling a plurality of user devices in a fixed wireless access (FWA) system characterized by a temporal Rice factor being greater than a threshold, each of the plurality of user devices communicating over a corresponding channel of a plurality of wireless channels, the device comprising:
   a processor configured to:
      determine a plurality of sets based on a time-invariant part of the plurality of wireless channels, wherein each of the plurality of sets comprises at least one of the plurality of user devices;

determine a subset of user devices by selecting at most one user device from each of the plurality of sets; and schedule simultaneous multiple input multiple output (MIMO) transmissions by each of the subset of user devices based on a scheduling algorithm and both the time-invariant part and a time-varying part of the plurality of wireless channels, wherein the temporal Rice factor is based on a ratio of the time-invariant part of the corresponding channel to the time-varying part of the corresponding channel.

16. The device of claim 15, wherein each of the plurality of wireless channels is characterized by a corresponding one of a plurality of capacities, and wherein the processor is further configured, as part of the scheduling algorithm, to:

determine a utility function based on a sum of a plurality of products, wherein each of the plurality of products is a result of a multiplication of one of a plurality of weights and a corresponding one of the plurality of capacities; and maximize the utility function based on an optimization algorithm.

17. The device of claim 16, wherein the optimization algorithm is a greedy scheduling algorithm with zero-forcing dirty paper coding or an iterative water-filling algorithm.

18. The device of claim 16, wherein each of the plurality of weights is based on a backlog and deadlines of packets that are scheduled by the corresponding one of the plurality of user devices.

19. The device of claim 15, wherein the threshold is 20 dB.

* * * * *